(12) United States Patent
Kiefer et al.

(10) Patent No.: US 12,244,878 B2
(45) Date of Patent: Mar. 4, 2025

(54) SYSTEMS AND METHODS FOR DISTRIBUTING CONTENT USING A COMMON SET OF ENCRYPTION KEYS

(71) Applicant: DIVX, LLC, San Diego, CA (US)

(72) Inventors: Michael George Kiefer, Lake Havasu City, AZ (US); Eric William Grab, San Diego, CA (US); Jason Braness, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

(21) Appl. No.: 18/315,425

(22) Filed: May 10, 2023

(65) Prior Publication Data

US 2023/0396820 A1 Dec. 7, 2023

Related U.S. Application Data

(63) Continuation of application No. 17/024,373, filed on Sep. 17, 2020, now Pat. No. 11,683,542, which is a
(Continued)

(51) Int. Cl.
*H04N 21/2347* (2011.01)
*H04L 9/08* (2006.01)
(Continued)

(52) U.S. Cl.
CPC ....... *H04N 21/2347* (2013.01); *H04L 9/0819* (2013.01); *H04L 9/0822* (2013.01);
(Continued)

(58) Field of Classification Search
CPC ........... H04N 21/2347; H04N 21/2541; H04N 21/4408; H04N 21/4627; H04N 21/6334;
(Continued)

(56) References Cited

U.S. PATENT DOCUMENTS 3,609,227 A 9/1971 Kuljian
3,919,474 A 11/1975 Benson
(Continued)

FOREIGN PATENT DOCUMENTS

AU 2010203605 B2 5/2015
CA 2237293 A1 7/1997
(Continued)

OTHER PUBLICATIONS

"IBM Closes Cryptolopes Unit," Dec. 17, 1997, CNET News, Printed on Apr. 25, 2014 from http://news.cnet.com/IBM-closes-Cryptolopes-unit/2100-1001_3206465.html, 3 pgs.
(Continued)

*Primary Examiner* — Abiy Getachew
(74) *Attorney, Agent, or Firm* — KPPB LLP

(57) ABSTRACT

Systems and methods for performing adaptive bitrate streaming using alternative streams of protected content in accordance with embodiments of the invention are described. One embodiment of the invention includes a processor, and memory containing a client application. In addition, the client application configures the processor to: request a top level index file identifying a plurality of alternative streams of protected content, where each of the alternative streams of protected content are encrypted using common cryptographic information; obtain the common cryptographic information; request portions of content from at least the plurality of alternative streams of protected content; access the protected content using the common cryptographic information; and playback the content.

36 Claims, 19 Drawing Sheets

Related U.S. Application Data continuation of application No. 16/414,649, filed on May 16, 2019, now Pat. No. 10,856,020, which is a continuation of application No. 16/155,811, filed on Oct. 9, 2018, now Pat. No. 10,341,698, which is a continuation of application No. 15/481,340, filed on Apr. 6, 2017, now Pat. No. 10,244,272, which is a continuation of application No. 14/970,412, filed on Dec. 15, 2015, now Pat. No. 9,621,522, which is a continuation of application No. 14/564,003, filed on Dec. 8, 2014, now Pat. No. 9,247,311, which is a continuation of application No. 13/340,623, filed on Dec. 29, 2011, now Pat. No. 8,909,922.

(60) Provisional application No. 61/530,305, filed on Sep. 1, 2011.

(51) Int. Cl.
| | |
|---|---|
| *H04L 9/14* | (2006.01) |
| *H04L 9/32* | (2006.01) |
| *H04L 9/40* | (2022.01) |
| *H04N 21/254* | (2011.01) |
| *H04N 21/4408* | (2011.01) |
| *H04N 21/4627* | (2011.01) |
| *H04N 21/6334* | (2011.01) |
| *H04N 21/647* | (2011.01) |

(52) U.S. Cl.
CPC .............. *H04L 9/0861* (2013.01); *H04L 9/14* (2013.01); *H04L 9/32* (2013.01); *H04L 63/0428* (2013.01); *H04N 21/2541* (2013.01); *H04N 21/4408* (2013.01); *H04N 21/4627* (2013.01); *H04N 21/6334* (2013.01); *H04N 21/64715* (2013.01); *H04L 2209/603* (2013.01)

(58) Field of Classification Search
CPC ............ H04N 21/64715; H04L 9/0819; H04L 9/0822; H04L 9/0861; H04L 9/14; H04L 9/32; H04L 63/0428; H04L 2209/603
See application file for complete search history.

(56) References Cited

U.S. PATENT DOCUMENTS

| | | |
|---|---|---|
| 4,009,331 A | 2/1977 | Goldmark et al. |
| 4,694,357 A | 9/1987 | Rahman et al. |
| 4,694,491 A | 9/1987 | Horne et al. |
| 4,802,170 A | 1/1989 | Trottier |
| 4,964,069 A | 10/1990 | Ely |
| 4,974,260 A | 11/1990 | Rudak |
| 5,119,474 A | 6/1992 | Beitel et al. |
| 5,132,992 A | 7/1992 | Yurt et al. |
| 5,274,758 A | 12/1993 | Beitel et al. |
| 5,341,474 A | 8/1994 | Gelman et al. |
| 5,361,332 A | 11/1994 | Yoshida et al. |
| 5,396,497 A | 3/1995 | Veltman |
| 5,400,401 A | 3/1995 | Wasilewski et al. |
| 5,404,436 A | 4/1995 | Hamilton |
| 5,420,801 A | 5/1995 | Dockter et al. |
| 5,420,974 A | 5/1995 | Morris et al. |
| 5,471,576 A | 11/1995 | Yee |
| 5,477,263 A | 12/1995 | Ocallaghan et al. |
| 5,479,303 A | 12/1995 | Suzuki et al. |
| 5,487,167 A | 1/1996 | Dinallo et al. |
| 5,502,766 A | 3/1996 | Boebert et al. |
| 5,509,070 A | 4/1996 | Schull |
| 5,533,021 A | 7/1996 | Branstad et al. |
| 5,537,408 A | 7/1996 | Branstad et al. |
| 5,539,908 A | 7/1996 | Chen et al. |
| 5,541,662 A | 7/1996 | Adams et al. |
| 5,544,318 A | 8/1996 | Schmitz et al. |
| 5,550,863 A | 8/1996 | Yurt et al. |
| 5,574,785 A | 11/1996 | Ueno et al. |
| 5,583,652 A | 12/1996 | Ware |
| 5,589,993 A | 12/1996 | Naimpally et al. |
| 5,600,721 A | 2/1997 | Kitazato |
| 5,614,940 A | 3/1997 | Cobbley et al. |
| 5,621,794 A | 4/1997 | Matsuda et al. |
| 5,627,936 A | 5/1997 | Prasad |
| 5,630,005 A | 5/1997 | Ort |
| 5,633,472 A | 5/1997 | DeWitt et al. |
| 5,642,171 A | 6/1997 | Baumgartner et al. |
| 5,642,338 A | 6/1997 | Fukushima et al. |
| 5,655,117 A | 8/1997 | Goldberg et al. |
| 5,664,044 A | 9/1997 | Ware |
| 5,675,382 A | 10/1997 | Bauchspies |
| 5,675,511 A | 10/1997 | Prasad et al. |
| 5,684,542 A | 11/1997 | Tsukagoshi |
| 5,715,403 A | 2/1998 | Stefik |
| 5,717,816 A | 2/1998 | Boyce et al. |
| 5,719,786 A | 2/1998 | Nelson et al. |
| 5,745,643 A | 4/1998 | Mishina |
| 5,751,280 A | 5/1998 | Abbott |
| 5,751,358 A | 5/1998 | Suzuki et al. |
| 5,754,648 A | 5/1998 | Ryan et al. |
| 5,757,968 A | 5/1998 | Ando |
| 5,761,417 A | 6/1998 | Henley et al. |
| 5,763,800 A | 6/1998 | Rossum et al. |
| 5,765,164 A | 6/1998 | Prasad et al. |
| 5,794,018 A | 8/1998 | Vrvilo et al. |
| 5,805,700 A | 9/1998 | Nardone et al. |
| 5,813,010 A | 9/1998 | Kurano et al. |
| 5,819,160 A | 10/1998 | Foladare et al. |
| 5,822,524 A | 10/1998 | Chen et al. |
| 5,828,370 A | 10/1998 | Moeller et al. |
| 5,838,791 A | 11/1998 | Torii et al. |
| 5,841,432 A | 11/1998 | Carmel et al. |
| 5,844,575 A | 12/1998 | Reid |
| 5,848,217 A | 12/1998 | Tsukagoshi et al. |
| 5,852,664 A | 12/1998 | Iverson et al. |
| 5,854,873 A | 12/1998 | Mori et al. |
| 5,867,625 A | 2/1999 | McLaren |
| 5,874,986 A | 2/1999 | Gibbon et al. |
| 5,878,135 A | 3/1999 | Blatter et al. |
| 5,881,038 A | 3/1999 | Oshima et al. |
| 5,887,110 A | 3/1999 | Sakamoto et al. |
| 5,892,900 A | 4/1999 | Ginter et al. |
| 5,892,915 A | 4/1999 | Duso et al. |
| 5,903,261 A | 5/1999 | Walsh et al. |
| 5,907,597 A | 5/1999 | Mark |
| 5,907,658 A | 5/1999 | Murase et al. |
| 5,912,710 A | 6/1999 | Fujimoto |
| 5,923,869 A | 7/1999 | Kashiwagi et al. |
| 5,946,446 A | 8/1999 | Yanagihara |
| 5,956,729 A | 9/1999 | Goetz et al. |
| 5,959,690 A | 9/1999 | Toebes, VIII et al. |
| 5,970,147 A | 10/1999 | Davis |
| 5,973,679 A | 10/1999 | Abbott et al. |
| 5,999,812 A | 12/1999 | Himsworth |
| 6,002,834 A | 12/1999 | Hirabayashi et al. |
| 6,005,621 A | 12/1999 | Linzer et al. |
| 6,009,237 A | 12/1999 | Hirabayashi et al. |
| 6,016,381 A | 1/2000 | Taira et al. |
| 6,031,622 A | 2/2000 | Ristow et al. |
| 6,038,257 A | 3/2000 | Brusewitz et al. |
| 6,038,316 A | 3/2000 | Dwork et al. |
| 6,044,469 A | 3/2000 | Horstmann |
| 6,046,778 A | 4/2000 | Nonomura et al. |
| 6,047,100 A | 4/2000 | McLaren |
| 6,057,832 A | 5/2000 | Lev et al. |
| 6,058,240 A | 5/2000 | McLaren |
| 6,064,794 A | 5/2000 | McLaren et al. |
| 6,065,050 A | 5/2000 | DeMoney |
| 6,018,611 A | 6/2000 | Nogami et al. |
| 6,079,566 A | 6/2000 | Eleftheriadis et al. |
| 6,097,877 A | 8/2000 | Katayama et al. |
| 6,108,422 A | 8/2000 | Newby et al. |
| 6,141,754 A | 10/2000 | Choy |
| 6,151,634 A | 11/2000 | Glaser et al. |
| 6,155,840 A | 12/2000 | Sallette |
| 6,157,410 A | 12/2000 | Izumi et al. |

(56) References Cited

U.S. PATENT DOCUMENTS

| | | |
|---|---|---|
| 6,169,242 B1 | 1/2001 | Fay et al. |
| 6,175,921 B1 | 1/2001 | Rosen |
| 6,192,075 B1 | 2/2001 | Jeng et al. |
| 6,195,388 B1 | 2/2001 | Choi et al. |
| 6,199,107 B1 | 3/2001 | Dujari |
| 6,204,883 B1 | 3/2001 | Tsukagoshi |
| 6,222,981 B1 | 4/2001 | Rijckaert |
| 6,266,483 B1 | 7/2001 | Okada et al. |
| 6,282,320 B1 | 8/2001 | Hasegawa et al. |
| 6,282,653 B1 | 8/2001 | Berstis et al. |
| 6,289,450 B1 | 9/2001 | Pensak et al. |
| 6,292,621 B1 | 9/2001 | Tanaka et al. |
| 6,308,005 B1 | 10/2001 | Ando et al. |
| 6,320,905 B1 | 11/2001 | Konstantinides |
| 6,330,286 B1 | 12/2001 | Lyons et al. |
| 6,347,145 B2 | 2/2002 | Kato et al. |
| 6,351,538 B1 | 2/2002 | Uz |
| 6,373,803 B2 | 4/2002 | Ando et al. |
| 6,374,144 B1 | 4/2002 | Viviani et al. |
| 6,389,218 B2 | 5/2002 | Gordon et al. |
| 6,389,473 B1 | 5/2002 | Carmel et al. |
| 6,395,969 B1 | 5/2002 | Fuhrer |
| 6,397,230 B1 | 5/2002 | Carmel et al. |
| 6,415,031 B1 | 7/2002 | Colligan et al. |
| 6,418,270 B1 | 7/2002 | Steenhof et al. |
| 6,430,354 B1 | 8/2002 | Watanabe |
| 6,441,754 B1 | 8/2002 | Wang et al. |
| 6,445,877 B1 | 9/2002 | Okada et al. |
| 6,449,719 B1 | 9/2002 | Baker |
| 6,453,115 B1 | 9/2002 | Boyle |
| 6,453,116 B1 | 9/2002 | Ando et al. |
| 6,466,671 B1 | 10/2002 | Maillard et al. |
| 6,466,733 B1 | 10/2002 | Kim |
| 6,504,873 B1 | 1/2003 | Vehvilaeinen |
| 6,510,513 B1 | 1/2003 | Danieli |
| 6,510,554 B1 | 1/2003 | Gordon et al. |
| 6,512,883 B2 | 1/2003 | Shim et al. |
| 6,516,064 B1 | 2/2003 | Osawa et al. |
| 6,532,262 B1 | 3/2003 | Fukuda et al. |
| 6,535,920 B1 | 3/2003 | Parry et al. |
| 6,578,200 B1 | 6/2003 | Takao et al. |
| 6,587,506 B1 | 7/2003 | Noridomi et al. |
| 6,594,699 B1 | 7/2003 | Sahai et al. |
| 6,621,979 B1 | 9/2003 | Eerenberg et al. |
| 6,625,320 B1 | 9/2003 | Nilsson et al. |
| 6,642,967 B1 | 11/2003 | Saunders |
| 6,654,933 B1 | 11/2003 | Abbott et al. |
| 6,658,056 B1 | 12/2003 | Duruöz et al. |
| 6,665,835 B1 | 12/2003 | Gutfreund et al. |
| 6,671,408 B1 | 12/2003 | Kaku |
| 6,690,838 B2 | 2/2004 | Zhou |
| 6,697,568 B1 | 2/2004 | Kaku |
| 6,714,909 B1 | 3/2004 | Gibbon et al. |
| 6,721,794 B2 | 4/2004 | Taylor et al. |
| 6,724,944 B1 | 4/2004 | Kalevo et al. |
| 6,725,281 B1 | 4/2004 | Zintel |
| 6,742,082 B1 | 5/2004 | Lango et al. |
| 6,751,623 B1 | 6/2004 | Basso et al. |
| 6,771,703 B1 | 8/2004 | Oguz et al. |
| 6,807,306 B1 | 10/2004 | Girgensohn et al. |
| 6,810,031 B1 | 10/2004 | Hegde et al. |
| 6,810,131 B2 | 10/2004 | Nakagawa et al. |
| 6,810,389 B1 | 10/2004 | Meyer |
| 6,813,437 B2 | 11/2004 | Ando et al. |
| 6,819,394 B1 | 11/2004 | Nomura et al. |
| 6,850,252 B1 | 2/2005 | Hoffberg |
| 6,856,997 B2 | 2/2005 | Lee et al. |
| 6,859,496 B1 | 2/2005 | Boroczky et al. |
| 6,868,525 B1 | 3/2005 | Szabo |
| 6,871,006 B1 | 3/2005 | Oguz et al. |
| 6,912,253 B1 | 6/2005 | Li et al. |
| 6,912,513 B1 | 6/2005 | Candelore |
| 6,917,652 B2 | 7/2005 | Lyu |
| 6,920,179 B1 | 7/2005 | Anand et al. |
| 6,931,531 B1 | 8/2005 | Takahashi |
| 6,931,543 B1 | 8/2005 | Pang et al. |
| 6,944,621 B1 | 9/2005 | Collart |
| 6,944,629 B1 | 9/2005 | Shioi et al. |
| 6,956,901 B2 | 10/2005 | Boroczky et al. |
| 6,957,350 B1 | 10/2005 | Demos |
| 6,965,646 B1 | 11/2005 | Firestone |
| 6,965,724 B1 | 11/2005 | Boccon-Gibod et al. |
| 6,965,993 B2 | 11/2005 | Baker |
| 6,970,564 B1 | 11/2005 | Kubota et al. |
| 6,983,079 B2 | 1/2006 | Kim |
| 6,985,588 B1 | 1/2006 | Glick et al. |
| 6,988,144 B1 | 1/2006 | Luken et al. |
| 7,006,757 B2 | 2/2006 | Ando et al. |
| 7,007,170 B2 | 2/2006 | Morten |
| 7,020,287 B2 | 3/2006 | Unger |
| 7,023,924 B1 | 4/2006 | Keller et al. |
| 7,023,992 B1 | 4/2006 | Kubota et al. |
| 7,043,021 B2 | 5/2006 | Graunke et al. |
| 7,043,473 B1 | 5/2006 | Rassool et al. |
| 7,051,110 B2 | 5/2006 | Hagai et al. |
| 7,054,968 B2 | 5/2006 | Shrader et al. |
| 7,058,177 B1 | 6/2006 | Trimberger et al. |
| 7,073,191 B2 | 7/2006 | Srikantan et al. |
| 7,103,906 B1 | 9/2006 | Katz et al. |
| 7,110,542 B1 | 9/2006 | Tripathy |
| 7,120,250 B2 | 10/2006 | Candelore |
| 7,124,303 B2 | 10/2006 | Candelore et al. |
| 7,127,155 B2 | 10/2006 | Ando et al. |
| 7,139,868 B2 | 11/2006 | Parry et al. |
| 7,143,289 B2 | 11/2006 | Denning et al. |
| 7,150,045 B2 | 12/2006 | Koelle et al. |
| 7,151,832 B1 | 12/2006 | Fetkovich et al. |
| 7,151,833 B2 | 12/2006 | Candelore et al. |
| 7,165,175 B1 | 1/2007 | Kollmyer et al. |
| 7,167,560 B2 | 1/2007 | Yu |
| 7,181,438 B1 | 2/2007 | Szabo |
| 7,185,363 B1 | 2/2007 | Narin et al. |
| 7,188,183 B1 | 3/2007 | Paul et al. |
| 7,191,335 B1 | 3/2007 | Maillard |
| 7,197,234 B1 | 3/2007 | Chatterton |
| 7,203,313 B2 | 4/2007 | England et al. |
| 7,206,940 B2 | 4/2007 | Evans et al. |
| 7,209,892 B1 | 4/2007 | Galuten et al. |
| 7,212,726 B2 | 5/2007 | Zetts |
| 7,231,132 B1 | 6/2007 | Davenport |
| 7,231,516 B1 | 6/2007 | Sparrell et al. |
| 7,233,669 B2 | 6/2007 | Candelore |
| 7,233,948 B1 | 6/2007 | Shamoon et al. |
| 7,237,061 B1 | 6/2007 | Boic |
| 7,242,772 B1 | 7/2007 | Tehranchi |
| 7,243,346 B1 | 7/2007 | Seth et al. |
| 7,274,861 B2 | 9/2007 | Yahata et al. |
| 7,295,673 B2 | 11/2007 | Grab et al. |
| 7,302,490 B1 | 11/2007 | Gupta et al. |
| 7,315,829 B1 | 1/2008 | Tagawa et al. |
| 7,328,345 B2 | 2/2008 | Morten et al. |
| 7,330,875 B2 | 2/2008 | Parasnis et al. |
| 7,340,528 B2 | 3/2008 | Noblecourt et al. |
| 7,346,163 B2 | 3/2008 | Pedlow, Jr. et al. |
| 7,349,886 B2 | 3/2008 | Morten et al. |
| 7,349,976 B1 | 3/2008 | Glaser et al. |
| 7,352,956 B1 | 4/2008 | Winter et al. |
| 7,356,143 B2 | 4/2008 | Morten |
| 7,356,245 B2 | 4/2008 | Belknap et al. |
| 7,363,647 B1 | 4/2008 | Fakharzadeh |
| 7,366,788 B2 | 4/2008 | Jones et al. |
| 7,376,233 B2 | 5/2008 | Candelore et al. |
| 7,376,831 B2 | 5/2008 | Kollmyer et al. |
| 7,382,879 B1 | 6/2008 | Miller |
| 7,389,273 B2 | 6/2008 | Irwin et al. |
| 7,397,853 B2 | 7/2008 | Kwon et al. |
| 7,400,679 B2 | 7/2008 | Kwon et al. |
| 7,406,174 B2 | 7/2008 | Palmer |
| 7,406,176 B2 | 7/2008 | Zhu et al. |
| 7,418,132 B2 | 8/2008 | Hoshuyama |
| 7,421,411 B2 | 9/2008 | Kontio et al. |
| 7,443,449 B2 | 10/2008 | Momosaki et al. |
| 7,454,780 B2 | 11/2008 | Katsube et al. |
| 7,457,359 B2 | 11/2008 | Mabey et al. |

(56) References Cited

U.S. PATENT DOCUMENTS

| | | |
|---|---|---|
| 7,457,415 B2 | 11/2008 | Reitmeier et al. |
| 7,460,668 B2 | 12/2008 | Grab et al. |
| 7,472,280 B2 | 12/2008 | Giobbi |
| 7,478,325 B2 | 1/2009 | Foehr |
| 7,484,103 B2 | 1/2009 | Woo et al. |
| 7,493,018 B2 | 2/2009 | Kim |
| 7,499,930 B2 | 3/2009 | Naka et al. |
| 7,499,938 B2 | 3/2009 | Collart |
| 7,515,710 B2 | 4/2009 | Russell et al. |
| 7,526,450 B2 | 4/2009 | Hughes et al. |
| 7,539,213 B2 | 5/2009 | Guillemot et al. |
| 7,546,641 B2 | 6/2009 | Robert et al. |
| 7,577,980 B2 | 8/2009 | Kienzle et al. |
| 7,594,271 B2 | 9/2009 | Zhuk et al. |
| 7,610,365 B1 | 10/2009 | Kraft et al. |
| 7,623,759 B2 | 11/2009 | Shimoda |
| 7,624,337 B2 | 11/2009 | Sull et al. |
| 7,627,750 B1 | 12/2009 | Chan |
| 7,627,888 B2 | 12/2009 | Ganesan et al. |
| 7,639,921 B2 | 12/2009 | Seo et al. |
| 7,640,358 B2 | 12/2009 | Deshpande |
| 7,640,435 B2 | 12/2009 | Morten |
| 7,644,172 B2 | 1/2010 | Stewart et al. |
| 7,653,686 B2 | 1/2010 | Yoneda |
| 7,664,262 B2 | 2/2010 | Haruki |
| 7,664,872 B2 | 2/2010 | Osborne et al. |
| 7,676,555 B2 | 3/2010 | Bushee et al. |
| 7,689,510 B2 | 3/2010 | Lamkin et al. |
| 7,697,686 B2 | 4/2010 | Puiatti et al. |
| 7,702,925 B2 | 4/2010 | Hanko et al. |
| 7,711,052 B2 | 5/2010 | Hannuksela et al. |
| 7,711,647 B2 | 5/2010 | Gunaseelan et al. |
| 7,720,352 B2 | 5/2010 | Belknap et al. |
| 7,734,806 B2 | 6/2010 | Park |
| 7,747,853 B2 | 6/2010 | Candelore |
| 7,756,270 B2 | 7/2010 | Shimosato et al. |
| 7,756,271 B2 | 7/2010 | Zhu et al. |
| 7,761,892 B2 | 7/2010 | Ellis et al. |
| 7,779,097 B2 | 8/2010 | Lamkin et al. |
| 7,787,622 B2 | 8/2010 | Sprunk |
| 7,788,271 B2 | 8/2010 | Soma et al. |
| 7,797,720 B2 | 9/2010 | Gopalakrishnan et al. |
| 7,817,608 B2 | 10/2010 | Rassool et al. |
| 7,840,489 B2 | 11/2010 | Candelore |
| 7,840,693 B2 | 11/2010 | Gupta et al. |
| 7,853,980 B2 | 12/2010 | Pedlow, Jr. et al. |
| 7,864,186 B2 | 1/2011 | Robotham et al. |
| 7,869,691 B2 | 1/2011 | Kelly et al. |
| 7,873,740 B2 | 1/2011 | Sitaraman et al. |
| 7,877,002 B2 | 1/2011 | Ikeda et al. |
| 7,881,478 B2 | 2/2011 | Derouet |
| 7,882,034 B2 | 2/2011 | Hug et al. |
| 7,885,405 B1 | 2/2011 | Bong |
| 7,895,311 B1 | 2/2011 | Juenger |
| 7,907,833 B2 | 3/2011 | Lee |
| 7,913,277 B1 | 3/2011 | Rahrer |
| 7,945,143 B2 | 5/2011 | Yahata et al. |
| 7,949,703 B2 | 5/2011 | Matsuzaki et al. |
| 7,962,942 B1 | 6/2011 | Craner |
| 7,970,835 B2 | 6/2011 | St |
| 7,974,714 B2 | 7/2011 | Hoffberg |
| 7,984,513 B1 | 7/2011 | Kyne et al. |
| 7,991,156 B1 | 8/2011 | Miller |
| 8,001,471 B2 | 8/2011 | Shaver et al. |
| 8,010,810 B1 | 8/2011 | Fitzgerald et al. |
| 8,015,491 B2 | 9/2011 | Shaver et al. |
| 8,023,562 B2 | 9/2011 | Zheludkov et al. |
| 8,046,453 B2 | 10/2011 | Olaiya |
| 8,054,880 B2 | 11/2011 | Yu et al. |
| 8,065,708 B1 | 11/2011 | Smyth et al. |
| 8,069,260 B2 | 11/2011 | Speicher et al. |
| 8,073,900 B2 | 12/2011 | Guedalia et al. |
| 8,074,083 B1 | 12/2011 | Lee et al. |
| 8,078,644 B2 | 12/2011 | Hannuksela |
| 8,082,442 B2 | 12/2011 | Keljo et al. |
| 8,131,875 B1 | 3/2012 | Chen |
| 8,135,041 B2 | 3/2012 | Ramaswamy |
| 8,160,157 B2 | 4/2012 | Lamy-Bergot et al. |
| 8,169,916 B1 | 5/2012 | Pai et al. |
| 8,170,210 B2 | 5/2012 | Manders et al. |
| 8,195,714 B2 | 6/2012 | Mckibben et al. |
| 8,201,214 B1 | 6/2012 | Wallace et al. |
| 8,201,264 B2 | 6/2012 | Grab et al. |
| 8,213,607 B2 | 7/2012 | Rose et al. |
| 8,213,768 B2 | 7/2012 | Morioka et al. |
| 8,218,439 B2 | 7/2012 | Deshpande |
| 8,225,061 B2 | 7/2012 | Greenebaum |
| 8,233,768 B2 | 7/2012 | Soroushian et al. |
| 8,243,924 B2 | 8/2012 | Chen et al. |
| 8,245,124 B1 | 8/2012 | Gupta |
| 8,249,168 B2 | 8/2012 | Graves |
| 8,261,356 B2 | 9/2012 | Choi et al. |
| 8,265,168 B1 | 9/2012 | Masterson et al. |
| 8,270,473 B2 | 9/2012 | Chen et al. |
| 8,270,819 B2 | 9/2012 | Vannier |
| 8,275,871 B2 | 9/2012 | Ram et al. |
| 8,286,213 B2 | 10/2012 | Seo |
| 8,286,621 B2 | 10/2012 | Halmone |
| 8,289,338 B2 | 10/2012 | Priyadarshi et al. |
| 8,290,157 B2 | 10/2012 | Candelore |
| 8,291,460 B1 | 10/2012 | Peacock |
| 8,296,434 B1 | 10/2012 | Miller et al. |
| 8,311,094 B2 | 11/2012 | Kamariotis et al. |
| 8,311,111 B2 | 11/2012 | Xu et al. |
| 8,311,115 B2 | 11/2012 | Gu et al. |
| 8,312,079 B2 | 11/2012 | Newsome et al. |
| 8,321,556 B1 | 11/2012 | Chatterjee et al. |
| 8,325,800 B2 | 12/2012 | Holcomb et al. |
| 8,327,009 B2 | 12/2012 | Prestenback et al. |
| 8,341,715 B2 | 12/2012 | Sherkin et al. |
| 8,346,753 B2 | 1/2013 | Hayes |
| 8,365,235 B2 | 1/2013 | Hunt et al. |
| 8,369,421 B2 | 2/2013 | Kadono et al. |
| 8,380,041 B2 | 2/2013 | Barton et al. |
| 8,386,621 B2 | 2/2013 | Park |
| 8,396,114 B2 | 3/2013 | Gu et al. |
| 8,397,265 B2 | 3/2013 | Henocq et al. |
| 8,401,188 B1 | 3/2013 | Swaminathan |
| 8,401,900 B2 | 3/2013 | Cansler et al. |
| 8,407,753 B2 | 3/2013 | Kuo |
| 8,412,841 B1 | 4/2013 | Swaminathan et al. |
| 8,423,889 B1 | 4/2013 | Zagorie et al. |
| 8,452,110 B2 | 5/2013 | Shoham et al. |
| 8,456,380 B2 | 6/2013 | Pagan |
| 8,464,066 B1 | 6/2013 | Price et al. |
| 8,472,792 B2 | 6/2013 | Butt |
| 8,473,630 B1 | 6/2013 | Galligan |
| 8,484,368 B2 | 7/2013 | Robert et al. |
| 8,510,303 B2 | 8/2013 | Soroushian et al. |
| 8,510,404 B2 | 8/2013 | Carmel et al. |
| 8,514,926 B2 | 8/2013 | Ro et al. |
| 8,515,265 B2 | 8/2013 | Kwon et al. |
| 8,516,529 B2 | 8/2013 | Lajoie et al. |
| 8,526,610 B2 | 9/2013 | Shamoon et al. |
| 8,527,645 B1 | 9/2013 | Proffit et al. |
| 8,543,842 B2 | 9/2013 | Ginter et al. |
| 8,555,329 B2 | 10/2013 | Fröjdh et al. |
| 8,571,993 B2 | 10/2013 | Kocher et al. |
| 8,595,139 B2 | 11/2013 | Maruyama et al. |
| 8,595,378 B1 | 11/2013 | Cohn et al. |
| 8,606,069 B2 | 12/2013 | Okubo et al. |
| 8,630,419 B2 | 1/2014 | Mori |
| 8,631,247 B2 | 1/2014 | O'loughlin et al. |
| 8,640,166 B1 | 1/2014 | Craner et al. |
| 8,649,669 B2 | 2/2014 | Braness et al. |
| 8,650,599 B2 | 2/2014 | Shindo et al. |
| 8,656,183 B2 | 2/2014 | Russell et al. |
| 8,677,428 B2 | 3/2014 | Lewis et al. |
| 8,681,866 B1 | 3/2014 | Jia |
| 8,683,066 B2 | 3/2014 | Hurst et al. |
| 8,689,267 B2 | 4/2014 | Hunt |
| 8,726,264 B1 | 5/2014 | Allen et al. |
| 8,731,193 B2 | 5/2014 | Farkash et al. |
| 8,731,369 B2 | 5/2014 | Li et al. |

(56) References Cited

U.S. PATENT DOCUMENTS

| | | |
|---|---|---|
| RE45,052 E | 7/2014 | Li |
| 8,767,825 B1 | 7/2014 | Wang et al. |
| 8,774,609 B2 | 7/2014 | Drake et al. |
| 8,781,122 B2 | 7/2014 | Chan et al. |
| 8,782,268 B2 | 7/2014 | Pyle et al. |
| 8,804,956 B2 | 8/2014 | Hiriart |
| 8,805,109 B2 | 8/2014 | Shoham et al. |
| 8,806,188 B2 | 8/2014 | Braness et al. |
| 8,818,171 B2 | 8/2014 | Soroushian et al. |
| 8,818,896 B2 | 8/2014 | Candelore |
| 8,819,116 B1 | 8/2014 | Tomay et al. |
| 8,832,434 B2 | 9/2014 | Apostolopoulos et al. |
| 8,843,586 B2 | 9/2014 | Pantos et al. |
| 8,849,950 B2 | 9/2014 | Stockhammer et al. |
| 8,850,205 B2 | 9/2014 | Choi et al. |
| 8,850,498 B1 | 9/2014 | Roach et al. |
| 8,856,218 B1 | 10/2014 | Inskip |
| 8,897,370 B1 | 11/2014 | Wang et al. |
| 8,908,984 B2 | 12/2014 | Shoham et al. |
| 8,909,922 B2 | 12/2014 | Kiefer et al. |
| 8,914,534 B2 | 12/2014 | Braness et al. |
| 8,914,836 B2 | 12/2014 | Shivadas et al. |
| 8,918,533 B2 | 12/2014 | Chen et al. |
| 8,918,535 B2 | 12/2014 | Ma et al. |
| 8,918,636 B2 | 12/2014 | Kiefer |
| 8,918,908 B2 | 12/2014 | Ziskind et al. |
| 8,948,249 B2 | 2/2015 | Sun et al. |
| 8,964,977 B2 | 2/2015 | Ziskind et al. |
| 8,997,161 B2 | 3/2015 | Priyadarshi et al. |
| 8,997,254 B2 | 3/2015 | Amidei et al. |
| 9,014,471 B2 | 4/2015 | Shoham et al. |
| 9,015,782 B2 | 4/2015 | Acharya et al. |
| 9,025,659 B2 | 5/2015 | Soroushian et al. |
| 9,038,116 B1 | 5/2015 | Knox et al. |
| 9,038,121 B2 | 5/2015 | Kienzle et al. |
| 9,042,670 B2 | 5/2015 | Carmel et al. |
| 9,049,497 B2 | 6/2015 | Chen et al. |
| 9,060,207 B2 | 6/2015 | Scherkus et al. |
| 9,094,737 B2 | 7/2015 | Shivadas et al. |
| 9,098,335 B2 | 8/2015 | Muthiah et al. |
| 9,111,098 B2 | 8/2015 | Smith et al. |
| 9,124,773 B2 | 9/2015 | Chan et al. |
| 9,125,073 B2 | 9/2015 | Oyman et al. |
| 9,184,920 B2 | 11/2015 | Grab et al. |
| 9,191,151 B2 | 11/2015 | Luby et al. |
| 9,191,457 B2 | 11/2015 | Van der Schaar |
| 9,197,685 B2 | 11/2015 | Soroushian |
| 9,201,922 B2 | 12/2015 | Soroushian et al. |
| 9,203,816 B2 | 12/2015 | Brueck et al. |
| 9,210,481 B2 | 12/2015 | Braness et al. |
| 9,215,466 B2 | 12/2015 | Zhai et al. |
| 9,247,311 B2 | 1/2016 | Kiefer |
| 9,247,312 B2 | 1/2016 | Braness et al. |
| 9,247,317 B2 | 1/2016 | Shivadas et al. |
| 9,253,178 B2 | 2/2016 | Blom et al. |
| 9,258,587 B2 | 2/2016 | Reddy et al. |
| 9,264,475 B2 | 2/2016 | Shivadas et al. |
| 9,294,531 B2 | 3/2016 | Zhang et al. |
| 9,313,510 B2 | 4/2016 | Shivadas et al. |
| 9,343,112 B2 | 5/2016 | Amidei et al. |
| 9,344,517 B2 | 5/2016 | Shivadas et al. |
| 9,344,721 B2 | 5/2016 | Dikvall |
| 9,380,096 B2 | 6/2016 | Luby et al. |
| 9,386,064 B2 | 7/2016 | Luby et al. |
| 9,406,066 B2 | 8/2016 | Candelore |
| 9,467,708 B2 | 10/2016 | Soroushian et al. |
| 9,479,805 B2 | 10/2016 | Rothschild et al. |
| 9,485,469 B2 | 11/2016 | Kahn et al. |
| 9,485,546 B2 | 11/2016 | Chen et al. |
| 9,510,031 B2 | 11/2016 | Soroushian et al. |
| 9,571,827 B2 | 2/2017 | Su et al. |
| 9,584,557 B2 | 2/2017 | Panje et al. |
| 9,584,847 B2 | 2/2017 | Ma et al. |
| 9,615,061 B2 | 4/2017 | Carney et al. |
| 9,621,522 B2 | 4/2017 | Kiefer et al. |
| 9,628,536 B2 | 4/2017 | Luby et al. |
| 9,667,684 B2 | 5/2017 | Ziskind et al. |
| 9,672,286 B2 | 6/2017 | Soroushian et al. |
| 9,674,254 B2 | 6/2017 | Pare et al. |
| 9,686,332 B1 | 6/2017 | Binns et al. |
| 9,706,259 B2 | 7/2017 | Chan et al. |
| 9,712,890 B2 | 7/2017 | Shivadas et al. |
| 9,761,274 B2 | 9/2017 | Delpuch et al. |
| 9,798,863 B2 | 10/2017 | Grab et al. |
| 9,813,740 B2 | 11/2017 | Panje et al. |
| 9,866,878 B2 | 1/2018 | van der Schaar et al. |
| 9,883,204 B2 | 1/2018 | Braness et al. |
| 9,906,785 B2 | 2/2018 | Naletov et al. |
| 9,955,195 B2 | 4/2018 | Soroushian |
| 9,967,189 B2 | 5/2018 | Patel et al. |
| 9,967,305 B2 | 5/2018 | Braness |
| 9,967,521 B2 | 5/2018 | Kahn et al. |
| 10,169,094 B2 | 1/2019 | Iyer |
| 10,171,873 B2 | 1/2019 | Krebs |
| 10,212,486 B2 | 2/2019 | Chan et al. |
| 10,225,299 B2 | 3/2019 | van der Schaar et al. |
| 10,225,588 B2 | 3/2019 | Kiefer et al. |
| 10,244,272 B2 | 3/2019 | Kiefer et al. |
| 10,264,255 B2 | 4/2019 | Naletov et al. |
| 10,321,168 B2 | 6/2019 | van der Schaar et al. |
| 10,341,698 B2 | 7/2019 | Kiefer et al. |
| 10,368,096 B2 | 7/2019 | Braness et al. |
| 10,382,785 B2 | 8/2019 | Braness et al. |
| 10,437,896 B2 | 10/2019 | Soroushian et al. |
| 10,462,537 B2 | 10/2019 | Shivadas et al. |
| 10,484,749 B2 | 11/2019 | Chan et al. |
| 10,645,429 B2 | 5/2020 | Soroushian |
| 10,708,587 B2 | 7/2020 | Soroushian et al. |
| 10,715,806 B2 | 7/2020 | Naletov et al. |
| 10,798,143 B2 | 10/2020 | Soroushian et al. |
| 10,805,368 B2 | 10/2020 | van der Schaar et al. |
| 10,856,020 B2 | 12/2020 | Kiefer et al. |
| 10,878,065 B2 | 12/2020 | Grab et al. |
| 10,893,305 B2 | 1/2021 | van der Schaar et al. |
| 10,931,982 B2 | 2/2021 | Soroushian |
| 10,992,955 B2 | 4/2021 | Braness et al. |
| 11,102,553 B2 | 8/2021 | Chan et al. |
| RE48,761 E | 9/2021 | Shivadas et al. |
| 11,438,394 B2 | 9/2022 | Van Der Schaar et al. |
| 11,457,054 B2 | 9/2022 | Soroushian et al. |
| 11,470,405 B2 | 10/2022 | Shivadas et al. |
| 11,683,542 B2 | 6/2023 | Kiefer et al. |
| 11,886,545 B2 | 1/2024 | Grab et al. |
| 2001/0021276 A1 | 9/2001 | Zhou |
| 2001/0030710 A1 | 10/2001 | Werner |
| 2001/0036355 A1 | 11/2001 | Kelly et al. |
| 2001/0046299 A1 | 11/2001 | Wasilewski et al. |
| 2001/0052077 A1 | 12/2001 | Fung et al. |
| 2001/0052127 A1 | 12/2001 | Seo et al. |
| 2001/0053222 A1 | 12/2001 | Wakao et al. |
| 2001/0055337 A1 | 12/2001 | Matsuzaki et al. |
| 2002/0026560 A1 | 2/2002 | Jordan et al. |
| 2002/0034252 A1 | 3/2002 | Owen et al. |
| 2002/0048450 A1 | 4/2002 | Zetts |
| 2002/0051494 A1 | 5/2002 | Yamaguchi et al. |
| 2002/0057739 A1 | 5/2002 | Hasebe et al. |
| 2002/0057898 A1 | 5/2002 | Normile |
| 2002/0062313 A1 | 5/2002 | Lee et al. |
| 2002/0067432 A1 | 6/2002 | Kondo et al. |
| 2002/0075572 A1 | 6/2002 | Boreczky et al. |
| 2002/0076112 A1 | 6/2002 | Devara |
| 2002/0087569 A1 | 7/2002 | Fischer et al. |
| 2002/0089523 A1 | 7/2002 | Hodgkinson |
| 2002/0091665 A1 | 7/2002 | Beek et al. |
| 2002/0093571 A1 | 7/2002 | Hyodo |
| 2002/0107802 A1 | 8/2002 | Philips |
| 2002/0110193 A1 | 8/2002 | Yoo et al. |
| 2002/0112139 A1 | 8/2002 | Krause et al. |
| 2002/0114330 A1 | 8/2002 | Cheung et al. |
| 2002/0116481 A1 | 8/2002 | Lee |
| 2002/0118953 A1 | 8/2002 | Kim |
| 2002/0120934 A1 | 8/2002 | Abrahams et al. |
| 2002/0135607 A1 | 9/2002 | Kato et al. |
| 2002/0136298 A1 | 9/2002 | Anantharamu et al. |

(56) References Cited

U.S. PATENT DOCUMENTS

| | | |
|---|---|---|
| 2002/0141503 A1 | 10/2002 | Kobayashi et al. |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0154779 A1 | 10/2002 | Asano et al. |
| 2002/0159528 A1 | 10/2002 | Graziani et al. |
| 2002/0159598 A1 | 10/2002 | Rubinstein et al. |
| 2002/0161462 A1 | 10/2002 | Fay |
| 2002/0161797 A1 | 10/2002 | Gallo et al. |
| 2002/0164024 A1 | 11/2002 | Arakawa et al. |
| 2002/0169926 A1 | 11/2002 | Pinckney et al. |
| 2002/0169971 A1 | 11/2002 | Asano et al. |
| 2002/0180929 A1 | 12/2002 | Tseng et al. |
| 2002/0184159 A1 | 12/2002 | Tadayon et al. |
| 2002/0184515 A1 | 12/2002 | Oho et al. |
| 2002/0191112 A1 | 12/2002 | Akiyoshi et al. |
| 2002/0191959 A1 | 12/2002 | Lin et al. |
| 2002/0191960 A1 | 12/2002 | Fujinami et al. |
| 2003/0001964 A1 | 1/2003 | Masukura et al. |
| 2003/0002577 A1 | 1/2003 | Pinder |
| 2003/0002578 A1 | 1/2003 | Tsukagoshi et al. |
| 2003/0005442 A1 | 1/2003 | Brodersen et al. |
| 2003/0021296 A1 | 1/2003 | Wee et al. |
| 2003/0031178 A1 | 2/2003 | Haeri |
| 2003/0035488 A1 | 2/2003 | Barrau |
| 2003/0035545 A1 | 2/2003 | Jiang |
| 2003/0035546 A1 | 2/2003 | Jiang et al. |
| 2003/0041257 A1 | 2/2003 | Wee et al. |
| 2003/0043847 A1 | 3/2003 | Haddad |
| 2003/0044080 A1 | 3/2003 | Frishman et al. |
| 2003/0051237 A1 | 3/2003 | Sako et al. |
| 2003/0053541 A1 | 3/2003 | Sun et al. |
| 2003/0061305 A1 | 3/2003 | Copley et al. |
| 2003/0061369 A1 | 3/2003 | Aksu et al. |
| 2003/0063675 A1 | 4/2003 | Kang et al. |
| 2003/0065777 A1 | 4/2003 | Mattila et al. |
| 2003/0077071 A1 | 4/2003 | Lin et al. |
| 2003/0078891 A1 | 4/2003 | Capitant |
| 2003/0078930 A1 | 4/2003 | Surcouf et al. |
| 2003/0079222 A1 | 4/2003 | Boykin et al. |
| 2003/0081776 A1 | 5/2003 | Candelore |
| 2003/0093799 A1 | 5/2003 | Kauffman et al. |
| 2003/0123855 A1 | 7/2003 | Okada et al. |
| 2003/0128296 A1 | 7/2003 | Lee |
| 2003/0133506 A1 | 7/2003 | Haneda |
| 2003/0135633 A1 | 7/2003 | Dror et al. |
| 2003/0135742 A1 | 7/2003 | Evans |
| 2003/0142594 A1 | 7/2003 | Tsumagari et al. |
| 2003/0142872 A1 | 7/2003 | Koyanagi |
| 2003/0152224 A1 | 8/2003 | Candelore et al. |
| 2003/0152370 A1 | 8/2003 | Otomo et al. |
| 2003/0161473 A1 | 8/2003 | Fransdonk |
| 2003/0163824 A1 | 8/2003 | Gordon et al. |
| 2003/0165328 A1 | 9/2003 | Grecia |
| 2003/0174844 A1 | 9/2003 | Candelore |
| 2003/0185302 A1 | 10/2003 | Abrams |
| 2003/0185542 A1 | 10/2003 | McVeigh et al. |
| 2003/0206558 A1 | 11/2003 | Parkkinen et al. |
| 2003/0206717 A1 | 11/2003 | Yogeshwar et al. |
| 2003/0210821 A1 | 11/2003 | Yogeshwar et al. |
| 2003/0216922 A1 | 11/2003 | Gonzales et al. |
| 2003/0229900 A1 | 12/2003 | Reisman |
| 2003/0231863 A1 | 12/2003 | Eerenberg et al. |
| 2003/0231867 A1 | 12/2003 | Gates et al. |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0001594 A1 | 1/2004 | Krishnaswamy et al. |
| 2004/0003008 A1 | 1/2004 | Wasilewski et al. |
| 2004/0006701 A1 | 1/2004 | Kresina |
| 2004/0021684 A1 | 2/2004 | Millner |
| 2004/0022391 A1 | 2/2004 | Obrien |
| 2004/0024688 A1 | 2/2004 | Bi et al. |
| 2004/0025180 A1 | 2/2004 | Begeja et al. |
| 2004/0028227 A1 | 2/2004 | Yu |
| 2004/0031058 A1 | 2/2004 | Reisman |
| 2004/0037421 A1 | 2/2004 | Truman |
| 2004/0039916 A1 | 2/2004 | Aldis et al. |
| 2004/0047592 A1 | 3/2004 | Seo et al. |
| 2004/0047607 A1 | 3/2004 | Seo et al. |
| 2004/0047614 A1 | 3/2004 | Green |
| 2004/0049690 A1 | 3/2004 | Candelore et al. |
| 2004/0049694 A1 | 3/2004 | Candelore |
| 2004/0052501 A1 | 3/2004 | Tam |
| 2004/0071453 A1 | 4/2004 | Valderas |
| 2004/0073917 A1 | 4/2004 | Pedlow et al. |
| 2004/0076237 A1 | 4/2004 | Kadono et al. |
| 2004/0081333 A1 | 4/2004 | Grab et al. |
| 2004/0081434 A1 | 4/2004 | Jung et al. |
| 2004/0084035 A1 | 5/2004 | Newton |
| 2004/0088557 A1 | 5/2004 | Malcolm et al. |
| 2004/0093494 A1 | 5/2004 | Nishimoto et al. |
| 2004/0093618 A1 | 5/2004 | Baldwin et al. |
| 2004/0101059 A1 | 5/2004 | Joch et al. |
| 2004/0101142 A1 | 5/2004 | Nasypny |
| 2004/0105549 A1 | 6/2004 | Suzuki et al. |
| 2004/0107356 A1 | 6/2004 | Shamoon et al. |
| 2004/0111631 A1 | 6/2004 | Kocher et al. |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0139335 A1 | 7/2004 | Diamand et al. |
| 2004/0143760 A1 | 7/2004 | Alkove et al. |
| 2004/0146276 A1 | 7/2004 | Ogawa |
| 2004/0150747 A1 | 8/2004 | Sita |
| 2004/0158878 A1 | 8/2004 | Ratnakar et al. |
| 2004/0181666 A1 | 9/2004 | Candelore |
| 2004/0184534 A1 | 9/2004 | Wang |
| 2004/0184616 A1 | 9/2004 | Morten et al. |
| 2004/0202320 A1 | 10/2004 | Amini et al. |
| 2004/0208245 A1 | 10/2004 | Macinnis et al. |
| 2004/0213094 A1 | 10/2004 | Suzuki |
| 2004/0213547 A1 | 10/2004 | Hayes |
| 2004/0217971 A1 | 11/2004 | Kim |
| 2004/0243488 A1 | 12/2004 | Yamamoto et al. |
| 2004/0243714 A1 | 12/2004 | Wynn et al. |
| 2004/0255115 A1 | 12/2004 | DeMello et al. |
| 2004/0255236 A1 | 12/2004 | Collart |
| 2004/0267952 A1 | 12/2004 | He et al. |
| 2005/0004875 A1 | 1/2005 | Kontio et al. |
| 2005/0005025 A1 | 1/2005 | Harville et al. |
| 2005/0005143 A1 | 1/2005 | Lang et al. |
| 2005/0008385 A1 | 1/2005 | Kocher et al. |
| 2005/0013494 A1 | 1/2005 | Srinivasan et al. |
| 2005/0015509 A1 | 1/2005 | Sitaraman et al. |
| 2005/0015797 A1 | 1/2005 | Noblecourt et al. |
| 2005/0038826 A1 | 2/2005 | Bae et al. |
| 2005/0052294 A1 | 3/2005 | Liang et al. |
| 2005/0055399 A1 | 3/2005 | Savchuk |
| 2005/0063541 A1 | 3/2005 | Candelore |
| 2005/0066063 A1 | 3/2005 | Grigorovitch et al. |
| 2005/0071280 A1 | 3/2005 | Irwin et al. |
| 2005/0076232 A1 | 4/2005 | Kawaguchi |
| 2005/0089091 A1 | 4/2005 | Kim et al. |
| 2005/0094808 A1 | 5/2005 | Pedlow, Jr. et al. |
| 2005/0102371 A1 | 5/2005 | Aksu |
| 2005/0108320 A1 | 5/2005 | Lord et al. |
| 2005/0114534 A1 | 5/2005 | Lee |
| 2005/0114896 A1 | 5/2005 | Hug et al. |
| 2005/0120132 A1 | 6/2005 | Hutter |
| 2005/0132208 A1 | 6/2005 | Hug et al. |
| 2005/0138655 A1 | 6/2005 | Zimler et al. |
| 2005/0144468 A1 | 6/2005 | Northcutt |
| 2005/0149450 A1 | 7/2005 | Stefik et al. |
| 2005/0157948 A1 | 7/2005 | Lee |
| 2005/0177741 A1 | 8/2005 | Chen et al. |
| 2005/0180641 A1 | 8/2005 | Clark |
| 2005/0183120 A1 | 8/2005 | Jain et al. |
| 2005/0190911 A1 | 9/2005 | Pare et al. |
| 2005/0192904 A1 | 9/2005 | Candelore |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0198364 A1 | 9/2005 | Val et al. |

(56) References Cited

U.S. PATENT DOCUMENTS

| | | |
|---|---|---|
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |
| 2005/0210145 A1 | 9/2005 | Kim et al. |
| 2005/0216752 A1 | 9/2005 | Hofmeyr et al. |
| 2005/0223412 A1 | 10/2005 | Nadalin et al. |
| 2005/0227773 A1 | 10/2005 | Lu et al. |
| 2005/0243912 A1 | 11/2005 | Kwon et al. |
| 2005/0254508 A1 | 11/2005 | Aksu et al. |
| 2005/0262257 A1 | 11/2005 | Major et al. |
| 2005/0265555 A1 | 12/2005 | Pippuri |
| 2005/0273695 A1 | 12/2005 | Schnurr |
| 2005/0275656 A1 | 12/2005 | Corbin et al. |
| 2006/0013568 A1 | 1/2006 | Rodriguez |
| 2006/0015580 A1 | 1/2006 | Gabriel et al. |
| 2006/0015813 A1 | 1/2006 | Chung et al. |
| 2006/0020825 A1 | 1/2006 | Grab |
| 2006/0026294 A1 | 2/2006 | Virdi et al. |
| 2006/0026302 A1 | 2/2006 | Bennett et al. |
| 2006/0026654 A1 | 2/2006 | An et al. |
| 2006/0036549 A1 | 2/2006 | Wu |
| 2006/0037057 A1 | 2/2006 | Xu |
| 2006/0039481 A1 | 2/2006 | Shen et al. |
| 2006/0052095 A1 | 3/2006 | Vazvan |
| 2006/0053080 A1 | 3/2006 | Edmonson et al. |
| 2006/0059223 A1 | 3/2006 | Klemets et al. |
| 2006/0064605 A1 | 3/2006 | Giobbi |
| 2006/0078301 A1 | 4/2006 | Ikeda et al. |
| 2006/0093318 A1 | 5/2006 | Cohen et al. |
| 2006/0093320 A1 | 5/2006 | Hallberg et al. |
| 2006/0095472 A1 | 5/2006 | Krikorian et al. |
| 2006/0109856 A1 | 5/2006 | Deshpande |
| 2006/0120378 A1 | 6/2006 | Usuki et al. |
| 2006/0126717 A1 | 6/2006 | Boyce et al. |
| 2006/0129909 A1 | 6/2006 | Butt et al. |
| 2006/0165163 A1 | 7/2006 | Burazerovic et al. |
| 2006/0165233 A1 | 7/2006 | Nonaka et al. |
| 2006/0168298 A1 | 7/2006 | Aoki et al. |
| 2006/0168639 A1 | 7/2006 | Gan et al. |
| 2006/0173887 A1 | 8/2006 | Breitfeld et al. |
| 2006/0179239 A1 | 8/2006 | Fluhr et al. |
| 2006/0181965 A1 | 8/2006 | Collart |
| 2006/0193474 A1 | 8/2006 | Fransdonk |
| 2006/0210245 A1 | 9/2006 | Mccrossan et al. |
| 2006/0212370 A1 | 9/2006 | Shear et al. |
| 2006/0218251 A1 | 9/2006 | Tanabe |
| 2006/0235880 A1 | 10/2006 | Qian |
| 2006/0235883 A1 | 10/2006 | Krebs |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2006/0294164 A1 | 12/2006 | Armangau et al. |
| 2007/0005333 A1 | 1/2007 | Setiohardjo et al. |
| 2007/0024706 A1 | 2/2007 | Brannon, Jr. et al. |
| 2007/0031110 A1 | 2/2007 | Rijckaert |
| 2007/0033419 A1 | 2/2007 | Kocher et al. |
| 2007/0044010 A1 | 2/2007 | Sull et al. |
| 2007/0047645 A1 | 3/2007 | Takashima |
| 2007/0047901 A1 | 3/2007 | Ando et al. |
| 2007/0053293 A1 | 3/2007 | Mcdonald et al. |
| 2007/0053513 A1 | 3/2007 | Hoffberg |
| 2007/0055982 A1 | 3/2007 | Spilo |
| 2007/0058928 A1 | 3/2007 | Naito et al. |
| 2007/0061595 A1 | 3/2007 | Chen |
| 2007/0067472 A1 | 3/2007 | Maertens et al. |
| 2007/0067622 A1 | 3/2007 | Nakano et al. |
| 2007/0083467 A1 | 4/2007 | Lindahl et al. |
| 2007/0083617 A1 | 4/2007 | Chakrabarti et al. |
| 2007/0086528 A1 | 4/2007 | Mauchly et al. |
| 2007/0100757 A1 | 5/2007 | Rhoads |
| 2007/0101271 A1 | 5/2007 | Hua et al. |
| 2007/0101387 A1 | 5/2007 | Hua et al. |
| 2007/0106863 A1 | 5/2007 | Bonwick et al. |
| 2007/0133603 A1 | 6/2007 | Weaver |
| 2007/0136817 A1 | 6/2007 | Nguyen |
| 2007/0140647 A1 | 6/2007 | Kusunoki et al. |
| 2007/0154165 A1 | 7/2007 | Deleersnijder et al. |
| 2007/0156770 A1 | 7/2007 | Espelien |
| 2007/0157267 A1 | 7/2007 | Lopez-Estrada |
| 2007/0162568 A1 | 7/2007 | Gupta et al. |
| 2007/0162981 A1 | 7/2007 | Morioka et al. |
| 2007/0166000 A1 | 7/2007 | Nallur et al. |
| 2007/0168541 A1 | 7/2007 | Gupta et al. |
| 2007/0168542 A1 | 7/2007 | Gupta et al. |
| 2007/0178933 A1 | 8/2007 | Nelson |
| 2007/0180051 A1 | 8/2007 | Kelly et al. |
| 2007/0180125 A1 | 8/2007 | Knowles et al. |
| 2007/0185982 A1 | 8/2007 | Nakanowatari et al. |
| 2007/0192810 A1 | 8/2007 | Pritchett et al. |
| 2007/0201502 A1 | 8/2007 | Abramson |
| 2007/0201695 A1 | 8/2007 | Saarikivi |
| 2007/0204003 A1 | 8/2007 | Abramson |
| 2007/0204011 A1 | 8/2007 | Shaver et al. |
| 2007/0204115 A1 | 8/2007 | Abramson |
| 2007/0217339 A1 | 9/2007 | Zhao |
| 2007/0217759 A1 | 9/2007 | Dodd |
| 2007/0220118 A1 | 9/2007 | Loyer |
| 2007/0234391 A1 | 10/2007 | Hunter et al. |
| 2007/0239839 A1 | 10/2007 | Buday et al. |
| 2007/0250536 A1 | 10/2007 | Tanaka et al. |
| 2007/0255940 A1 | 11/2007 | Ueno |
| 2007/0256141 A1 | 11/2007 | Nakano et al. |
| 2007/0271317 A1 | 11/2007 | Carmel et al. |
| 2007/0271385 A1 | 11/2007 | Davis et al. |
| 2007/0271830 A1 | 11/2007 | Holt et al. |
| 2007/0274679 A1 | 11/2007 | Yahata et al. |
| 2007/0277219 A1 | 11/2007 | Toebes et al. |
| 2007/0277234 A1 | 11/2007 | Bessonov et al. |
| 2007/0280298 A1 | 12/2007 | Hearn et al. |
| 2007/0288745 A1 | 12/2007 | Kwan |
| 2007/0292107 A1 | 12/2007 | Yahata et al. |
| 2007/0297422 A1 | 12/2007 | Matsuo et al. |
| 2008/0005175 A1 | 1/2008 | Bourke et al. |
| 2008/0008319 A1 | 1/2008 | Poirier |
| 2008/0008455 A1 | 1/2008 | De Lange et al. |
| 2008/0022005 A1 | 1/2008 | Wu et al. |
| 2008/0030614 A1 | 2/2008 | Schwab et al. |
| 2008/0043832 A1 | 2/2008 | Barkley et al. |
| 2008/0046718 A1 | 2/2008 | Grab et al. |
| 2008/0046925 A1 | 2/2008 | Lee et al. |
| 2008/0052306 A1 | 2/2008 | Wang et al. |
| 2008/0066099 A1 | 3/2008 | Brodersen et al. |
| 2008/0066181 A1 | 3/2008 | Haveson et al. |
| 2008/0077592 A1 | 3/2008 | Brodie et al. |
| 2008/0086456 A1 | 4/2008 | Rasanen et al. |
| 2008/0086570 A1 | 4/2008 | Dey et al. |
| 2008/0086747 A1 | 4/2008 | Rasanen et al. |
| 2008/0101466 A1 | 5/2008 | Swenson et al. |
| 2008/0101718 A1 | 5/2008 | Yang et al. |
| 2008/0104633 A1 | 5/2008 | Noblecourt et al. |
| 2008/0120330 A1 | 5/2008 | Reed et al. |
| 2008/0120342 A1 | 5/2008 | Reed et al. |
| 2008/0120389 A1 | 5/2008 | Bassali et al. |
| 2008/0120637 A1 | 5/2008 | Deiss |
| 2008/0126248 A1 | 5/2008 | Lee et al. |
| 2008/0131078 A1 | 6/2008 | Jeong et al. |
| 2008/0134043 A1 | 6/2008 | Georgis |
| 2008/0137541 A1 | 6/2008 | Agarwal et al. |
| 2008/0137736 A1 | 6/2008 | Richardson et al. |
| 2008/0137847 A1 | 6/2008 | Candelore et al. |
| 2008/0137848 A1 | 6/2008 | Kocher et al. |
| 2008/0151817 A1 | 6/2008 | Fitchett |
| 2008/0155615 A1 | 6/2008 | Craner et al. |
| 2008/0160911 A1 | 7/2008 | Chou et al. |
| 2008/0162949 A1 | 7/2008 | Sato et al. |
| 2008/0168516 A1 | 7/2008 | Flick et al. |
| 2008/0172441 A1 | 7/2008 | Speicher et al. |
| 2008/0177793 A1 | 7/2008 | Epstein et al. |
| 2008/0184119 A1 | 7/2008 | Eyal et al. |
| 2008/0187283 A1 | 8/2008 | Takahashi |
| 2008/0192818 A1 | 8/2008 | DiPietro et al. |
| 2008/0195664 A1 | 8/2008 | Maharajh et al. |

(56) References Cited

U.S. PATENT DOCUMENTS

| | | |
|---|---|---|
| 2008/0195744 A1 | 8/2008 | Bowra et al. |
| 2008/0196076 A1 | 8/2008 | Shatz et al. |
| 2008/0201705 A1 | 8/2008 | Wookey |
| 2008/0205860 A1 | 8/2008 | Holtman |
| 2008/0209534 A1 | 8/2008 | Keronen et al. |
| 2008/0219449 A1 | 9/2008 | Ball et al. |
| 2008/0229025 A1 | 9/2008 | Plamondon |
| 2008/0240144 A1 | 10/2008 | Kruse et al. |
| 2008/0253454 A1 | 10/2008 | Imamura et al. |
| 2008/0256105 A1 | 10/2008 | Nogawa et al. |
| 2008/0263354 A1 | 10/2008 | Beuque et al. |
| 2008/0266522 A1 | 10/2008 | Weisgerber |
| 2008/0271102 A1 | 10/2008 | Kienzle et al. |
| 2008/0279535 A1 | 11/2008 | Haque et al. |
| 2008/0294453 A1 | 11/2008 | Baird-Smith et al. |
| 2008/0298358 A1 | 12/2008 | John et al. |
| 2008/0310454 A1 | 12/2008 | Bellwood et al. |
| 2008/0310496 A1 | 12/2008 | Fang |
| 2008/0313541 A1 | 12/2008 | Shafton et al. |
| 2008/0320100 A1 | 12/2008 | Pantos et al. |
| 2008/0320160 A1 | 12/2008 | Sitaraman et al. |
| 2009/0006302 A1 | 1/2009 | Chen |
| 2009/0010429 A1 | 1/2009 | Kim et al. |
| 2009/0010622 A1 | 1/2009 | Yahata et al. |
| 2009/0013195 A1 | 1/2009 | Ochi et al. |
| 2009/0031220 A1 | 1/2009 | Tranchant et al. |
| 2009/0037959 A1 | 2/2009 | Suh et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0064341 A1 | 3/2009 | Hartung et al. |
| 2009/0066839 A1 | 3/2009 | Jung et al. |
| 2009/0067367 A1 | 3/2009 | Buracchini et al. |
| 2009/0077143 A1 | 3/2009 | Macy, Jr. |
| 2009/0097644 A1 | 4/2009 | Haruki |
| 2009/0106082 A1 | 4/2009 | Senti et al. |
| 2009/0116821 A1 | 5/2009 | Shibamiya et al. |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0136216 A1 | 5/2009 | Soroushian et al. |
| 2009/0138570 A1 | 5/2009 | Miura et al. |
| 2009/0150406 A1 | 6/2009 | Giblin |
| 2009/0150557 A1 | 6/2009 | Wormley et al. |
| 2009/0165148 A1 | 6/2009 | Frey et al. |
| 2009/0168795 A1 | 7/2009 | Segel et al. |
| 2009/0169001 A1 | 7/2009 | Tighe et al. |
| 2009/0169181 A1 | 7/2009 | Priyadarshi et al. |
| 2009/0172201 A1 | 7/2009 | Carmel et al. |
| 2009/0178090 A1 | 7/2009 | Oztaskent |
| 2009/0196139 A1 | 8/2009 | Bates et al. |
| 2009/0201988 A1 | 8/2009 | Gazier et al. |
| 2009/0217317 A1 | 8/2009 | White et al. |
| 2009/0226148 A1 | 9/2009 | Nesvadba et al. |
| 2009/0228395 A1 | 9/2009 | Wegner et al. |
| 2009/0249081 A1 | 10/2009 | Zayas |
| 2009/0265737 A1 | 10/2009 | Issa et al. |
| 2009/0268905 A1 | 10/2009 | Matsushima et al. |
| 2009/0276636 A1 | 11/2009 | Grab et al. |
| 2009/0282162 A1 | 11/2009 | Mehrotra et al. |
| 2009/0290706 A1* | 11/2009 | Amini ................ H04L 65/1101 380/42 |
| 2009/0290708 A1 | 11/2009 | Schneider et al. |
| 2009/0293116 A1 | 11/2009 | DeMello |
| 2009/0300204 A1 | 12/2009 | Zhang et al. |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310819 A1 | 12/2009 | Hatano |
| 2009/0310933 A1 | 12/2009 | Lee |
| 2009/0313544 A1 | 12/2009 | Wood et al. |
| 2009/0313564 A1 | 12/2009 | Rottler et al. |
| 2009/0316783 A1 | 12/2009 | Au et al. |
| 2009/0328124 A1 | 12/2009 | Khouzam et al. |
| 2009/0328228 A1 | 12/2009 | Schnell |
| 2010/0002069 A1 | 1/2010 | Eleftheriadis et al. |
| 2010/0005393 A1 | 1/2010 | Tokashiki et al. |
| 2010/0040351 A1 | 2/2010 | Toma et al. |
| 2010/0057928 A1 | 3/2010 | Kapoor et al. |
| 2010/0058061 A1 | 3/2010 | Folta et al. |
| 2010/0058405 A1 | 3/2010 | Ramakrishnan et al. |
| 2010/0074324 A1 | 3/2010 | Qian et al. |
| 2010/0074333 A1 | 3/2010 | Au et al. |
| 2010/0082970 A1 | 4/2010 | Lindahl et al. |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0106968 A1 | 4/2010 | Mori et al. |
| 2010/0107260 A1 | 4/2010 | Orrell et al. |
| 2010/0111192 A1 | 5/2010 | Graves |
| 2010/0138903 A1 | 6/2010 | Medvinsky |
| 2010/0142915 A1 | 6/2010 | Mcdermott et al. |
| 2010/0142917 A1 | 6/2010 | Isaji |
| 2010/0158109 A1 | 6/2010 | Dahlby et al. |
| 2010/0161825 A1 | 6/2010 | Ronca et al. |
| 2010/0166060 A1 | 7/2010 | Ezure et al. |
| 2010/0185854 A1 | 7/2010 | Burns et al. |
| 2010/0186092 A1 | 7/2010 | Takechi et al. |
| 2010/0189183 A1 | 7/2010 | Gu et al. |
| 2010/0198943 A1 | 8/2010 | Harrang et al. |
| 2010/0218208 A1 | 8/2010 | Holden |
| 2010/0228795 A1 | 9/2010 | Hahn |
| 2010/0235472 A1 | 9/2010 | Sood et al. |
| 2010/0235528 A1 | 9/2010 | Bocharov et al. |
| 2010/0250532 A1 | 9/2010 | Soroushian et al. |
| 2010/0262712 A1 | 10/2010 | Kim et al. |
| 2010/0278271 A1 | 11/2010 | MacInnis |
| 2010/0290761 A1 | 11/2010 | Drake et al. |
| 2010/0299522 A1 | 11/2010 | Khambete et al. |
| 2010/0306249 A1 | 12/2010 | Hill et al. |
| 2010/0313225 A1 | 12/2010 | Cholas et al. |
| 2010/0313226 A1 | 12/2010 | Cholas et al. |
| 2010/0316126 A1 | 12/2010 | Chen et al. |
| 2010/0319014 A1 | 12/2010 | Lockett et al. |
| 2010/0319017 A1 | 12/2010 | Cook |
| 2010/0332595 A1 | 12/2010 | Fullagar et al. |
| 2011/0002381 A1 | 1/2011 | Yang et al. |
| 2011/0010466 A1 | 1/2011 | Fan et al. |
| 2011/0016225 A1 | 1/2011 | Park et al. |
| 2011/0022432 A1 | 1/2011 | Ishida et al. |
| 2011/0035517 A1 | 2/2011 | Minnick et al. |
| 2011/0047209 A1 | 2/2011 | Lindholm et al. |
| 2011/0055585 A1 | 3/2011 | Lee |
| 2011/0058675 A1 | 3/2011 | Brueck et al. |
| 2011/0060808 A1 | 3/2011 | Martin et al. |
| 2011/0066673 A1 | 3/2011 | Outlaw |
| 2011/0067057 A1 | 3/2011 | Karaoguz et al. |
| 2011/0078440 A1 | 3/2011 | Feng et al. |
| 2011/0080940 A1 | 4/2011 | Bocharov |
| 2011/0082914 A1 | 4/2011 | Robert et al. |
| 2011/0082924 A1 | 4/2011 | Gopalakrishnan |
| 2011/0083009 A1 | 4/2011 | Shamoon et al. |
| 2011/0096828 A1 | 4/2011 | Chen et al. |
| 2011/0099594 A1 | 4/2011 | Chen et al. |
| 2011/0103374 A1 | 5/2011 | Lajoie et al. |
| 2011/0107379 A1 | 5/2011 | Lajoie et al. |
| 2011/0116627 A1 | 5/2011 | Deng |
| 2011/0116772 A1 | 5/2011 | Kwon et al. |
| 2011/0126104 A1 | 5/2011 | Woods et al. |
| 2011/0126191 A1 | 5/2011 | Hughes et al. |
| 2011/0129011 A1 | 6/2011 | Cilli et al. |
| 2011/0135090 A1 | 6/2011 | Chan et al. |
| 2011/0138018 A1 | 6/2011 | Raveendran et al. |
| 2011/0142415 A1 | 6/2011 | Rhyu |
| 2011/0145726 A1 | 6/2011 | Wei et al. |
| 2011/0145858 A1 | 6/2011 | Philpott et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0153835 A1 | 6/2011 | Rimac et al. |
| 2011/0158470 A1 | 6/2011 | Martin et al. |
| 2011/0164679 A1 | 7/2011 | Satou et al. |
| 2011/0170408 A1 | 7/2011 | Furbeck et al. |
| 2011/0170687 A1 | 7/2011 | Hyodo et al. |

(56) References Cited

U.S. PATENT DOCUMENTS

| | | |
|---|---|---|
| 2011/0173345 A1 | 7/2011 | Knox et al. |
| 2011/0179185 A1 | 7/2011 | Wang et al. |
| 2011/0184738 A1 | 7/2011 | Kalisky et al. |
| 2011/0191439 A1 | 8/2011 | Dazzi et al. |
| 2011/0191803 A1 | 8/2011 | Baldwin et al. |
| 2011/0197237 A1 | 8/2011 | Turner |
| 2011/0197261 A1 | 8/2011 | Dong et al. |
| 2011/0197267 A1 | 8/2011 | Gravel et al. |
| 2011/0213827 A1 | 9/2011 | Kaspar et al. |
| 2011/0222786 A1 | 9/2011 | Carmel et al. |
| 2011/0225302 A1 | 9/2011 | Park et al. |
| 2011/0225315 A1 | 9/2011 | Wexler et al. |
| 2011/0225417 A1 | 9/2011 | Maharajh et al. |
| 2011/0235801 A1* | 9/2011 | Peterka .............. H04N 21/2347 380/277 |
| 2011/0238789 A1 | 9/2011 | Luby et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0246661 A1 | 10/2011 | Manzari et al. |
| 2011/0252118 A1 | 10/2011 | Pantos et al. |
| 2011/0264530 A1 | 10/2011 | Santangelo et al. |
| 2011/0268178 A1 | 11/2011 | Park et al. |
| 2011/0276555 A1 | 11/2011 | Fiero |
| 2011/0276695 A1 | 11/2011 | Maldaner et al. |
| 2011/0280307 A1 | 11/2011 | MacInnis et al. |
| 2011/0283012 A1 | 11/2011 | Melnyk |
| 2011/0291723 A1 | 12/2011 | Hashimoto |
| 2011/0296048 A1 | 12/2011 | Knox et al. |
| 2011/0302319 A1 | 12/2011 | Ha et al. |
| 2011/0305273 A1 | 12/2011 | He et al. |
| 2011/0314130 A1 | 12/2011 | Strasman |
| 2011/0314176 A1 | 12/2011 | Frojdh et al. |
| 2011/0314500 A1 | 12/2011 | Gordon |
| 2012/0005312 A1 | 1/2012 | Mcgowan et al. |
| 2012/0005368 A1 | 1/2012 | Knittle et al. |
| 2012/0017282 A1 | 1/2012 | Kang et al. |
| 2012/0023251 A1 | 1/2012 | Pyle et al. |
| 2012/0036365 A1 | 2/2012 | Kyslov et al. |
| 2012/0036544 A1 | 2/2012 | Chen et al. |
| 2012/0042090 A1 | 2/2012 | Chen et al. |
| 2012/0047542 A1 | 2/2012 | Lewis et al. |
| 2012/0066360 A1 | 3/2012 | Ghosh |
| 2012/0093214 A1 | 4/2012 | Urbach |
| 2012/0110120 A1 | 5/2012 | Willig et al. |
| 2012/0114302 A1 | 5/2012 | Randall |
| 2012/0124191 A1 | 5/2012 | Lyon |
| 2012/0134496 A1 | 5/2012 | Farkash et al. |
| 2012/0137336 A1 | 5/2012 | Applegate et al. |
| 2012/0144117 A1 | 6/2012 | Weare et al. |
| 2012/0144445 A1 | 6/2012 | Bonta et al. |
| 2012/0147958 A1 | 6/2012 | Ronca et al. |
| 2012/0155639 A1* | 6/2012 | Oney .............. H04N 21/63345 380/42 |
| 2012/0166633 A1 | 6/2012 | Baumback et al. |
| 2012/0167132 A1 | 6/2012 | Mathews et al. |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | Van Der Schaar |
| 2012/0179834 A1 | 7/2012 | Van Der Schaar et al. |
| 2012/0188069 A1 | 7/2012 | Colombo et al. |
| 2012/0189069 A1 | 7/2012 | Tannuzzelli et al. |
| 2012/0201475 A1 | 8/2012 | Carmel et al. |
| 2012/0201476 A1 | 8/2012 | Carmel et al. |
| 2012/0233345 A1 | 9/2012 | Hannuksela |
| 2012/0240176 A1 | 9/2012 | Ma et al. |
| 2012/0254455 A1 | 10/2012 | Adimatyam et al. |
| 2012/0257678 A1 | 10/2012 | Zhou et al. |
| 2012/0260277 A1 | 10/2012 | Kosciewicz |
| 2012/0263434 A1 | 10/2012 | Wainner et al. |
| 2012/0265562 A1 | 10/2012 | Daouk et al. |
| 2012/0278496 A1 | 11/2012 | Hsu |
| 2012/0281767 A1 | 11/2012 | Duenas et al. |
| 2012/0289147 A1 | 11/2012 | Raleigh et al. |
| 2012/0294355 A1 | 11/2012 | Holcomb et al. |
| 2012/0297039 A1 | 11/2012 | Acuna et al. |
| 2012/0307883 A1 | 12/2012 | Graves |
| 2012/0311094 A1 | 12/2012 | Biderman et al. |
| 2012/0311174 A1 | 12/2012 | Bichot et al. |
| 2012/0314778 A1 | 12/2012 | Salustri et al. |
| 2012/0317235 A1 | 12/2012 | Nguyen et al. |
| 2012/0331167 A1 | 12/2012 | Hunt |
| 2013/0007223 A1 | 1/2013 | Luby et al. |
| 2013/0013730 A1 | 1/2013 | Li et al. |
| 2013/0013803 A1 | 1/2013 | Bichot et al. |
| 2013/0019107 A1 | 1/2013 | Grab et al. |
| 2013/0019273 A1 | 1/2013 | Ma et al. |
| 2013/0041808 A1 | 2/2013 | Pham et al. |
| 2013/0044821 A1 | 2/2013 | Braness et al. |
| 2013/0046849 A1 | 2/2013 | Wolf |
| 2013/0046902 A1 | 2/2013 | Villegas Nuñez et al. |
| 2013/0051554 A1 | 2/2013 | Braness et al. |
| 2013/0051767 A1 | 2/2013 | Soroushian et al. |
| 2013/0051768 A1 | 2/2013 | Soroushian et al. |
| 2013/0054958 A1 | 2/2013 | Braness et al. |
| 2013/0055084 A1 | 2/2013 | Soroushian et al. |
| 2013/0058393 A1 | 3/2013 | Soroushian |
| 2013/0058480 A1 | 3/2013 | Ziskind |
| 2013/0061040 A1 | 3/2013 | Kiefer et al. |
| 2013/0061045 A1 | 3/2013 | Kiefer et al. |
| 2013/0064466 A1 | 3/2013 | Carmel et al. |
| 2013/0066838 A1 | 3/2013 | Singla et al. |
| 2013/0080267 A1 | 3/2013 | McGowan |
| 2013/0094565 A1 | 4/2013 | Yang et al. |
| 2013/0097309 A1 | 4/2013 | Ma et al. |
| 2013/0114944 A1 | 5/2013 | Soroushian et al. |
| 2013/0124859 A1 | 5/2013 | Pestoni et al. |
| 2013/0128962 A1 | 5/2013 | Rajagopalan et al. |
| 2013/0152767 A1 | 6/2013 | Katz et al. |
| 2013/0159633 A1 | 6/2013 | Lilly |
| 2013/0166580 A1 | 6/2013 | Maharajh |
| 2013/0166765 A1 | 6/2013 | Kaufman |
| 2013/0166906 A1 | 6/2013 | Swaminathan et al. |
| 2013/0169863 A1 | 7/2013 | Smith |
| 2013/0170561 A1 | 7/2013 | Hannuksela |
| 2013/0170764 A1 | 7/2013 | Carmel et al. |
| 2013/0173513 A1 | 7/2013 | Chu et al. |
| 2013/0179199 A1 | 7/2013 | Ziskind et al. |
| 2013/0179589 A1 | 7/2013 | Mccarthy et al. |
| 2013/0179992 A1 | 7/2013 | Ziskind et al. |
| 2013/0182842 A1 | 7/2013 | Fasoli et al. |
| 2013/0182952 A1 | 7/2013 | Carmel et al. |
| 2013/0196292 A1 | 8/2013 | Brennen et al. |
| 2013/0212228 A1 | 8/2013 | Butler et al. |
| 2013/0223812 A1 | 8/2013 | Rossi |
| 2013/0226578 A1 | 8/2013 | Bolton et al. |
| 2013/0226635 A1 | 8/2013 | Fisher |
| 2013/0227081 A1 | 8/2013 | Luby et al. |
| 2013/0227111 A1 | 8/2013 | Wright et al. |
| 2013/0227122 A1 | 8/2013 | Gao et al. |
| 2013/0297602 A1 | 11/2013 | Soroushian et al. |
| 2013/0301424 A1 | 11/2013 | Kotecha et al. |
| 2013/0311670 A1 | 11/2013 | Tarbox et al. |
| 2013/0329781 A1 | 12/2013 | Su et al. |
| 2014/0003516 A1 | 1/2014 | Soroushian |
| 2014/0019592 A1 | 1/2014 | Arana et al. |
| 2014/0019593 A1 | 1/2014 | Reznik et al. |
| 2014/0037620 A1 | 2/2014 | Ferree et al. |
| 2014/0052823 A1 | 2/2014 | Gavade et al. |
| 2014/0059156 A1 | 2/2014 | Freeman et al. |
| 2014/0096171 A1 | 4/2014 | Shivadas et al. |
| 2014/0101722 A1 | 4/2014 | Moore |
| 2014/0114951 A1 | 4/2014 | Sasaki et al. |
| 2014/0115650 A1 | 4/2014 | Zhang et al. |
| 2014/0119432 A1 | 5/2014 | Wang et al. |
| 2014/0140253 A1 | 5/2014 | Lohmar et al. |
| 2014/0140396 A1 | 5/2014 | Wang et al. |
| 2014/0140417 A1 | 5/2014 | Shaffer et al. |
| 2014/0143301 A1 | 5/2014 | Watson et al. |
| 2014/0143431 A1 | 5/2014 | Watson et al. |
| 2014/0143440 A1 | 5/2014 | Ramamurthy et al. |

(56) References Cited

U.S. PATENT DOCUMENTS

| | | |
|---|---|---|
| 2014/0149557 A1 | 5/2014 | Lohmar et al. |
| 2014/0177734 A1 | 6/2014 | Carmel et al. |
| 2014/0189065 A1 | 7/2014 | van der Schaar et al. |
| 2014/0201382 A1 | 7/2014 | Shivadas et al. |
| 2014/0211840 A1 | 7/2014 | Butt et al. |
| 2014/0211859 A1 | 7/2014 | Carmel et al. |
| 2014/0241420 A1 | 8/2014 | Orton-jay et al. |
| 2014/0241421 A1 | 8/2014 | Orton-jay et al. |
| 2014/0247869 A1 | 9/2014 | Su et al. |
| 2014/0250473 A1 | 9/2014 | Braness et al. |
| 2014/0258714 A1 | 9/2014 | Grab |
| 2014/0269927 A1 | 9/2014 | Naletov et al. |
| 2014/0269936 A1 | 9/2014 | Shivadas et al. |
| 2014/0280763 A1 | 9/2014 | Grab et al. |
| 2014/0297804 A1 | 10/2014 | Shivadas et al. |
| 2014/0297881 A1 | 10/2014 | Shivadas et al. |
| 2014/0355668 A1 | 12/2014 | Shoham et al. |
| 2014/0355958 A1 | 12/2014 | Soroushian et al. |
| 2014/0359678 A1 | 12/2014 | Shivadas et al. |
| 2014/0359679 A1 | 12/2014 | Shivadas et al. |
| 2014/0359680 A1 | 12/2014 | Shivadas et al. |
| 2014/0376720 A1 | 12/2014 | Chan et al. |
| 2015/0006662 A1 | 1/2015 | Braness |
| 2015/0019550 A1 | 1/2015 | Maharajh et al. |
| 2015/0026677 A1 | 1/2015 | Stevens et al. |
| 2015/0043554 A1 | 2/2015 | Meylan et al. |
| 2015/0049957 A1 | 2/2015 | Shoham et al. |
| 2015/0063693 A1 | 3/2015 | Carmel et al. |
| 2015/0067715 A1 | 3/2015 | Koat et al. |
| 2015/0104153 A1 | 4/2015 | Braness et al. |
| 2015/0117836 A1 | 4/2015 | Amidei et al. |
| 2015/0117837 A1 | 4/2015 | Amidei et al. |
| 2015/0139419 A1 | 5/2015 | Kiefer et al. |
| 2015/0188758 A1 | 7/2015 | Amidei et al. |
| 2015/0188842 A1 | 7/2015 | Amidei et al. |
| 2015/0188921 A1 | 7/2015 | Amidei et al. |
| 2015/0189017 A1 | 7/2015 | Amidei et al. |
| 2015/0189373 A1 | 7/2015 | Amidei et al. |
| 2015/0281310 A1 | 10/2015 | Ziskind et al. |
| 2015/0288530 A1 | 10/2015 | Oyman |
| 2015/0288996 A1 | 10/2015 | Van Der Schaar et al. |
| 2015/0334435 A1 | 11/2015 | Shivadas et al. |
| 2015/0373421 A1 | 12/2015 | Chan et al. |
| 2016/0048593 A1 | 2/2016 | Soroushian et al. |
| 2016/0070890 A1 | 3/2016 | Grab et al. |
| 2016/0112382 A1 | 4/2016 | Kiefer et al. |
| 2016/0149981 A1 | 5/2016 | Shivadas et al. |
| 2016/0219303 A1 | 7/2016 | Braness et al. |
| 2016/0323342 A1 | 11/2016 | Luby et al. |
| 2017/0011055 A1 | 1/2017 | Pitts |
| 2017/0026445 A1 | 1/2017 | Soroushian et al. |
| 2017/0041604 A1 | 2/2017 | Soroushian et al. |
| 2017/0083474 A1 | 3/2017 | Meswani et al. |
| 2017/0214947 A1 | 7/2017 | Kiefer et al. |
| 2017/0223389 A1 | 8/2017 | Soroushian et al. |
| 2017/0238030 A1 | 8/2017 | Ziskind et al. |
| 2017/0280203 A1 | 9/2017 | Chan et al. |
| 2018/0007451 A1 | 1/2018 | Shivadas et al. |
| 2018/0046949 A1 | 2/2018 | Kahn et al. |
| 2018/0060543 A1 | 3/2018 | Grab et al. |
| 2018/0081548 A1 | 3/2018 | Barzik et al. |
| 2018/0131980 A1 | 5/2018 | Van Der Schaar et al. |
| 2018/0220153 A1 | 8/2018 | Braness et al. |
| 2018/0255366 A1 | 9/2018 | Lockett et al. |
| 2018/0262757 A1 | 9/2018 | Naletov et al. |
| 2018/0278975 A1 | 9/2018 | Soroushian |
| 2018/0285261 A1 | 10/2018 | Mandal et al. |
| 2018/0332094 A1 | 11/2018 | Braness |
| 2019/0020907 A1 | 1/2019 | Kiefer et al. |
| 2019/0020928 A1 | 1/2019 | Chan et al. |
| 2019/0045219 A1 | 2/2019 | Braness et al. |
| 2019/0045220 A1 | 2/2019 | Braness et al. |
| 2019/0045234 A1 | 2/2019 | Kiefer et al. |
| 2019/0158553 A1 | 5/2019 | Van Der Schaar et al. |
| 2019/0268596 A1 | 8/2019 | Naletov et al. |
| 2019/0297364 A1 | 9/2019 | van der Schaar et al. |
| 2019/0342587 A1 | 11/2019 | Kiefer et al. |
| 2019/0356928 A1 | 11/2019 | Braness et al. |
| 2020/0059706 A1 | 2/2020 | Shivadas et al. |
| 2020/0137460 A1 | 4/2020 | Chan et al. |
| 2020/0186854 A1 | 6/2020 | Soroushian |
| 2020/0396451 A1 | 12/2020 | Soroushian et al. |
| 2020/0396454 A1 | 12/2020 | Naletov et al. |
| 2021/0021662 A1 | 1/2021 | Soroushian et al. |
| 2021/0076082 A1 | 3/2021 | Kiefer et al. |
| 2021/0099504 A1 | 4/2021 | Van Der Schaar et al. |
| 2021/0136429 A1 | 5/2021 | Van Der Schaar et al. |
| 2021/0250608 A1 | 8/2021 | Braness et al. |
| 2021/0250627 A1 | 8/2021 | Soroushian |
| 2021/0256095 A1 | 8/2021 | Grab et al. |
| 2021/0329347 A1 | 10/2021 | Chan et al. |
| 2023/0179837 A1 | 6/2023 | Shivadas et al. |

FOREIGN PATENT DOCUMENTS

| | | |
|---|---|---|
| CA | 2749170 A1 | 7/2010 |
| CA | 2749170 C | 6/2016 |
| CA | 2823829 C | 1/2019 |
| CN | 1169229 A | 12/1997 |
| CN | 1221284 A | 6/1999 |
| CN | 1235473 A | 11/1999 |
| CN | 1629939 A | 6/2005 |
| CN | 1662952 A | 8/2005 |
| CN | 1723696 A | 1/2006 |
| CN | 1756359 A | 4/2006 |
| CN | 1787422 A | 6/2006 |
| CN | 101252401 A | 8/2008 |
| CN | 101461149 A | 6/2009 |
| CN | 102138327 A | 7/2011 |
| CN | 102549557 A | 7/2012 |
| CN | 103858419 A | 6/2014 |
| CN | 103875248 A | 6/2014 |
| CN | 102549557 B | 9/2015 |
| CN | 105072454 A | 11/2015 |
| CN | 103875248 B | 9/2018 |
| CN | 108989847 A | 12/2018 |
| CN | 105072454 B | 4/2019 |
| CN | 108989847 B | 3/2021 |
| EP | 757484 A2 | 2/1997 |
| EP | 813167 A2 | 12/1997 |
| EP | 0818111 A1 | 1/1998 |
| EP | 0936812 A1 | 8/1999 |
| EP | 0818111 B1 | 1/2000 |
| EP | 1056273 A2 | 11/2000 |
| EP | 1158799 A1 | 11/2001 |
| EP | 1187483 A2 | 3/2002 |
| EP | 1335603 A2 | 8/2003 |
| EP | 1420580 A1 | 5/2004 |
| EP | 1453319 A1 | 9/2004 |
| EP | 1536646 A1 | 6/2005 |
| EP | 1553779 A1 | 7/2005 |
| EP | 1657835 A1 | 5/2006 |
| EP | 1283640 B1 | 10/2006 |
| EP | 1718074 A1 | 11/2006 |
| EP | 2180664 A1 | 4/2010 |
| EP | 2360923 A1 | 8/2011 |
| EP | 2384475 A1 | 11/2011 |
| EP | 2486517 A1 | 8/2012 |
| EP | 2486727 A1 | 8/2012 |
| EP | 2507995 A1 | 10/2012 |
| EP | 2564354 A1 | 3/2013 |
| EP | 2616991 A0 | 7/2013 |
| EP | 2617192 A0 | 7/2013 |
| EP | 2661696 A1 | 11/2013 |
| EP | 2661875 A1 | 11/2013 |
| EP | 2661895 A2 | 11/2013 |
| EP | 2486727 A4 | 3/2014 |
| EP | 2564354 A4 | 3/2014 |
| EP | 2616991 A4 | 3/2014 |
| EP | 2617192 A4 | 3/2014 |
| EP | 2716048 A1 | 4/2014 |
| EP | 2721826 A1 | 4/2014 |
| EP | 2486517 | 6/2014 |
| EP | 2751990 | 7/2014 |

(56) References Cited

FOREIGN PATENT DOCUMENTS

| | | | |
|---|---|---|---|
| EP | 2807821 | | 12/2014 |
| EP | 2751990 | A4 | 4/2015 |
| EP | 2661875 | B1 | 11/2019 |
| EP | 2661696 | B1 | 5/2020 |
| EP | 3697096 | A1 | 8/2020 |
| EP | 3700219 | A1 | 8/2020 |
| EP | 3742740 | A1 | 11/2020 |
| EP | 3697096 | B1 | 1/2022 |
| EP | 3975574 | A1 | 3/2022 |
| EP | 3742740 | B1 | 5/2022 |
| EP | 4124048 | A1 | 1/2023 |
| GB | 2398210 | A | 8/2004 |
| HK | 1125765 | A | 8/2009 |
| HK | 1195183 | B | 2/2018 |
| HK | 1260329 | A | 12/2019 |
| HK | 1260329 | B | 11/2021 |
| JP | 08046902 | A | 2/1996 |
| JP | 08111842 | A | 4/1996 |
| JP | 08163488 | A | 6/1996 |
| JP | 08287613 | A | 11/1996 |
| JP | 09037225 | A | 2/1997 |
| JP | H1175178 | A | 3/1999 |
| JP | 11164307 | A | 6/1999 |
| JP | 11275576 | A | 10/1999 |
| JP | 11328929 | A | 11/1999 |
| JP | 2000201343 | A | 7/2000 |
| JP | 02001043668 | A | 2/2001 |
| JP | 2001209726 | A | 8/2001 |
| JP | 2001346165 | A | 12/2001 |
| JP | 2002164880 | A | 6/2002 |
| JP | 2002170363 | A | 6/2002 |
| JP | 2002518898 | A | 6/2002 |
| JP | 2002218384 | A | 8/2002 |
| JP | 2003179597 | A | 6/2003 |
| JP | 2003250113 | A | 9/2003 |
| JP | 2004013823 | A | 1/2004 |
| JP | 2004515941 | A | 5/2004 |
| JP | 2004172830 | A | 6/2004 |
| JP | 2004187161 | A | 7/2004 |
| JP | 2004234153 | A | 8/2004 |
| JP | 2004304767 | A | 10/2004 |
| JP | 2004328218 | A | 11/2004 |
| JP | 2005027153 | A | 1/2005 |
| JP | 2005504480 | A | 2/2005 |
| JP | 2005080204 | A | 3/2005 |
| JP | 2005173241 | A | 6/2005 |
| JP | 2005284041 | A | 10/2005 |
| JP | 2005286881 | A | 10/2005 |
| JP | 2006155500 | A | 6/2006 |
| JP | 2006521035 | A | 9/2006 |
| JP | 2006524007 | A | 10/2006 |
| JP | 2007036666 | A | 2/2007 |
| JP | 2007174375 | A | 7/2007 |
| JP | 2007235690 | A | 9/2007 |
| JP | 2007535881 | A | 12/2007 |
| JP | 2008235999 | A | 10/2008 |
| JP | 2009508452 | A | 2/2009 |
| JP | 2009522887 | A | 6/2009 |
| JP | 2009530917 | A | 8/2009 |
| JP | 4516082 | B2 | 5/2010 |
| JP | 2012514951 | A | 6/2012 |
| JP | 2013513298 | A | 4/2013 |
| JP | 5200204 | B2 | 6/2013 |
| JP | 2014506430 | A | 3/2014 |
| JP | 5681641 | B2 | 1/2015 |
| JP | 5723888 | B2 | 5/2015 |
| JP | 2015167357 | A | 9/2015 |
| JP | 6038805 | B2 | 12/2016 |
| JP | 6078574 | B2 | 2/2017 |
| JP | 2017063453 | A | 3/2017 |
| JP | 2018160923 | A | 10/2018 |
| JP | 6453291 | B2 | 1/2019 |
| JP | 6657313 | B2 | 2/2020 |
| JP | 202080551 | A | 5/2020 |
| JP | 2021158694 | A | 10/2021 |
| JP | 7000475 | B2 | 12/2021 |
| KR | 100221423 | B1 | 9/1999 |
| KR | 2002013664 | | 2/2002 |
| KR | 1020020064888 | A | 8/2002 |
| KR | 20040039852 | A | 5/2004 |
| KR | 20060030164 | A | 4/2006 |
| KR | 20060106250 | A | 10/2006 |
| KR | 20060116967 | A | 11/2006 |
| KR | 100669616 | B1 | 1/2007 |
| KR | 20070005699 | A | 1/2007 |
| KR | 20070020727 | A | 2/2007 |
| KR | 20090016282 | A | 2/2009 |
| KR | 20100106418 | A | 10/2010 |
| KR | 20110133024 | A | 12/2011 |
| KR | 1020130133830 | A | 12/2013 |
| KR | 20140056317 | A | 5/2014 |
| KR | 101635876 | B1 | 7/2016 |
| KR | 101874907 | B1 | 7/2018 |
| KR | 101917763 | B1 | 11/2018 |
| KR | 101928910 | B1 | 12/2018 |
| KR | 101936142 | B1 | 1/2019 |
| KR | 101981923 | B1 | 5/2019 |
| KR | 10-1988877 | B1 | 6/2019 |
| KR | 102020764 | B1 | 9/2019 |
| KR | 10-2072839 | B1 | 1/2020 |
| KR | 102074148 | B1 | 1/2020 |
| KR | 102086995 | B1 | 3/2020 |
| KR | 10-2122189 | B1 | 6/2020 |
| KR | 102140339 | B1 | 7/2020 |
| KR | 102163151 | B1 | 9/2020 |
| KR | 102187792 | B1 | 12/2020 |
| KR | 102191317 | B1 | 12/2020 |
| KR | 102195414 | B1 | 12/2020 |
| KR | 102241867 | B1 | 4/2021 |
| KR | 102274290 | B1 | 7/2021 |
| KR | 102352043 | B1 | 1/2022 |
| KR | 102363764 | B1 | 2/2022 |
| KR | 102408120 | B1 | 6/2022 |
| KR | 102414735 | B1 | 6/2022 |
| KR | 102445689 | B1 | 9/2022 |
| MX | 2011007344 | A | 2/2012 |
| MX | 316584 | B | 12/2013 |
| RU | 2328040 | C2 | 6/2008 |
| SG | 146026 | | 12/2010 |
| WO | 1995015660 | A1 | 6/1995 |
| WO | 1996013121 | A1 | 5/1996 |
| WO | 199800973 | A1 | 1/1998 |
| WO | 1997031445 | A3 | 4/1998 |
| WO | 199834405 | A1 | 8/1998 |
| WO | 1998047290 | A1 | 10/1998 |
| WO | 1999010836 | A1 | 3/1999 |
| WO | 1999065239 | A2 | 12/1999 |
| WO | 2000049762 | A2 | 8/2000 |
| WO | 2000049763 | A1 | 8/2000 |
| WO | 0104892 | A1 | 1/2001 |
| WO | 2001031497 | A1 | 5/2001 |
| WO | 2001050732 | A2 | 7/2001 |
| WO | 2001065762 | A2 | 9/2001 |
| WO | 2002001880 | A1 | 1/2002 |
| WO | 2002008948 | A2 | 1/2002 |
| WO | 200223315 | A2 | 3/2002 |
| WO | 2003028293 | A1 | 4/2002 |
| WO | 2002035832 | A2 | 5/2002 |
| WO | 2002037210 | A2 | 5/2002 |
| WO | 2002054196 | A2 | 7/2002 |
| WO | 2002054776 | A1 | 7/2002 |
| WO | 2002073437 | A1 | 9/2002 |
| WO | 2002087241 | A1 | 10/2002 |
| WO | 2003030000 | A1 | 4/2003 |
| WO | 2003046750 | A1 | 6/2003 |
| WO | 2003047262 | A2 | 6/2003 |
| WO | 2003061173 | A1 | 7/2003 |
| WO | 2003096136 | A2 | 11/2003 |
| WO | 2004/012378 | A2 | 2/2004 |
| WO | 2004054247 | A1 | 6/2004 |
| WO | 2004097811 | A1 | 11/2004 |
| WO | 2004100158 | A1 | 11/2004 |
| WO | 2004102571 | A1 | 11/2004 |
| WO | 2005008385 | A2 | 1/2005 |

(56) References Cited

FOREIGN PATENT DOCUMENTS

| | | |
|---|---|---|
| WO | 2005015935 A1 | 2/2005 |
| WO | 2005050373 A2 | 6/2005 |
| WO | 2005057906 A2 | 6/2005 |
| WO | 2005109224 A2 | 11/2005 |
| WO | 2005125214 A2 | 12/2005 |
| WO | 2006018843 A2 | 2/2006 |
| WO | 20060012398 A2 | 2/2006 |
| WO | 2006018843 A3 | 12/2006 |
| WO | 2007044590 A2 | 4/2007 |
| WO | 2007072257 A1 | 6/2007 |
| WO | 2007073347 A1 | 6/2007 |
| WO | 2007093923 A1 | 8/2007 |
| WO | 2007101182 A2 | 9/2007 |
| WO | 2007104887 A2 | 9/2007 |
| WO | 2007113836 A2 | 10/2007 |
| WO | 2008010275 A1 | 1/2008 |
| WO | 2008032908 A1 | 3/2008 |
| WO | 2008042242 A2 | 4/2008 |
| WO | 2008086313 A1 | 7/2008 |
| WO | 2008090859 A1 | 7/2008 |
| WO | 2007113836 A3 | 11/2008 |
| WO | 2008135932 A2 | 11/2008 |
| WO | 2007113836 B1 | 12/2008 |
| WO | 2009006302 A1 | 1/2009 |
| WO | 2009065137 A1 | 5/2009 |
| WO | 2009070770 A1 | 6/2009 |
| WO | 2009109976 A2 | 9/2009 |
| WO | 2010005673 A2 | 1/2010 |
| WO | 2010060106 A1 | 5/2010 |
| WO | 2010080911 A1 | 7/2010 |
| WO | 2010089962 A1 | 8/2010 |
| WO | 2010108053 A1 | 9/2010 |
| WO | 2010111261 A1 | 9/2010 |
| WO | 2010122447 A1 | 10/2010 |
| WO | 2010147878 A1 | 12/2010 |
| WO | 2010150470 A1 | 12/2010 |
| WO | 2011042898 A1 | 4/2011 |
| WO | 2011042900 A1 | 4/2011 |
| WO | 2011053658 A1 | 5/2011 |
| WO | 2011059291 A2 | 5/2011 |
| WO | 2011068668 A1 | 6/2011 |
| WO | 2011086190 A1 | 7/2011 |
| WO | 2011087449 A1 | 7/2011 |
| WO | 2011093835 A1 | 8/2011 |
| WO | 2011101371 A1 | 8/2011 |
| WO | 2011102791 A1 | 8/2011 |
| WO | 2011103364 A1 | 8/2011 |
| WO | 2011132184 A1 | 10/2011 |
| WO | 2011135558 A1 | 11/2011 |
| WO | 2012035533 A2 | 3/2012 |
| WO | 2012035534 A2 | 3/2012 |
| WO | 2012035534 A3 | 7/2012 |
| WO | 2012094171 A1 | 7/2012 |
| WO | 20120094181 A2 | 7/2012 |
| WO | 20120094189 A1 | 7/2012 |
| WO | 2012035533 A3 | 8/2012 |
| WO | 2012162806 A1 | 12/2012 |
| WO | 2012171113 A1 | 12/2012 |
| WO | 2013030833 A1 | 3/2013 |
| WO | 2013032518 A2 | 3/2013 |
| WO | 2013033334 A1 | 3/2013 |
| WO | 2013033335 A1 | 3/2013 |
| WO | 2013033458 A2 | 3/2013 |
| WO | 2013033458 A3 | 5/2013 |
| WO | 2013103986 A2 | 7/2013 |
| WO | 2013111126 A2 | 8/2013 |
| WO | 2013032518 A3 | 9/2013 |
| WO | 2013144942 A1 | 10/2013 |
| WO | 2014145901 A1 | 9/2014 |
| WO | 2014193996 A2 | 12/2014 |
| WO | 2014193996 A3 | 2/2015 |
| WO | 2015031982 A1 | 3/2015 |
| WO | 2013111126 A3 | 6/2015 |

OTHER PUBLICATIONS

U.S. Appl. No. 13/905,804, "Notice of Allowance," filed Aug. 12, 2015, 8 pgs.
Broadq—The Ultimate Home Entertainment Software, printed May 11, 2009 from ittp://web.srchive.org/web/20030401122010/www.broadq.com/qcasttuner/, 1 pg.
Amended claims for U.S. Appl. No. 16/686,727, prepared Jun. 7, 2021.
Cloakware Corporation, "Protecting Digital Content Using Cloakware Code Transformation Technology", Version 1.2, May 2002, pp. 1-10.
Decision Granting Institution of Inter Partes Review 35 U.S.C. § 314, IPR2020-00558, U.S. Pat. No. 10,225,588, 46 pgs.
Declaration of Patrick McDaniel, Ph.D., Inter Partes Review of U.S. Pat. No. 10,225,588, IPR filed Feb. 15, 2020, 211 pgs.
Declaration of Patrick McDaniel, Ph.D., Inter Partes Review of U.S. Pat. No. 9,184,920, Case No. IPR2020-00511, IPR filed Feb. 6, 2020, 168 pgs.
Defendant Hulu, LLC's Invalidity Contentions for U.S. Pat. Nos. 7,295,673; 8,139,651; 8,472,792; 9,270,720; 9,998,515; 10,212,486; 10,225,588, *DIVX, LLC* v. *Hulu, LLC*, Case No. 2:19-cv-1606-PSG-DFMx, C.D. Cal., Apr. 2, 2020, 136 pgs.
Defendant Netflix, Inc.'s Invalidity Contentions for U.S. Pat. Nos. 7,295,673; 8,139,651; 8,472,792; 9,270,720; 9,998,515; 10,212,486; 10,225,588; 9,184,920, *DIVX, LLC* v. *Netflix, Inc.*, Case No. 2:19-cv-1602-PSG-DFM, C.D. Cal., Apr. 2, 2020, 148 pgs.
Email from KPPB LLP to Malcolm Cribbs regarding U.S. Appl. No. 16/686,727, dated Jun. 7, 2021.
Email from KPPB LLP to Malcolm Cribbs regarding U.S. Appl. No. 16/686,727, dated May 13, 2021.
Email from KPPB LLP to Malcolm Cribbs regarding U.S. Appl. No. 16/686,727, dated May 17, 2021.
Email from KPPB LLP to Malcolm Cribbs regarding U.S. Appl. No. 16/686,727, dated May 18, 2021.
EP11774529 Supplementary European Search Report, completed Jan. 31, 2014, 2 pgs.
European Search Report Application No. EP 08870152, Search Completed May 19, 2011, Mailed May 26, 2011, 9 pgs.
European Search Report for Application 11855103.5, search completed Jun. 26, 2014, 9 pgs.
European Search Report for Application 11855237.1, search completed Jun. 12, 2014, 9 pgs.
European Supplementary Search Report for Application EP09759600, completed Jan. 25, 2011, 11 pgs.
Extended European Search Report for European Application EP10821672, completed Jan. 30, 2014, 3 pgs.
Extended European Search Report for European Application EP11824682, completed Feb. 6, 2014, 4 pgs.
Extended European Search Report for European Application No. 14763140.2, Search completed Sep. 26, 2016, Mailed Oct. 5, 2016, 9 pgs.
Extended European Search Report for European Application No. 19211286.0, Search completed Jul. 3, 2020, Mailed Jul. 13, 2020, 9 pgs.
Extended European Search Report for European Application No. 19211291.0, Search completed Jul. 6, 2020, Mailed Jul. 14, 2020, 12 pgs.
Extended European Search Report for European Application No. 20172313.7 Search completed Aug. 19, 2020, Mailed Aug. 27, 2020, 11 pgs.
Federal Computer Week, "Tool Speeds Info to Vehicles", Jul. 25, 1999, 5 pgs.
Final draft ETSI ES 202 109, V1.1.1, ETSI Standard, Terrestrial Trunked Radio (TETRA); Security; Synchronization mechanism for end-to-end encryption, Oct. 2002, 17 pgs.
First Amended Complaint for Patent Infringement, *DivX, LLC* v. *Netflix, Inc.*, No. 2:19-cv-1602-PSG, Am. Compl. (C.D. Cal Aug. 21, 2019), IPR filed Feb. 15, 2020, 229 pgs.
HTTP Live Streaming Overview, Networking & Internet, Apple, Inc., Apr. 1, 2011, 38 pgs.
IBM Corporation and Microsoft Corporation, "Multimedia Programming Interface and Data Specifications 1.0", Aug. 1991, printed

(56) References Cited

OTHER PUBLICATIONS from http://www.kk.iij4u.or.jp/~kondo/wave/mpidata.txt on Mar. 6, 2006, 100 pgs.
Information Technology—MPEG Systems Technologies—Part 6 Dynamic Adaptive Streaming Over HTTP (DASH) (Oct. 2010).
Information Technology—MPEG Systems Technologies—Part 7: Common Encryption in ISO Base Media File Format Files (ISO/IEC 23001-7), Apr. 2015, 24 pgs.
InformationWeek, "Internet on Wheels", InformationWeek: Front End: Daily Dose, Jul. 20, 1999, Printed on Mar. 26, 2014, 3 pgs.
International Preliminary Report for Application No. PCT/US2011/066927, Filed Dec. 22, 2011, Report Issued Jul. 10, 2013, 13 pgs.
International Preliminary Report for International Application No. PCT/US2011/067243, International Filing Date Dec. 23, 2011, Issued Jul. 10, 2013, 7 pgs.
International Preliminary Report on Patentability for International Application PCT/US14/30747, Report Issued Sep. 15, 2015, Mailed Sep. 24, 2015, 6 pgs.
International Preliminary report on Patentability for International Application No. PCT/US2005/025845, report issued on Jun. 19, 2007, 6 pgs.
International Preliminary Report on Patentability for International Application No. PCT/US2007/063950, Report Completed Dec. 18, 2009, 3 pgs.
International Preliminary Report on Patentability for International Application No. PCT/US2008/083816, issued May 18, 2010, 6 pgs.
International Preliminary Report on Patentability for International Application No. PCT/US2010/56733, Issued Jun. 5, 2012, 5 pgs.
International Preliminary Report on Patentability for International Application No. PCT/US2011/068276, issue Mar. 4, 2014, 23 pgs.
International Preliminary Report on Patentability for International Application PCT/US2011/067167, Issued Feb. 25, 2014, 8 pgs.
International Preliminary Report on Patentability for International Application PCT/US2013/043181, issued Dec. 31, 2014, Mailed Jan. 8, 2015, 11 pgs.
International Preliminary Report on Patentability for International Application PCT/US2014/039852, issued Dec. 1, 2015, mailed Dec. 5, 2015, 8 pgs.
International Preliminary Report on Patentability for International Application PCT/US2010/020372, Completed Oct. 6, 2011, 6 pgs.
International Search Report and Written Opinion for International Application No. PCT/US07/63950, completed Feb. 19, 2008; mailed Mar. 19, 2008, 9 pgs.
International Search Report and Written Opinion for International Application No. PCT/US08/87999, completed Feb. 7, 2009, mailed Mar. 19, 2009, 6 pgs.
International Search Report and Written Opinion for International Application No. PCT/US09/46588, completed Jul. 13, 2009, mailed Jul. 23, 2009, 7 pgs.
International Search Report and Written Opinion for International Application No. PCT/US2004/041667, completed May 24, 2007, mailed Jun. 20, 2007, 6 pgs.
International Search Report and Written Opinion for International Application No. PCT/US2005/025845, completed Feb. 5, 2007, mailed May 10, 2007, 8 pgs.
International Search Report and Written Opinion for International Application No. PCT/US2008/083816, completed Jan. 10, 2009, mailed Jan. 22, 2009, 7 pgs.
International Search Report and Written Opinion for International Application No. PCT/US2010/020372, Completed Feb. 10, 2009, Mailed Mar. 1, 2010, 8 pgs.
International Search Report and Written Opinion for International Application No. PCT/US2010/56733, Completed Jan. 3, 2011, Mailed Jan. 14, 2011, 9 pgs.
International Search Report and Written Opinion for International Application No. PCT/US2011/067243, International Filing Date Dec. 23, 2011, Search Completed Apr. 24, 2012, Mailed May 8, 2012, 8 pgs.
International Search Report and Written Opinion for International Application No. PCT/US2013/043181, completed Nov. 27, 2013, mailed Dec. 6, 2013, 12 pgs.
International Search Report and Written Opinion for International Application PCT/US14/30747, completed Jul. 30, 2014, Mailed Aug. 22, 2014, 7 pgs.
International Search Report and Written Opinion for International Application PCT/US14/39852, completed Oct. 21, 2014, mailed Dec. 5, 2014, 11 pgs.
International Search Report and Written Opinion for International Application PCT/US2011/066927, completed Apr. 3, 2012, Mailed Apr. 20, 2012, 14 pgs.
International Search Report and Written Opinion for International Application PCT/US2011/067167, completed Jun. 19, 2012, Mailed Jul. 2, 2012, 11 pgs.
International Search Report and Written Opinion for International Application PCT/US2011/068276, completed Jun. 19, 2013, Mailed Jul. 8, 2013, 24 pgs.
International Search Report and Written Opinion for PCT/US2013/020572, International Filing Date Jan. 7, 2013, Search Completed Mar. 19, 2013, Mailed Apr. 29, 2013, 10 pgs.
International Telecommunication Union, Telecommunication Standardization Sector of ITU, H.233, Line Transmission of Non-Telephone Signals, Confidentiality System for Audiovisual Services, ITU-T Recommendation H.233, Mar. 1993, 18 pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC FCD 23001-6 MPEG systems technologies Part 6: Dynamic adaptive streaming over HTTP (DASH), Jan. 28, 2011, 86 pgs.
ITS International, "Fleet System Opts for Mobile Server", Aug. 26, 1999, Printed on Oct. 21, 2011 from http://www.itsinternational.com/News/article.cfm?recordID=547, 2 pgs.
Lifehacker—Boxqueue Bookmarklet Saves Videos for Later Boxee Watching, printed Jun. 16, 2009 from http://feeds.gawker.com/~r/lifehacker/full/~3/OHvDmrlgZZc/boxqueue-bookmarklet-saves-videos-for-late-boxee-watching, 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.
Linksys, KISS DP-500, printed May 4, 2007 from http://www.kiss-technology.com/?p=dp500, 2 pgs.
Linksys®: "Enjoy your digital music and pictures on your home entertainment center, without stringing wires!", Model No. WMA 11B, printed May 9, 2007, from http://www.linksys.com/servlet/Satellite?c=L_Product_C2&childpagename=US/Layout&cid=1115416830950&p, 4 pgs.
Microsoft Corporation, "Chapter 8, Multimedia File Formats" 1991, Microsoft Windows Multimedia Programmer's Reference, 3 cover pgs., pp. 8-1 to 8-20.
Microsoft Corporation, Advanced Systems Format (ASF) Specification, Revision 01.20.03, Dec. 2004, 121 pgs.
Microsoft Media Platform: Player Framework, "Microsoft Media Platform: Player Framework v2.5 (formerly Silverlight Media Framework)", May 3, 2011, 2 pages.
Microsoft Media Platform: Player Framework, "Silverlight Media Framework v1.1", Jan. 2010, 2 pages.
Microsoft Windows® XP Media Center Edition 2005: Features, printed May 9, 2007, from http://www.microsoft.com/windowsxp/mediacenter/evaluation/features.mspx, 4 pgs.
MPEG-DASH presentation at Streaming Media West 2011, Nov. 2011, 14 pgs.
Office Action for Chinese Patent Application No. CN200880127596.4, dated May 6, 2014, 8 pgs.
Office Action for U.S. Appl. No. 13/223,210, dated Apr. 30, 2015, 14 pgs.
Office Action for U.S. Appl. No. 14/564,003, dated Apr. 17, 2015, 28 pgs.
Open DML AVI-M-JPEG File Format Subcommittee, "Open DML AVI File Format Extensions", Version 1.02, Feb. 28, 1996, 29 pgs.
Order No. 40: Construing Certain Terms of the Asserted Claims of the Patent at Issue (Markman Claim Construction), Inv. No. 337-TA-1222, Mar. 12, 2021, 97 pgs.

(56) References Cited

OTHER PUBLICATIONS pc world.com, Future Gear: PC on the HiFi, and the TV, from http://www.pcworld.com/article/id, 108818-page,1/article.html, printed May 4, 2007, from IDG Networks, 2 pgs.
Petition for Inter Partes Review of U.S. Pat. No. 10,225,588, IPR2020-00558,IPR filed Feb. 15, 2020, 96 pgs.
Petition for Inter Partes Review of U.S. Pat. No. 9,184,920, IPR2020-00511, IPR filed Feb. 6, 2020, 89 pgs.
Pomelo, LLC Tech Memo, Analysis of Netflix's Security Framework for 'Watch Instantly' Service, Mar.-Apr. 2009, 18 pgs.
Power of Attorney—Hulu, LLC (IPR2020-00558), IPR filed Feb. 15, 2020, 4 pgs.
Power of Attorney—Netflix, Inc. (IPR2020-00511), IPR filed Feb. 6, 2020, 3 pgs.
Power of Attorney—Netflix, Inc. (IPR2020-00558), IPR filed Feb. 15, 2020, 4 pgs.
Proceedings of the Second KDD Workshop on Large-Scale Recommender Systems and the Netflix Prize Competition, Las Vegas, Nevada, Aug. 24, 2008, 34 pgs.
Proposed examiner amendments for U.S. Appl. No. 16/686,727, prepared May 13, 2021.
Proposed examiner amendments for U.S. Appl. No. 16/686,727, prepared May 17, 2021.
Proposed examiner amendments for U.S. Appl. No. 16/686,727, prepared May 18, 2021.
Prosecution File History for U.S. Appl. No. 13/340,623 to Kiefer et al., ("Kiefer"), IPR filed Feb. 15, 2020, 1249 pgs., presented in 6 parts.
Prosecution File History for U.S. Pat. No. 10,225,588, IPR filed Feb. 15, 2020, 2937 pgs., presented in 29 parts.
Prosecution File History for U.S. Pat. No. 9,184,920, IPR filed Feb. 6, 2020, 1756 pgs., presented in 36 parts.
Qtv—About BroadQ, printed May 11, 2009 from http://www.broadq.com/en/about.php, 1 pg.
Server-Side Stream Repackaging (Streaming Video Technologies Panorama, Part 2), Jul. 2011, 15 pgs.
Supplementary European Search Report for Application No. EP 04813918, Search Completed Dec. 19, 2012, 3 pgs.
Supplementary European Search Report for Application No. EP 10729513, completed Dec. 9, 2013, 4 pgs.
Supplementary European Search Report for EP Application 11774529, completed Jan. 31, 2014, 2 pgs.
Supplementary European Search Report for European Application No. 07758499.3, Report Completed Jan. 25, 2013, 8 pgs.
Text of ISO/IEC 23001-6: Dynamic adaptive streaming over HTTP (DASH), Oct. 2010, 71 pgs.
U.S. Appl. No. 61/530,305, filed Sep. 1, 2011, 6 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
Wayback Machine, Grooveshark—Features, All Your Music in One Place, printed Aug. 15, 2016 from https://web.archive.org/web/20081013115837/http://www,grooveshark.com/features, 6 pgs.
Windows Media Center Extender for Xbox, printed May 9, 2007 from http://www.xbox.com/en-US/support/systemuse/xbox/console/mediacenterextender.htm, 2 pgs.
Windows® XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.
Microsoft Windows® XP Media Center Edition 2005, Frequently asked Questions, printed May 4, 2007 from http://www.microsoft.com/windowsxp/mediacenter/evaluation/faq.mspx, 6 pgs.
3GPP TS 26.247, V1.3.0, 3rd Generation Partnership Project; Technical Specification Group Services and System Aspects Transparent end-to-end Packet-switches Streaming Services (PSS);, Progressive Download and Dynamic Adaptive Streaming over HTTP (3GP-DASH) (Release 10), Mar. 2011, 72 pgs.
"Adaptive Streaming Comparison", Jan. 28, 2010, 5 pgs.
"Apple HTTP Live Streaming specification", Aug. 2017, 60 pgs.
"Best Practices for Multi-Device Transcoding", Kaltura Open Source Video, Printed on Nov. 27, 2013 from knowledge.kaltura.com/best-practices-multi-device-transcoding, 13 pgs.
"Broadcom BCM7413 Product Brief", Dec. 11, 2008, 2 pgs.
"Common Interface Specification for Conditional Access and other Digital Video Broadcasting Decoder Applications", European Standard, EN 50221, Feb. 1997, 86 pgs.
"Container format (digital)", printed Aug. 22, 2009 from http://en.wikipedia.org/wiki/Container_format_(digital), 4 pgs.
"Data Encryption Decryption using AES Algorithm, Key and Salt with Java Cryptography Extension", Available at https://www.digizol.com/2009/10/java-encrypt-decrypt-jce-salt.html, Oct. 200, 6 pgs.
"Diagram | Matroska", Dec. 17, 2010, Retrieved from http://web.archive.org/web/201 01217114656/http://matroska.org/technical/diagram/index.html on Jan. 29, 2016, 5 pages.
"Draft CR: Trick Mode for HTTP Streaming", 3GPP TSG-SA4 Meeting #58, Apr. 26-30, 2010, Vancouver, Canada, S4-100237, 3 pgs.
"DVD—MPeg differences", printed Jul. 2, 2009 from http://dvd.sourceforge.net/dvdinfo/dvdmpeg.html, 1 pg.
"DVD subtitles", sam.zoy.org/writings/dvd/subtitles, dated Jan. 9, 2001, printed Jul. 2, 2009, 4 pgs.
"Final Committee Draft of MPEG-4 streaming text format", International Organisation for Standardisation, Feb. 2004, 22 pgs.
"Free music was never so cool before Grooveshark", Wayback Machine, Grooveshark, Startup Meme, May 31, 2008, printed Aug. 15, 2016 from https://web.archive.org/web/20080601173852/http://startupmeme.com/2008/05/31/free-music-was-never-so-wool-before-grooveshark/, 2 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"HTTP Live Streaming on the Leading Media CDN", Akamai website, retrieved from http://www.akamai.com/html/resources/http-live-streaming.html, 2015, accessed May 11, 2015, 5 pgs.
"IBM Spearheading Intellectual Property Protection Technology for Information on the Internet; Cryptolope Containers Have Arrived", May 1, 1996, Business Wire, Printed on Aug. 1, 2014 from http://www.thefreelibrary.com/IBM+Spearheading+Intellectual+Property+Protection+Technology+for...-a018239381, 6 pgs.
"Information Technology—Coding of audio-visual objects—Part 14: MP4 file format", International Standard, ISO/IEC 14496-14, First Edition, Nov. 15, 2003, 18 pgs.
"Information Technology—Coding of audio-visual objects—Part 17: Streaming text", International Organisation for Standardisation, Feb. 2004, 22 pgs.
"Information technology—Coding of audio-visual objects—Part 18: Font compression and streaming", ISO/IEC 14496-18, First edition Jul. 1, 2004, 26 pgs.
"Information technology—Generic coding of moving pictures and associated audio information: Systems", International Standard ISO/IEC 13818-1, Second Edition, Dec. 1, 2000, 174 pages (presented in two parts).
"Information Technology—Coding of Audio Visual Objects—Part 2: Visual", International Standard, ISO/IEC 14496-2, Third Edition, Jun. 1, 2004, pp. 1-724. (presented in three parts).
"Information-Technology—Generic coding of moving pictures and associated audio: Systems, Recommendation H.222.0", International Standard, ISO/IEC 13818-1, Draft 1209, Apr. 25, 1995, 151 pages.
"Information-Technology—Generic coding of moving pictures and associated audio: Systems, Recommendation H.222.0", International Standard, ISO/IEC 13818-1, Draft 1540, Nov. 13, 1994, 161 pgs.
"Instantly convert songs into tiny URLs with TinySong", Wayback Machine, Startup Memo Technology Blog, printed Aug. 15, 2016 from https://seb.archive.org/web/2008919133853/http://startupmeme.com/instantly-convert-songs-into-tiny-urls-with-tinysong/, 4pgs.

(56) References Cited

OTHER PUBLICATIONS

"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"KISS Players, KISS DP-500", retrieved from http://www.kiss-technology.com/?p=dp500 on May 4, 2007, 1 pg.
"Live and On-Demand Video with Silverlight and IIS Smooth Streaming", Microsoft Silverlight, Windows Server Internet Information Services 7.0, Feb. 2010.
"Matroska", Wikipedia, Jul. 10, 2017, retrieved from https://en.wikipedia.org/wiki/Matroska on Jul. 20, 2017, 3 pgs.
"Matroska Streaming | Matroska", Retrieved from the Internet: URL:http://web.archive.org/web/201 0121711431 O/http://matroska.org/technical!streaming/index.html [retrieved on Jan. 29, 2016], Dec. 17, 2010, 2 pgs.
"Media Delivery Solutions for Streaming Video and Software Delivery", Akamai website, Retrieved from http://www.akamai.com/html/solutions/media-delivery-solutions.html, 2015, Accessed May 11, 2015, 5 pgs.
"Microsoft Announces Breakthrough Technology Enabling Simple Access to Broad Set of Digital Content, Including Music, Games, Video, Ring Tones and Pictures", Microsoft, Feb. 12, 2017, Retrieved from https://news.microsoft.com/2007/02/12/microsoft-announces-breakthrough-technology-enabling-simple-access-to-broad-set-of-digital-content-including-music-games-video-ring-tones-and-pictures/, 5 pgs.
"Microsoft Smooth Streaming specification", Jul. 22, 2013, 56 pgs.
"MovieLabs Specification for Next Generation Video—Version 1.0", Motion Picture Laboratories, Inc., 2013, Retrieved from: http://movielabs.com/ngvideo/MovieLabs%20Specification%20for%20Next%20Generation%20Video%20v1.0.pdf, 5 pgs.
"MPEG-2", Wikipedia, Jun. 13, 2017, retrieved from https://en.wikipedia.org/wiki/MPEG-2 on Jul. 20, 2017, 13 pgs.
"MPEG-4 File Format, Version 2", Sustainability of Digital Formats: Planning for Library of Congress Collections, Retrieved from: https://www.loc.gov/preservation/digital/formats/fdd/fdd000155.shtml, Last updated Feb. 21, 2017, 8 pgs.
"MPEG-4 Part 14", Wikipedia, Jul. 10, 2017, retrieved from https://en.wikipedia.org/wiki/MPEG-4_Part_14 on Jul. 20, 2017, 5 pgs.
"Netflix turns on subtitles for PC, Mac streaming", Yahoo! News, Apr. 21, 2010, Printed on Mar. 26, 2014, 3 pgs.
"OpenDML AVI File Format Extensions", OpenDML AVI M-JPEG File Format Subcommittee, retrieved from www.the-labs.com/Video/odmlff2-avidef.pdf, Sep. 1997, 42 pgs.
"QCast Tuner for PS2", printed May 11, 2009 from http://web.archive.org/web/20030210120605/www.divx.com/software/detail.php?ie=39, 2 pgs.
"SDMI Secure Digital Music Initiative", SDMI Portable Device Specification, Part 1, Version 1.0, Jul. 8, 1999, pp. 1-35.
"Series H: Audiovisual and Multimedia Systems Infrastructure of audiovisual services—Coding of moving video; High efficiency video coding", International Telecommunication Union, ITU-T H.265, Apr. 2015, 634 pages (presented in six parts).
"Server 'Trick Play' support for MPEG-2 Transport Stream Files", www.live555.com/liveMedia/transport-stream-trick-play.html, 2006, Dec. 31, 2020, 1 pg.
"Single-Encode Streaming for Multiple Screen Delivery", Telestream Wowza Media Systems, 2009, 6 pgs.
"Smooth Streaming Client", The Official Microsoft IIS Site, Sep. 24, 2010, 4 pgs.
"Specifications | Matroska", Retrieved from the Internet: URL:http://web.archive.org/web/201 00706041303/http:/1www.matroska.org/technical/specs/index.html [retrieved on Jan. 29, 2016, Jul. 6, 2010, 14 pgs.

"Specifications Matroska", Dec. 17, 2010, [retrieved on Mar. 2, 2018], https://web.archive.org/web/20101217110959/http://matroska.org/technical/specs/index.html 12 pgs.
Supplementary European Search Report for Application No. EP 10834935, International Filing Date Nov. 15, 2010, Search Completed May 27, 2014, 9 pgs.
"Supported Media Formats", Supported Media Formats, Android Developers, Printed on Nov. 27, 2013 from developer.android.com/guide/appendix/media-formats.html, 3 pgs.
"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.
"Text of ISO/IEC 14496-18/FDIS, Coding of Moving Pictures and Audio", ITU Study Group 16—Videocoding Experts Group—ISO/IEC MPEG & ITU-T VCEG(ISO/IEC JTC1/SC29/WG11 and ITU-T SG16 06), No. N6215, Dec. 2003, 26 pgs.
"The LIVE555 Media Server", www.live555.com/mediaServer/#about, 2006, printed Dec. 31, 2020, 3 pgs.
"The MPEG-DASH Standard for Multimedia Streaming Over the Internet", IEEE MultiMedia, vol. 18, No. 4, 2011, 7 pgs.
"Thread: SSME (Smooth Streaming Medial Element) config.XML review (Smooth Streaming Client configuration file)", Printed on Mar. 26, 2014, 3 pgs.
"Transcoding Best Practices", From movideo, Printed on Nov. 27, 2013 from code.movideo.com/Transcoding_Best_Practices, 5 pgs.
"Twitpic's Future", Twitpic, Oct. 25, 2014, Retrieved from: https://web.archive.org/web/20150521043642/https://blog.twitpic.com/index.html, 12 pgs.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What is Fliggo?", Wayback Machine, printed Aug. 15, 2016 from https://web.archive.org/web/20080623065120/http://www.fliggo.com/about, 3 pgs.
"What's on a DVD?", printed Aug. 22, 2009 from http://www.doom9.org/dvd-structure.htm, 5 pgs.
"Windows Media Player 9", Microsoft, Mar. 23, 2017, 3 pgs.
U.S. Appl. No. 13/224,298, "Final Office Action Received", filed May 19, 2014, 26 pgs.
U.S. Appl. No. 13/905,804, "Non-Final Office Action Received",
U.S. Appl. No. 13/905,804, "Non-Final Office Action Received", filed Jul. 25, 2014, 15 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
Adams et al., "Will http adaptive streaming become the dominant mode of video delivery in cable networks?", https://www.nctatechnicalpapers.com/Paper/2011/2011-will-http-adaptive-streaming-become-the-dominant-mode-of-video-delivery-in-cable-networks-, 10 pgs.
ADB, "ADB-3800W Datasheet", 2007, 2 pgs.
Adhikari et al., "Unreeling Netflix: Understanding and Improving Multi-CDN Movie Delivery", 2012 Proceedings IEEE InfoCom, Mar. 25-30, 2012, Orlando, Florida, 9 pgs.
Adzic et al., "Optimized Adaptive HTTP Streaming for Mobile Devices", International Society for Optics and Photonics, Applications of Digital Image Processing XXXIV, vol. 8135, Sep. 2011, p. 81350T.
Agi et al., "An Empirical Study of Secure MPEG Video Transmissions", IEEE, Mar. 1996, 8 pgs., DOI: 10.1109/NDSS.1996.492420.
Ahmed et al., "An Efficient Chaos-Based Feedback Stream Cipher (ECBFSC) for Image Encryption and Decryption", Informatica, Mar. 2007, vol. 31, No. 1, pp. 121-129.

(56) References Cited

OTHER PUBLICATIONS

Akhshabi et al., "An Experimental Evaluation of Rate-Adaptation Algorithms in Adaptive Streaming over HTTP", MMSys'11, Feb. 23-25, 2011, 12 pgs.
Alattar et al., A.M. "Improved selective encryption techniques for secure transmission of MPEG video bit-streams", In Proceedings 1999 International Conference on Image Processing (Cat. 99CH36348), vol. 4, IEEE, 1999, pp. 256-260.
Anonymous, "Method for the encoding of a compressed video sequence derived from the same video sequence compressed at a different bit rate without loss of data", ip.com, ip.com No. IPCOM000008165D, May 22, 2002, pp. 1-9.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Arachchi et al., "Adaptation-aware encryption of scalable H.264/AVC for content security", Signal Processing: Image Communication, Jul. 2009, vol. 24, pp. 468-483, doi:10.1016/j.image.2009.02.004.
Asai et al., "Essential Factors for Full-Interactive VOD Server: Video File System, Disk Scheduling, Network", Proceedings of Globecom '95, Nov. 14-16, 1995, 6 pgs.
Author Unknown, "Blu-ray Disc—Blu-ray Disc—Wikipedia, the free encyclopedia", printed Oct. 30, 2008 from http://en.wikipedia.org/wiki/Blu-ray_Disc, 11 pgs.
Author Unknown, "Blu-ray Movie Bitrates Here—Blu-ray Forum", printed Oct. 30, 2008 from http://forum.blu-ray.com/showthread.php?t=3338, 6 pgs.
Author Unknown, "MPEG-4 Video Encoder: Based on International Standard ISO/IEC 14496-2", Patni Computer Systems, Ltd., printed Jan. 24, 2007, USA, pp. 1-15.
Author Unknown, "O'Reilly—802.11 Wireless Networks: The Definitive Guide, Second Edition", printed Oct. 30, 2008 from http://oreilly.com/catalog/9780596100520, 2 pgs.
Author Unknown, "Tunneling QuickTime RTSP and RTP over HTTP", Published by Apple Computer, Inc.: 1999 (month unknown), 6 pgs.
Author Unknown, "Turbo-Charge Your Internet and PC Performance", printed Oct. 30, 2008 from Speedtest.net—The Global Broadband Speed Test, 1 pg.
Author Unknown, "White paper, The New Mainstream Wireless LAN Standard", Broadcom Corporation, Jul. 2003, 12 pgs.
Beker et al., "Cipher Systems, The Protection of Communications", 1982, 40 pgs.
Bell et al., "The BellKor 2008 Solution to the Netflix Prize", Netflix Prize, 2008, 21 pgs.
Blasiak, "Video Transrating and Transcoding: Overview of Video Transrating and Transcoding Technologies", Ingenient Technologies, TI Developer Conference, Aug. 6-8, 2002, 22 pgs.
Bloom et al., "Copy Protection for DVD Video", Proceedings of the IEEE, vol. 87, No. 7, Jul. 1999, pp. 1267-1276.
Bocharov et al., "Portable encoding of audio-video objects: The Protected Interoperable File Format (PIFF)",  check for duplicate Microsoft Corporation, Sep. 8, 2009, Revised: Mar. 9, 2010, 32 pgs.
Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013 (presented in three parts).
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
But, "Limitations of existing MPEG-1 ciphers for streaming video", vol. 40429. Technical Report CAIA, 2004, 7 pgs.

Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
Candelore, U.S. Appl. No. 60/372,901, filed Apr. 17, 2002, 5 pgs.
Casares et al., "Simplifying Video Editing Using Metadata", DIS2002, 2002, pp. 157-166.
Catone, Josh "10 Ways to Share Music on Twitter", Mashable, May 29, 2009, Retrieved from: https://mashable.com/2009/05/29/twitter-music/#vJCdrVzNOOqx, 5 pgs.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng et al., "Partial encryption of compressed images and videos", IEEE Transactions on Signal Processing, vol. 48, No. 8, Aug. 2000, 33 pgs.
Chesler, Oliver "TinySong is like TinyURL for music", wire to the ear, Jun. 30, 2008, printed Aug. 15, 2016 from https://web.archive.org/web/20080907100459/http://www.wiretotheear.com/2008/06/30/tinysongis-like-tinyurl-for-music, 8 pgs.
Cheung et al., "On the Use of Destination Set Grouping to Improve Fairness in Multicast Video Distribution",  check for duplicate Proceedings of IEEE INFOCOM'96, Conference on Computer Communications, vol. 2, IEEE, 1996, 23 pgs.
Collet, "Delivering Protected Content, An Approach for Next Generation Mobile Technologies", Thesis, 2010, 84 pgs.
Concolato et al., "Live HTTP Streaming of Video and Subtitles within a Browser", MMSys 2013, Feb. 26-Mar. 1, 2013, Oslo, Norway, 5 pgs.
Conklin et al., "Video coding for streaming media delivery on the Internet", IEEE Transactions on Circuits and Systems for Video Technology, Mar. 2001, vol. 11, No. 3, pp. 269-281.
De Cock et al., "Complexity-Based Consistent-Quality Encoding in the Cloud", IEEE International Conference on Image Processing (ICIP), Date of Conference Sep. 25-28, 2016, Phoenix, AZ, pp. 1484-1488.
Deshpande et al., "Scalable Streaming of JPEG2000 Images Using Hypertext Transfer Protocol", MULTIMEDIA '01: Proceedings of the Ninth ACM International Conference on Multimedia, Oct. 2001, pp. 372-381. https://doi.org/10.1145/500141.500197.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.
Diamantis et al., "Real Time Video Distribution using Publication through a Database", Proceedings SIBGRAPI'98. International Symposium on Computer Graphics, Image Processing, and Vision (Cat. No. 98EX237), Oct. 1990, 8 pgs.
Dworkin, "Recommendation for Block Cipher Modes of Operation: Methods and Techniques", NIST Special Publication 800-38A, 2001, 66 pgs.
Entone, "Amulet High Definition IP Television Receiver User's Guide", 2008, 28 pgs.
Entone, "Hydra HD IP Video Gateway", 2008, 2 pgs.
Eskicioglu et al., "An Integrated Approach to Encrypting Scalable Video", Proceedings IEEE International Conference on Multimedia and Expo, Aug. 26-29, 2002, Lausanne, Switzerland, 4 pgs.
ETSI, "Digital Video Broadcasting (DVB) Support for use of scrambling and Conditional Access (CA) within digital broadcasting systems", Oct. 1996, 13 pgs.
ETSI, "Digital Video Broadcasting (DVB); Implementation guidelines for the use of Video and Audio Coding in Contribution and Primary Distribution Applications based on the MPEG-2 Transport Stream", ETSI TS 102 154 V1.2.1, May 2004, 73 pgs.
Fahmi et al., "Proxy Servers for Scalable Interactive Video Support", Computer, Sep. 2001, vol. 45, No. 9, pp. 54-60, https://doi.org/10.1109/2.947092.
Fang et al., "Real-time deblocking filter for MPEG-4 systems", Asia-Pacific Conference on Circuits and Systems, Oct. 28-31, 2002, Bail, Indonesia, pp. 541-544.
Fecheyr-Lippens, "A Review of HTTP Live Streaming",  check for duplicate Internet Citation, Jan. 25, 2010, pp. 1-37.

(56) References Cited

OTHER PUBLICATIONS

Fielding et al., "Hypertext Transfer Protocol—HTTP1.1", Network Working Group, RFC 2616, Jun. 1999, 114 pgs.
Fitzek et al., "A Prefetching Protocol for Continuous Media Streaming in Wireless Environments", IEEE Journal on Selected Areas in Communications, Oct. 2001, vol. 19, No. 10, pp. 2015-2028, DOI:10.1109/49.957315.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, pp. 969-972.
Gannes, "The Lowdown on Apple's HTTP Adaptive Bitrate Streaming", GigaOM, Jun. 10, 2009, 12 pgs.
Garg et al., "An Experimental Study of Throughput for UDP and VoIP Traffic in IEEE 802.11b Networks", Wireless Communications and Networkings, Mar. 2003, pp. 1748-1753.
Gast, "When is 54 Not Equal to 54? A Look at 802.11a, b and g Throughput", Aug. 8, 2003, printed Oct. 30, 2008 from www.oreillynet.com/pub/a/wireless/2003/08/08/wireless_throughput.html, 4 pgs.
Ghosh, "Enhancing Silverlight Video Experiences with Contextual Data", Retrieved from: http://msdn.microsoft.com/en-us/magazine/ee336025.aspx, 2010,15 pgs.
Griffith, Eric "The Wireless Digital Picture Frame Arrives", Wi-Fi Planet, printed May 4, 2007 from http://www.wi-fiplanet.com/news/article.php/3093141, Oct. 16, 2003, 3 pgs.
Hartung et al., "DRM Protected Dynamic Adaptive HTTP Streaming", MMSys 2011 Proceedings of the Second Annual ACM Conference on Multimedia Systems, San Jose, California, Feb. 23-25, 2011, pp. 277-282.
Ho, "Digital Video Broadcasting Conditional Access Architecture", Report prepared for CS265—Section 2, Fall 2002, Prof Stamp, 7 pgs.
Huang, U.S. Pat. No. 7,729,426, U.S. Appl. No. 11/230,794, filed Sep. 20, 2005, 143 pgs.
Huang et al., "Adaptive MLP post-processing for block-based coded images", IEEE Proceedings—Vision, Image and Signal Processing, vol. 147, No. 5, Oct. 2000, pp. 463-473.
Huang et al., "Architecture Design for Deblocking Filter in H.264/JVT/AVC", 2003 International Conference on Multimedia and Expo., Jul. 6-9, 2003, Baltimore, MD, 4 pgs.
Hurtado Guzman, "Development and Implementation of an Adaptive HTTP Streaming Framework for H264/MVC Coded Media", Politecnico di Torino, Nov. 2010, 108 pgs.
Hwang et al., "Efficient and User Friendly Inter-domain Device Authentication/Access control for Home Networks", Proceedings of the 2006 International Conference on Embedded and Ubiquitous Computing, Seoul, Korea, Aug. 1-4, 2006, pp. 131-140.
INCITS/ISO/IEC, "Information Technology—Generic Coding of Moving Pictures and Associated Audio Information: Video (Formerly ANSI/ISO/IEC 13818-2-2000)", Second edition, Dec. 15, 2000, 220 pgs., (presented in two parts).
Inlet Technologies, "Adaptive Delivery to iDevices", 2010, 2 pgs.
Inlet Technologies, "Adaptive delivery to iPhone 3.0", 2009, 2 pgs.
Inlet Technologies, "HTTP versus RTMP", 2009, 3 pgs.
Inlet Technologies, "The World's First Live Smooth Streaming Event: The French Open", 2009, 2 pgs.
I-O Data, "Innovation of technology arrived", Nov. 2004, Retrieved from http://www.iodata.com/catalogs/AVLP2DVDLA_Flyer200505.pdf, 2 pgs.
ISMA, "ISMA Encryption and Authentication, Version 1.1, AREA / Task Force: DRM", Internet Streaming Media Alliance, Sep. 15, 2006, pp. 1-64.
ITU-T, "Series J: Cable Networks and Transmission of Television, Sound Programme and Other Multimedia Signals", Technical method for ensuring privacy in long-distance international MPEG-2 television transmission conforming to ITU-T J.89, ITU-T Recommendation J.96, Mar. 2001, 34 pgs.
Jain et al., U.S. Appl. No. 61/522,623, filed Aug. 11, 2011, 44 pgs.

Jung et al., "Design and Implementation of an Enhanced Personal Video Recorder for DTV", IEEE Transactions on Consumer Electronics, vol. 47, No. 4, Nov. 2001, 6 pgs.
Kabir, "Scalable and Interactive Multimedia Streaming Over the Internet", Thesis, 2005, 207 pgs.
Kalva, Hari "Delivering MPEG-4 Based Audio-Visual Services", 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Kaspar et al., "Using HTTP Pipelining to Improve Progressive Download over Multiple Heterogeneous Interfaces", IEEE ICC proceedings, 2010, 5 pgs.
Kim, Kyuheon "MPEG-2 ES/PES/TS/PSI", Kyung-Hee University, Oct. 4, 2010, 66 pgs.
Kim et al, "A Deblocking Filter with Two Separate Modes in Block-Based Video Coding", IEEE transactions on circuits and systems for video technology, vol. 9, No. 1, 1999, pp. 156-160.
Kim et al., "Tree-Based Group Key Agreement", Feb. 2004, 37 pgs.
Kozintsev et al., "Improving last-hop multicast streaming video over 802.11", Workshop on Broadband Wireless Multimedia, Oct. 2004, pp. 1-10.
Krikor et al., "Image Encryption Using DCT and Stream Cipher", European Journal of Scientific Research, Jan. 2009, vol. 32, No. 1, pp. 48-58.
Kurzke et al., "Get Your Content Onto Google TV", Google, Retrieved from: http://commondatastorage.googleapis.com/io2012/presentations/live%20to%20website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Levkov, "Mobile Encoding Guidelines for Android Powered Devices", Adobe Systems Inc., Addendum B, Dec. 22, 2010, 42 pgs.
Lew et al., "Content-Based Multimedia Information Retrieval: State of the Art and Challenges", ACM Transactions on Multimedia Computing, Communications and Applications, Feb. 2006, vol. 2, No. 1, pp. 1-19.
Li et al, "Content-Aware Playout and Packet Scheduling for Video Streaming Over Wireless Links", IEEE Transactions on Multimedia, vol. 10, No. 5, Aug. 2008, pp. 885-895.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
Lian et al., "Efficient video encryption scheme based on advanced video coding", Multimed. Tools Appl. vol. 38, 2008, pp. 75-89.
Lian et al., "Recent Advances in Multimedia Information System Security", Informatica, Jan. 2009, vol. 33, pp. 3-24.
Lian et al., "Selective Video Encryption Based on Advanced Video Coding", PCM, Nov. 2005, Part II, LNCS 3768, pp. 281-290.
Lievaart, "Characteristics that differentiate CA Systems", Irdeto access, Nov. 2001, 5 pgs.
Lin et al., "Multipass Encoding for Reducing Pulsing Artifacts in Cloud Based Video Transcoding", IEEE International Conference on Image Processing (ICIP), Date of Conference Sep. 27, 30, 2015, Quebec City, QC, Canada, pp. 907-911.
List et al., "Adaptive deblocking filter", IEEE transactions on circuits and systems for video technology, vol. 13, No. 7, Jul. 2003, pp. 614-619.
Liu et al., "A Formal Framework for Component Deployment", OOPSLA 2006, Proceedings of the 21st Annual ACM SIGPLAN Conference on Object-Oriented Programming Systems, Language, and Applications, Portland, Oregon, Oct. 22-26, 2006, pp. 325-344.
Lloyd, "Supporting Trick Mode Playback Universally Across the Digital Television Industry", Thesis, 2005, 111 pgs.

(56) References Cited

OTHER PUBLICATIONS

Lomas et al., "Educause Learning Initiative, Collaboration Tools", Educause Learning Initiative, Aug. 2008, ELI Paper 2: 2008, 11 pgs.
Long et al., "Silver: Simplifying Video Editing with Metadata", Demonstrations, CHI 2003: New Horizons, Apr. 5-10, 2003, pp. 628-629.
Macaulay et al., "Whitepaper—IP Streaming of MPEG-4: Native RTP vs MPEG-2 Transport Stream", Envivio, Oct. 2005, 12 pgs.
Martin et al., "Privacy Protected Surveillance Using Secure Visual Object Coding", IEEE Transactions on Circuits and Systems for Video Technology, Aug. 2008, vol. 18, No. 8, pp. 1152-1162, DOI: 10.1109/TCSVT.2008.927110.
Massoudi et al., "Overview on Selective Encryption of Image and Video: Challenges and Perspectives", EURASIP Journal on Information Security, Nov. 2008, 18 pgs.
Matroska, "Diagram", Matroska, Technical/Info, Diagram, 2016, retrieved from https://www.matroska.org/technical/diagram/index.html on Jul. 20, 2017, 9 pages.
Matroska, "Specifications", Matroska, Technical/Info, Specifications, Jun. 25, 2017, retrieved from https://www.matroska.org/technical/specs/index.html on Jul. 20, 2017, 20 pgs.
McCanne et al., "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.
Meyer et al., "Security mechanisms for Multimedia-Data with the Example MPEG-I-Video", SECMPEG, 1992, 10 pgs.
Miras, "On Quality Aware Adaptation of Internet Video", University of London, PhD dissertation, May 2004, 181 pgs.
Molavi et al., "A Security Study of Digital TV Distribution Systems", Thesis, Jun. 2005, 112 pgs.
Montes, "Muusic: mashup de servicios web musicales", Ingenieria Tecnica en Informatica de Gestion, Nov. 2008, 87 pgs.
Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.
Moscoso, Pedro Gomes "Interactive Internet TV Architecture Based on Scalable Video Coding", Instituto Superior Techico, Universidad Technica de Lisboa, May 2011, 103 pgs.
MSDN, "Adaptive streaming, Expression Studio 2.0", Apr. 23, 2009, 2 pgs.
Nelson, "Arithmetic Coding + Statistical Modeling = Data Compression: Part 1—Arithmetic Coding", Doctor Dobb's Journal, Feb. 1991, USA, pp. 1-12.
Nelson, "Smooth Streaming Deployment Guide", Microsoft Expression Encoder, Aug. 2010, 66 pgs.
Nelson, "The Data Compression Book", M&T Publishing, 1992, 533 pgs., (presented in two parts).
Nelson, Michael "IBM's Cryptolopes", Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pgs.
Newton et al., "Preserving Privacy by De-identifying Facial Images", Carnegie Mellon University School of Computer Science, Technical Report, CMU-CS-03-119, Mar. 2003, 26 pgs.
Noboru, "Play Fast and Fine Video on Web! codec", Co.9 No. 12, Dec. 1, 2003, pp. 178-179.
Noe, "Matroska File Format (Under Construction!)", Internet Citation, Jun. 24, 2007, XP002617671, 51pgs. Retrieved from the Internet: URL:http://web.archive.org/web/20070821155146/www.matroska.org/technical/specs/matroska.pdf [retrieved on Jan. 19, 2011], Jun. 24, 2007, 1-51.
Noe, Alexander "AVI File Format", http://www.alexander-noe.com/video/documentation/avi.pdf, Dec. 14, 2006, pp. 1-26.
Noe, Alexander "Definitions", Apr. 11, 2006, retrieved from http://www.alexander-noe.com/video/amg/definitions.html on Oct. 16, 2013, 2 pgs.
O'Brien, U.S. Appl. No. 60/399,846, filed Jul. 30, 2002, 27 pgs.
OIPF Open Forum, "OIPF Release 1 Specification, vol. 3, Content Metadata", OIPF, Oct. 8, 2009, vol. 1.1, 47 pgs.
OIPF Open Forum, "OIPF Release 1 Specification, vol. 7—Authentication, Content Protection and Service Protection", OIPF, Oct. 8, 2009, vol. 1.1, 88 pgs.
Ooyala, "Widevine Content Protection", Ooyala Support Center for Developers. Ooyala, Inc., 2013. Jun. 3, 2013. http://support.ooyala.com/developers/documentation/concepts/player_v3_widevine_integration.html, 7 pgs.
Open IPTV Forum, "Functional Architecture", Jan. 16, 2008, vol. 1.1, 141 pgs.
Open IPTV Forum, "OIPF Release 1 Specification, vol. 1—Overview", OIPF, Oct. 8, 2009, vol. 1.1, 48 pgs.
Open IPTV Forum, "OIPF Release 1 Specification, vol. 2, Media Formats", OIPF, Oct. 8, 2009, vol. 1.1, 22 pgs.
O'Rourke, "Improved Image Decompression for Reduced Transform Coding Artifacts", IEEE Transactions on Circuits and Systems for Video Technology, vol. 5, No. 6, Dec. 1995, pp. 490-499.
Oyman et al, "Quality of Experience for HTTP Adaptive Streaming Services", IEEE Communications Magazine, Apr. 2012, vol. 50, No. 4, pp. 20-27, DOI: 10.1109/MCOM.2012.6178830.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Ozer, Jan "Adaptive Streaming in the Field", Streaming Media, Dec. 2010-Jan. 2011, pp. 36-47.
Padiadpu, Rashmi "Towards Mobile Learning: A SCORM Player for the Google Android Platform", Master Thesis, Hamburg University of Applied Sciences, 2008, 66 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos, R "HTTP Live Streaming: draft-pantos-http-live-streaming-06", Published by the Internet Engineering Task Force (IETF), Mar. 31, 2011, 24 pgs.
Papagiannaki et al., "Experimental Characterization of Home Wireless Networks and Design Implications", INFOCOM 2006, 25th IEEE International Conference of Computer Communications, Proceedings, Apr. 2006, 13 pgs.
Park et al., "A postprocessing method for reducing quantization effects in low bit-rate moving picture coding", IEEE Transactions on Circuits and Systems for Video Technology, vol. 9, No. 1, Feb. 1999, pp. 161-171.
Park et al., "An Efficient Encryption and Key Management Scheme for Layered Access Control of H.265/Scalable Video Coding", IEICI Trans. Inf. & Syst., May 2009, vol. E92-D, No. 5, pp. 851-858, DOI: 1031587/transinf.E92.D.851.
Park et al., "Combined Scheme of Encryption and Watermarking in H.264/Scalable Video Coding", New Directions in Intelligent Interactive Multimedia, SCI 142, 2008, pp. 351-361.
Peek, David "Consumer Distributed File Systems", Dissertation, Doctor of Philosophy, Computer Science and Engineering, The University of Michigan, 2009, 118 pgs.
Phamdo, "Theory of Data Compression", printed on Oct. 10, 2003, 12 pgs.
Qiao et al., "Comparison of MPEG Encryption Algorithms", Comput. & Graphics, 1998, vol. 22, No. 4, pp. 437-448.
Raju et al., "Fast and Secure Real-Time Video Encryption", Sixth Indian Conference on Computer Vision, Graphics & Image Processing, Jan. 2009, pp. 257-264, doi:10.1109/ACVGIP.2008.100.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Richardson, "H.264 and MPEG-4 Video Compression", Wiley, 2003, 306 pgs. (presented in 2 parts).
Rosenberg et al., "Indicating User Agent Capabilities in the Session Initiation Protocol (SIP)", Network Working Group, RFC 3840, Aug. 2004, 36 pgs.

(56) References Cited

OTHER PUBLICATIONS

Schulzrinne, H, "Real Time Streaming Protocol 2.0 (RTSP): draft-ietfmmusic-rfc2326bis-27", MMUSIC Working Group of the Internet Engineering Task Force (IETF), 296 pgs. (presented in two parts), Mar. 9, 2011, 296 pgs.
Senoh et al., "DRM Renewability & Interoperability", IEEE Xplore, Conference: Consumer Communications and Networking Conference, 2004, Feb. 2004, pp. 424-429, DOI: 10.1109/CCNC.2004.1286899, Conference: Consumer Communications and Networking Conference, 2004. CCNC 2004.
Sheu et al., "Dynamic layer adjustments for SVC segments in P2P streaming networks", Computer Symposium (ICS), 2010, 2010 International, Tainan, Taiwan, R.O.C., 2010, pp. 793-798.
Shojania et al., "Experiences with MPEG-4 Multimedia Streaming", CiteSeer, Jan. 2001, 3 pgs., DOI: 10.1145/500141.500221.
Siglin, "HTTP Streaming: What You Need to Know", streamingmedia.com, 2010, 15 pgs.
Siglin, "Unifying Global Video Strategies, MP4 File Fragmentation for Broadcast, Mobile and Web Delivery", Nov. 16, 2011, 16 pgs.
Silvia, "Adaptive HTTP Streaming for Open Codecs", Oct. 9, 2010, [retrieved on: Mar. 2, 2018, https://gingertech.net/2010/10/09/adaptive-http-streaming-for-open-codecs/, 15 pgs.
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP—Standards and Design Principles", Proceedings of the second annual ACM conference on Multimedia, Feb. 2011, pp. 133-145.
Symes, "Video Compression Demystified", McGraw-Hill, 2001, 353 pgs. (presented in two parts).
Tan, Yap-Peng et al., "Video transcoding for fast forward/reverse video playback", IEEE ICIP, 2002, pp. I-713 to I-716.
Taxan, "AVel LinkPlayer2 for Consumer", I-O Data USA—Products—Home Entertainment, printed May 4, 2007 from http://www.iodata.com/usa/products/products.php?cat=HNP&sc=AVEL&pld=AVLP2/DVDLA&ts=2&tsc, 1 pg.
Taymans et al., "GStreamer Application Development Manual (1.6.0)", 2007, 159 pgs.
Thomas et al., "A Novel Secure H.264 Transcoder Using Selective Encryption", Proceedings in International Conference on Image Processing, Jan. 2007, vol. 4, pp. IV-85-IV-88, DOI: 10.1109/ICIP.2007.4379960.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Toscher et al., "The BigChaos Solution to the Netflix Prize 2008", Netflix Prize, Nov. 25, 2008, 17 pgs.
Tosun et al., "Efficient multi-layer coding and encryption of MPEG video streams", 2000 IEEE International Conference on Multimedia and Expo. ICME2000. Proceedings. Latest Advances in the Fast Changing World of Multimedia (Cat. No. 00TH8532), Jul. 30-Aug. 2, 2000, pp. 119-122, DOI: 10.1109/ICME.2000.869559.
Trappe et al., "Key Management and Distribution for Secure Multimedia Multicast", IEEE Transaction on Multimedia, vol. 5, No. 4, Dec. 2003, pp. 544-557.
Tripathi et al, "Improving Multimedia Streaming with Content-Aware Video Scaling", Retrieved from: http://digitalcommons.wpi.edu/computerscience-pubs/96, 2001, 17 pgs.
Um, "Selective Video Encryption of Distributed Video Coded Bitstreams and Multicast Security over Wireless Networks", Thesis, Aug. 2006, 142 pgs.
Unknown, "AVI RIFF File Reference (Direct X 8.1 C++ Archive)", printed from http://msdn.microsoft.com/archive/en-us/dx81_c/directx_cpp/htm/avirifffilereference.asp?fr . . . on Mar. 6, 2006, 7 pgs.
Unknown, "Entropy and Source Coding (Compression)", TCOM 570, 1999-9, pp. 1-22.
Unknown, "MPEG-4 Video Encoder: Based on International Standard ISO/IEC 14496-2", Patni Computer Systems, Ltd., publication date unknown, 15 pgs.
Van Deursen et al., "On Media Delivery Protocols in the Web", 2010 IEEE International Conference on Multimedia and Expo, Jul. 19-23, 2010, 6 pgs.
Van Grove, Jennifer "Top 5 Ways to Share Videos on Twitter", Mashable, May 23, 2009, Retrieved from: https://mashable.com/2009/05/23/video-for-twitter/#Jvn9IIYy6qqA, 6 pgs.
Venkatramani et al., "Securing Media for Adaptive Streaming", Multimedia 2003 Proceedings of the Eleventh ACM International Conference on Multimedia, Nov. 2-8, 2003, Berkeley, California, 4 pgs.
Ventura, Guillermo Albaida "Streaming of Multimedia Learning Objects", AG Integrated Communication System, Mar. 2003, 101 pgs.
Waggoner, "Compression for Great Digital Video", 2002, 184 pgs.
Wang, "Lightweight Encryption in Multimedia", Thesis, Jun. 2005, 184 pgs.
Wang et al., "Image Quality Assessment: From Error Visibility to Structural Similarity", IEEE Transactions on Image Processing, Apr. 2004, vol. 13, No. 4, pp. 600-612.
Watanabem et al., "MPEG-2 decoder enables DTV trick plays", esearcher System LSI Development Lab, Fujitsu Laboratories Ltd., Kawasaki, Japan, Jun. 2001, 2 pgs.
Weng, "A Multimedia Socail-Networking Community for Mobile Devices", 2007, 30 pgs.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010, 43 pgs.
Wong, "Web Client Programming with Perl", 1997, printed Jan. 8, 2021 from: https://www.oreilly.com/openbook-webclientch03.html, 31 pgs.
Wu, "A Fast MPEG Encryption Algorithm and Implementation of AES on CAM", Thesis, Oct. 6, 2003, 91 pgs.
Wu, Feng et al., "Next Generation Mobile Multimedia Communications: Media Codec and Media Transport Perspectives", In China Communications, Oct. 2006, pp. 30-44.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.
Yuksel, "Partial Encryption of Video for Communication and Storage", Thesis, Sep. 2003, 78 pgs.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.
Zambelli, "IIS Smooth Streaming Technical Overview", Microsoft Corporation, Mar. 31, 2009, XP055009366, Retrieved from the Internet: URL:http://img.prodek.It/documents/IIS_Smooth_Streaming_Technical_Overview.pdf, 17 pgs.
"Process (computing)", Wikipedia, Retrieved from: https://en.wikipedia.org/wiki/Process_(computing), Page last edited Sep. 5, 2024, Printed: Sep. 22, 2024, 6 pgs.
"SWF and FLV File Format Specification", Adobe, Jun. 2007, Version 9, 298 pgs.
"Transparent end-to-end packet switched streaming service (PSS); 3GPP file format (3GP) (Release 9)", 3GPP TS 26.244 V9.0.0 (2009-12), sections 7.1-7.4., Dec. 2009, 52 pgs.
"Video File Format Specification", Adobe, Apr. 2008, Version 9, 46 pgs.
Cheng, "Partial Encryption for Image and Video Communication", Thesis, Fall 1998, 95 pgs.

(56) References Cited

OTHER PUBLICATIONS

Hunt, "Encoding for streaming", The Netflix Blog, Nov. 6, 2008, printed from https://web.archive.org/web/20081216044437/http:/blog.netflix.com/2008/11/enc oding-for-streaming.htm., retrieved on Feb. 8, 2022, 28 pgs.
Knott, Gary D. "A Proposal for Certain Process Management and Intercommunication Primitives", ACM SIGOPS Operating Systems Review, Jan. 1975, 38 pgs.
Pereira, "Security on Over the Top TV Services", Thesis, Nov. 2011, 114 pgs.
Stockhammer, "MPEG's Dynamic Adaptive Streaming over http (Dash)—An Enabling Standard for Internet TV", Qualcomm Incorporated, Apr. 11, 2015, Retrieved from the Internet, https://www.w3.org/2011/09/webtv/slides/W3C- Workshop.pdf, 30 pgs.
Trott et al., "File format provides a useful tool to multimedia authors", INFOWORLD, Apr. 13, 1998, 1 pg.
Watson, Mark "Input for Dash EE#1 (CMP): Pixel Aspect Ratio", 94. MPEG Meeting; Oct. 11, 2010-Oct. 15, 2010; Guangzhou; (Motion Picture Expert Group or ISO/IEC JTC1/SC29/ WG11), No. M18498, Oct. 28, 2010 (Oct. 28, 2010), XP030047088, Oct. 2, 2010, 4 pgs.
Zhang et al., "Implementing Hierarchical Trick Play for HTTP Video Streaming", Globecom Workshops (GC Wkshps), 2010 IEEE, Piscataway, NJ, USA, Dec. 6, 2010, XP031859257, ISBN: 978-1-4244-8863-6, pp. 465-468.
"Order" Conduct of the Proceeding, Case No. IPR2020-00614, U.S. Pat. No. 7,295,673 B2 and Case No. IPR2020-00646, U.S. Pat. No. 8,472,792 B2, filed Jun. 30, 2020, 4 pgs.
3GPP TS 26.247, V10.1.0, 3rd Generation Partnership Project; Technical Specification Group Services and System Aspects Transparent end-to-end Packet-switches Streaming Services (PSS), Nov. 2011, 112 pgs.
Chinese Patent Application 201180060590.1 office action dated Aug. 6, 2015, 11 pgs.
Decision Denying Institution of Inter Partes Review for U.S. Pat. No. 7,295,673, Case No. IPR2020-00614, Sep. 11, 2020, 22 pgs.
Decision Granting Institution of Inter Partes Review for U.S. Pat. No. 8,472,792, Case No. IPR2020-00646, Sep. 15, 2020, 57 pgs.
Declaration of Patrick McDaniel, Ph.D., Inter Partes Review of U.S. Pat. No. 7,295,673, Case No. IPR2020-00614, Ipr filed Feb. 28, 2020, 218 pgs.
Examination report for GB1308663.2, dated May 18, 2016, 3 pgs.
Extended European Search Report for European Application EP12828956.8, Report Completed Feb. 18, 2015, Mailed Mar. 2, 2015, 13 pgs.
Extended European Search Report for European Application No. 21208230.9, Search completed Feb. 18, 2022, Mailed Mar. 1, 2022, 15 pgs.
Extended European Search Report for European Application No. 22196553.6, Search completed Dec. 1, 2022, Mailed Dec. 14, 2022, 13 pgs.
Filed Application and Filing Receipt for U.S. Provisional U.S. Appl. No. 61/359,748, Application filed Jun. 29, 2010, Receipt mailed Jul. 13, 2010, 38 pgs.
Great Britain Application GB1308663.2 search report dated Jan. 5, 2017, 1 pg.
Hulu Invalidity Chart for U.S. Pat. No. 7,295,673, Case No. IPR2020-00614, IPR filed Feb. 29, 2020, 17 pgs.
International Preliminary Report on Patentability for International Application No. PCT/US2012/053052, Completed Mar. 4, 2014, 8 pgs.
International Preliminary Report on Patentability for International Application No. PCT/US2012/053223, Report Issued Mar. 4, 2014, 7 pgs.
International Search Report and Written Opinion for International Application No. PCT/US2012/053052, International Filing Date Aug. 30, 2012, Report Completed Oct. 25, 2012, Mailed Nov. 16, 2012, 9 pgs.
International Search Report and Written Opinion for International Application No. PCT/US2012/053223, International Filing Date Aug. 30, 2012, Report Completed Dec. 7, 2012, Mailed Mar. 7, 2013, 10 pgs.
International Search Report and Written Opinion for International Application PCT/US2012/053053, search completed Oct. 23, 2012, mailed Nov. 13, 2012, 11 pgs.
International Search Report for International Application No. PCT/SE2011/050166, Search completed Mar. 30, 2011, Mailed Mar. 30, 2011, 5 pgs.
ISO/IEC 14496-12 Information technology—Coding of audio-visual objects—Part 12: ISO base media file format, Amendment 3: DASH support and RTP reception hint track processing, 2011, 44 pgs.
ISO/IEC 14496-12:2008(E) Informational Technology—Coding of Audio-Visual Objects Part 12: ISO Base Media File Format, Oct. 2008, 120 pgs.
ISO/IEC CD 23001-6 MPEG systems technologies Part 6: Dynamic adaptive streaming over HTTP (DASH), Oct. 15, 2010, 70 pgs.
ISO/IEC DIS 23009-1, Information technology—Dynamic adaptive streaming over HTTP (DASH)—Part 1: Media presentation description and segment formats, dated Aug. 30, 2011, 132 pgs.
ISO/IEC JTC1/SC29/WG11, MPEG/M18620, Oct. 2010, Text of ISO/IEC 23001-6: Dynamic adaptive streaming over http (Dash), 72 pgs.
ISO/IEC JTC1/SC29/WG11, MPEG/N11578, Text of ISO/IEC 23001-6: Dynamic adaptive streaming over HTTP (DASH), Oct. 2010, 70 pgs.
ISO/IEC JTC1/SC29-WG11—Coding of Moving Pictures and Audio, MPEG2010/M18692, Jan. 2010, 10 pgs.
Netflix Invalidity Chart for U.S. Pat. No. 7,295,673, Case No. IPR2020-00614, IPR filed Feb. 29, 2020, 17 pgs.
Patent Owner's Preliminary Response to Petition for Inter Partes Review of U.S. Pat. No. 7,295,673, Case No. IPR2020-00614, filed Jun. 17, 2020, 52 pgs.
Patent Owner's Preliminary Surreply to Petition for Inter Partes Review, Case No. IPR2020-00614, U.S. Pat. No. 7,295,673, filed Feb. 29, 2020, 14 pgs.
Patent Owner's Preliminary Surreply to Petition for Inter Partes Review, Case No. IPR2020-00646, U.S. Pat. No. 8,472,792, filed Jul. 15, 2020, 14 pgs.
Petition for Inter Partes Review of U.S. Pat. No. 7,295,673, IPR2020-00614, Ipr filed Feb. 29, 2020, 89 pgs.
Petitioners' Reply to Patent Owner's Preliminary Response, Case No. IPR2020-00614, U.S. Pat. No. 7,295,673, Jul. 8, 2020, 13 pgs.
Petitioner's Request for Rehearing, Case No. IPR2020-00614, U.S. Pat. No. 7,295,673, filed Oct. 12, 2020, 14 pgs.
Search Report for Canadian patent application 2,816,621, dated Oct. 30, 2014, 6 pgs.
Search report for European Patent Application 11838186.2, dated Jul. 13, 2017, 6 pgs.
U.S. International Trade Commission, In the Matter of Certain Video Processing Devices and Components Thereof, Inv. No. 337-TA-1343, Order No. 24: Construing Certain Claim Terms, Aug. 2, 2023, 47 pgs.
United States Patent and Trademark Office, In re Campana, Jr., et al., Control Nos. U.S. Appl. No. 90/007,726, U.S. Appl. No. 90/007,726, U.S. Appl. No. 90/007,726, Decision Denying Petition, Feb. 22, 2007, 11 pgs.
Decision Granting Petitioner's Request on Rehearing 37 C.F.R. § 42.71(d) Granting Institution of Inter Partes Review 35 U.S.C. § 314, IPR2020-00614 Patent 7,295,673, Dec. 16, 2020, 29 pgs.
"Adaptive HTTP Streaming in PSS—Client Behaviour", S4-AHI129, 3GPP TSG-SA4 Ad-Hoc Meeting, Dec. 13-15, 2009, Paris, France; section 12.6.1., 3 pgs.
"Adaptive HTTP Streaming in PSS—Data Formats for HTTP-Streaming excluding MPD", S4-AHI128, 3GPP TSGSA4 Ad-Hoc Meeting, Dec. 13- 15, 2009, Paris, France; sections 12.2.1 and 12.2.4.2.1., 8 pgs.
"Adaptive HTTP Streaming in PSS—Discussion on Options", S4-AHI130, 3GPP TSG-SA4 Ad-Hoc Meeting, Dec. 14-16, 2009, Paris, France; sections 1, 2.7-2.8, and 2.16-2.19., 7 pgs.

(56) References Cited

OTHER PUBLICATIONS

"Adobe Flash Video File Format Specification", Aug. 2010, Version 10.1, 89 pgs.
"Delivering Live and On-Demand Smooth Streaming", Microsoft Silverlight, 2009, 28 pgs.
"Fragmented Time Indexing of Representations", S4-AHI126, 3GPP TSG-SA4 Ad-Hoc Meeting, Dec. 14-16, 2009, Paris, France, 4 pgs.
"Microsoft and Leading Professional Media Companies Release Advanced Authoring Format Specification", Retrieved from: https://news.microsoft.com/1998/04/03/microsoft-and-leading-professional- media-companiesrelease-advanced-authoring-format-specification/, Apr. 3, 1998, 10 pgs.
"Pixel aspect ratio—Wikipedia", Nov. 24, 2010, pp. 1-8.

\* cited by examiner

SYSTEMS AND METHODS FOR DISTRIBUTING CONTENT USING A COMMON SET OF ENCRYPTION KEYS

CROSS REFERENCE TO RELATED APPLICATIONS

The current application is a continuation of U.S. patent application Ser. No. 17/024,373, filed Sep. 17, 2020, entitled "Systems and Methods for Distributing Content Using a Common Set of Encryption Keys" to Kiefer et al., which is a continuation of U.S. patent application Ser. No. 16/414,649, filed May 16, 2019, and issued Dec. 1, 2020 as U.S. Pat. No. 10,856,020, entitled "Systems and Methods for Distributing Content Using a Common Set of Encryption Keys" to Kiefer et al., which is a continuation of U.S. patent application Ser. No. 16/155,811, filed Oct. 9, 2018, and issued Jul. 2, 2019 as U.S. Pat. No. 10,341,698, entitled "Systems and Methods for Distributing Content Using a Common Set of Encryption Keys" to Kiefer et al., which is a continuation of U.S. patent application Ser. No. 15/481,340, filed Apr. 6, 2017 and issued on Mar. 26, 2019 as U.S. Pat. No. 10,244,272, entitled "Systems and Methods for Playing Back Alternative Streams of Protected Content Protected Using Common Cryptographic Information" to Kiefer et al., which is a continuation of U.S. patent application Ser. No. 14/970,412, filed Dec. 15, 2015 and issued Apr. 11, 2017 as U.S. Pat. No. 9,621,522, entitled "Systems and Methods for Playing Back Alternative Streams of Protected Content Protected Using Common Cryptographic Information" to Kiefer et al., which is a continuation of U.S. patent application Ser. No. 14/564,003, filed Dec. 8, 2014 and issued on Jan. 26, 2016 as U.S. Pat. No. 9,247,311, entitled "Systems and Methods for Playing Back Alternative Streams of Protected Content Protected Using Common Cryptographic Information" to Kiefer et al., which is a continuation of U.S. patent application Ser. No. 13/340,623, filed Dec. 29, 2011 and issued on Dec. 9, 2014 as U.S. Pat. No. 8,909,922, entitled "Systems and Methods for Playing Back Alternative Streams of Protected Content Protected Using Common Cryptographic Information" to Kiefer et al., which claims priority under 35 U.S.C. § 119(e) to U.S. Provisional Application Ser. No. 61/530,305 filed Sep. 1, 2011, entitled "Multi-Asset Protected Content Multimedia Delivery System", the disclosures of which are expressly incorporated by reference herein in their entirety.

FIELD OF THE INVENTION

The present invention generally relates to adaptive streaming and more specifically to adaptive bitrate streaming of encoded media contained within Matroska container files using Hypertext Transfer Protocol.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. In many instances, content is divided into multiple streams. For example, content can be divided into audio, video, and subtitle streams and some streams can be encoded as alternative streams that are suitable for different network connection bandwidths or comply with specific geographic restrictions and/or other restrictions.

Adaptive bit rate streaming or adaptive streaming involves detecting the present streaming conditions (e.g. the user's network bandwidth and CPU capacity) in real time and adjusting the quality of the streamed media accordingly by selecting between different streams encoded for use at different network connection data rates. Typically, the source media is encoded at multiple bitrates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616 to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Washington, and Flash Dynamic Streaming developed by Adobe Systems Incorporated of San Jose, California. HTTP Adaptive Bitrate Streaming developed by Apple Computer Incorporated of Cupertino, California implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, California utilizes an extension of the Matroska container format (i.e. is based upon the Matroska container format, but includes elements that are not specified within the Matroska format).

The term Digital Rights Management (DRM) is utilized to describe access control technologies that are used to control access to and/or copying of digital content. DRM systems typically involve the use of cryptographic information to control access to or protect a piece of content. Content protection is typically achieved using cryptographic information such as (but not limited to) one or more encryption keys to encrypt some or all of the content. An important component of most DRM systems is a mechanism for securely providing cryptographic information to authorized playback devices for use in accessing protected content. The protected content cannot be accessed without the cryptographic data and ideally the cryptographic data is bound to specific playback devices and cannot be readily used by unauthorized playback devices or is securely provided to the playback devices (often on a session basis).

SUMMARY OF THE INVENTION

Systems and methods in accordance with embodiments of the invention perform adaptive bitrate streaming using alternative streams of protected content. One embodiment of the invention includes a processor, and memory containing a client application. In addition, the client application configures the processor to: request a top level index file identifying a plurality of alternative streams of protected content, where each of the alternative streams of protected content are encrypted using common cryptographic information; obtain the common cryptographic information; request portions of content from at least the plurality of alternative streams of protected content; access the protected content using the common cryptographic information; and playback the content.

In a further embodiment, the alternative streams of protected content are alternative streams of protected video, each of the alternative streams of protected video includes DRM information indicating portions of frames of video that are encrypted and identifying at least a portion of the common cryptographic information used to access the encrypted portions of the frames of video, and the client application configures the processor to: obtain a protected frame of video from one of the alternative streams of protected video; obtain DRM information indicating a portion of the protected frame of video that is encrypted; identify at least a portion of the common cryptographic information that is used to access the encrypted portion of the protected frame using the DRM information; decrypt the encrypted portion of the protected frame of video using the identified portion of the common cryptographic information; and decode the frame of video.

In another embodiment, each of the alternative streams of protected content is contained within a separate container file, and the top level index file identifies a container file containing each of the alternative streams.

In still further embodiment, the container files containing each of the alternative streams of protected content includes at least one header including the common cryptographic information and information that describes the encoding of the stream of protected content, and the top level index file identifies the location of the at least one header within each container file.

In still another embodiment, the common cryptographic information is a set of encryption keys.

In a yet further embodiment, the common set of encryption keys is encrypted; and the client application configures the processor to securely receive cryptographic information used to unencrypt the common set of encryption keys.

In yet another embodiment, the client application configures the processor to obtain the common cryptographic information by requesting at least one header of a container file identified in the top level index file.

In a further embodiment again, each container file containing one of the alternative streams of protected content further includes an index, and the client application configures the processor to request a portion of content from one of the container files by configuring the processor to: request at least a portion of an index from the container file; identify the portion of the container file containing a specific portion of content using the index; and request the identified portion of the container file.

In another embodiment again, the container files are Matroska container files.

In a further additional embodiment, the common cryptographic information is stored in a common DRM Header element contained within a Tracks element within each of the Matroska container files containing the alternative streams of protected content.

In another additional embodiment, the common cryptographic information is a set of encryption keys; and the set of encryption keys is encrypted and stored within the DRM Header element.

In a still yet further embodiment, the client application configures the processor to: obtain cryptographic information that can be used to unencrypt the set of encryption keys stored within the DRM Header element; and unencrypt the set of encryption keys stored within the DRM Header element using the obtained cryptographic information.

In still yet another embodiment, the client application configures the processor to obtain the DRM Header element by requesting a Tracks element from one of the Matroska container files identified in the top level index file.

In a still further embodiment again, each Mastroska container file containing an alternative stream of protected content further includes an index contained within a Cues element, and the client application configures the processor to request a portion of content from one of the Matroska container files by configuring the processor to: request at least a portion of a Cues element from a Matroska container file containing one of the alternative streams of protected content; identify a portion of the Matroska container file containing a specific portion of content using at least one CueTrackPosition element within the Cues element; and request the portion of the Matroska container file identified by the at least one CueTrackPosition element.

In still another embodiment again, the index includes a plurality of CueTrackPosition elements that identify the location of a plurality of Cluster elements within the Matroska container file.

In a still further additional embodiment, each Cluster element contains a plurality of BlockGroup elements including encoded portions of content, a CueTrack Position element indexes each Cluster element, and each CueTrackPosition element includes the size of the Cluster element that it indexes.

In still another additional embodiment, the alternative streams of protected content are alternative streams of protected video, each of the Matroska container files containing an alternative stream of protected video includes a DRMInfo element in a BlockGroup element containing a protected frame of video, where the DRMInfo element indicates at least a portion of the protected frames of video that is encrypted and identifies at least a portion of the common cryptographic information used to access the at least one encrypted portion of the protected frame of video, and the client application configures the processor to access video frames in a stream of protected video using the common cryptographic information by configuring the processor to: obtain a BlockGroup containing a protected frame of video; parse the BlockGroup element to obtain a DRMInfo element indicating at least a portion of the protected frame of video that is encrypted using an encryption key from the set of encryption keys; decrypt the at least one encrypted portion of the protected frame of video using the identified encryption key; and decode the frame of video.

An embodiment of the method of the invention includes requesting a top level index file identifying a plurality of alternative streams of protected content using a playback device, where each of the alternative streams of protected content are encrypted using common cryptographic information, obtaining the common cryptographic information using the playback device, requesting portions of content from at least the plurality of alternative streams of protected content using the playback device, accessing the protected content using the playback device and the common cryptographic information, and playing back the content using the playback device.

In a further embodiment of the method of the invention, the alternative streams of protected content are alternative streams of protected video, each of the alternative streams of protected video includes DRM information indicating portions of frames of video that are encrypted and identifying at least a portion of the common cryptographic information used to access the encrypted portions of the frames of video, and the method further includes obtaining a protected frame of video from one of the alternative streams of protected video using the playback device, obtaining DRM information indicating a portion of the protected frame of video that is encrypted using the playback device, identify at least a portion of the common cryptographic information that is used to access the encrypted portion of the protected frame using the playback device and the DRM information, decrypting the encrypted portion of the protected frame of video using the playback device and the identified portion of the common cryptographic information, and decoding the frame of video using the playback device.

In another embodiment of the method of the invention, each of the alternative streams of protected content is contained within a separate container file, and the top level index file identifies a container file containing each of the alternative streams.

In a still further embodiment of the invention, the container files containing each of the alternative streams of protected content include at least one header including the common cryptographic information and information that describes the encoding of the stream of protected content, and the top level index file identifies the location of the at least one header within each container file.

In still another embodiment of the method of the invention, the common cryptographic information is a set of encryption keys.

In a yet further embodiment of the method of the invention, the set of encryption keys is encrypted so that it is accessible using cryptographic information obtained by the playback device, and the method further comprising obtaining cryptographic information using the playback device.

In yet another embodiment of the method of the invention, the set of encryption keys is encrypted using at least one encryption key, and the playback device securely obtains the at least one encryption key.

In a further embodiment again of the method of the invention, the at least one encryption key is encrypted using at least one encryption key included in the cryptographic information bound to the playback device.

Another embodiment again of the method of the invention also includes obtaining the common cryptographic information by requesting at least one header of a container file identified in the top level index file using the playback device.

In a further additional embodiment of the method of the invention, each container file containing one of the alternative streams of protected content further includes an index, and the method further includes: requesting at least a portion of an index from the container file using the playback device; identify the portion of the container file containing a specific portion of content using the playback device and the index; and requesting the identified portion of the container file using the playback device.

In another additional embodiment of the method of the invention, the container files are Matroska container files.

In a still yet further embodiment of the method of the invention, the common cryptographic information is stored in a common DRM Header element contained within a Tracks element within each of the Matroska container files containing the alternative streams of protected content.

In still yet another embodiment of the method of the invention, the common cryptographic information is a set of encryption keys, and the set of encryption keys is encrypted and stored within the DRM Header element.

In a still further embodiment again of the method of the invention, the set of encryption keys is encrypted so that it is accessible using cryptographic information obtained by the playback device, and the method further comprising obtaining cryptographic information using the playback device.

Still another embodiment again of the method of the invention also includes obtaining the DRM Header element by requesting a Tracks element from one of the Matroska container files identified in the top level index file.

In a still further additional embodiment of the method of the invention, each Mastroska container file containing an alternative stream of protected content further includes an index contained within a Cues element, and the method further includes: requesting at least a portion of a Cues element from a Matroska container file containing one of the alternative streams of protected content using the playback device; identifying a portion of the Matroska container file containing a specific portion of content using the playback device and at least one CueTrackPosition element within the Cues element; and requesting the portion of the Matroska container file identified by the at least one CueTrackPosition element.

In still another additional embodiment of the method of the invention, the index includes a plurality of CueTrackPosition elements that identify the location of a plurality of Cluster elements within the Matroska container file.

In a yet further embodiment again of the method of the invention, each Cluster element contains a plurality of BlockGroup elements including encoded portions of content, a CueTrack Position element indexes each Cluster element, and each CueTrackPosition element includes the size of the Cluster element that it indexes.

In yet another embodiment again of the method of the invention, the alternative streams of protected content are alternative streams of protected video, each of the Matroska container files containing an alternative stream of protected video includes a DRMInfo element in a BlockGroup element containing a protected frame of video, where the DRMInfo element indicates at least a portion of the protected frames of video that is encrypted and identifies at least a portion of the common cryptographic information used to access the at least one encrypted portion of the protected frame of video, and the method further includes: obtaining a BlockGroup containing a protected frame of video using the playback device; parsing the BlockGroup element to obtain a DRMInfo element indicating at least a portion of the protected frame of video that is encrypted using the playback device and an encryption key from the set of encryption keys; decrypting the at least one encrypted portion of the protected frame of video using the playback device and the identified encryption key; and decoding the frame of video using the playback device.

Another further embodiment includes a machine readable medium containing processor instructions, where execution of the instructions by a processor causes the processor to perform a process including request a top level index file identifying a plurality of alternative streams of protected content, where each of the alternative streams of protected content are encrypted using common cryptographic information, obtaining the common cryptographic information, requesting portions of content from at least the plurality of alternative streams of protected content, accessing the protected content using the common cryptographic information, and playing back the content.

In still another further embodiment, the alternative streams of protected content are alternative streams of protected video, each of the alternative streams of protected video includes DRM information indicating portions of frames of video that are encrypted and identifying at least a portion of the common cryptographic information used to access the encrypted portions of the frames of video, and execution of the instructions by a processor also causes the processor to perform a process including: obtaining a protected frame of video from one of the alternative streams of protected video; obtaining DRM information indicating a portion of the protected frame of video that is encrypted; identify at least a portion of the common cryptographic information that is used to access the encrypted portion of the protected frame using the DRM information; decrypting the encrypted portion of the protected frame of video using and the identified portion of the common cryptographic information; and decoding the frame of video.

In yet another further embodiment, the machine readable medium is non-volatile memory.

DETAILED DISCLOSURE OF THE INVENTION

Figure 1A:
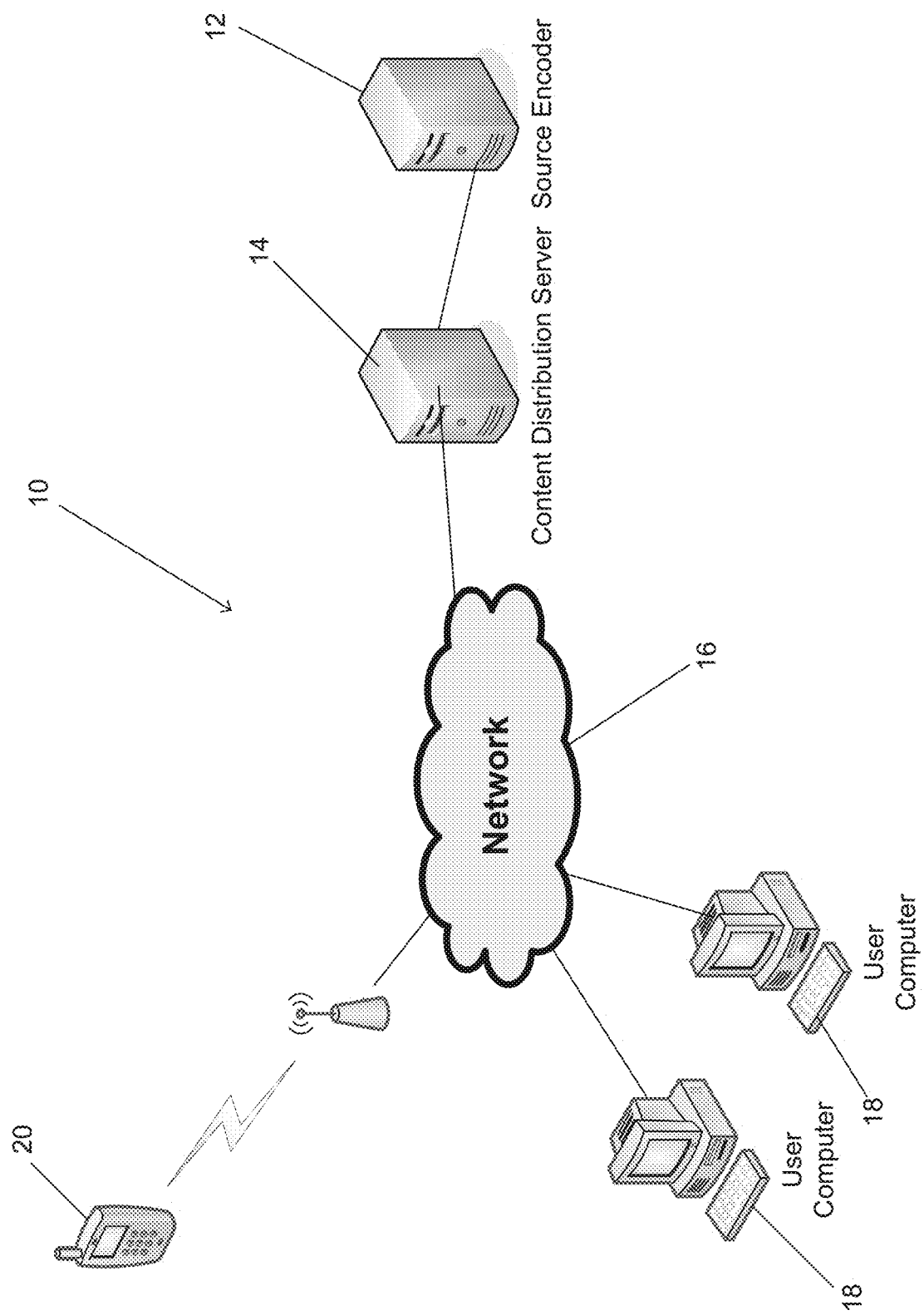
FIG. 1A is a network diagram of an adaptive bitrate streaming system in accordance with an embodiment of the invention.

Turning now to the drawings, systems and methods for performing adaptive bitrate streaming using alternative streams of protected content in accordance with embodiments of the invention are illustrated. In a number of embodiments, source media is encoded as a number of alternative streams and the alternative streams are protected using a common set of cryptographic information. In many embodiments, the alternative streams are video streams and each stream is protected by encrypting at least a portion of a plurality of video frames within the stream using the common set of cryptographic information. In several embodiments, the common set of cryptographic information is a set of frame keys. In order to protect a video frame, a frame key can be selected from the set of frame keys and used to encrypt at least a portion of the encoded frame and DRM information can be provided with the protected frame indicating the frame key utilized to perform the encryption and the location of the encrypted portion within the frame. By encrypting each of the alternative streams using the same set of cryptographic information, a playback device can switch between streams without the need to maintain or acquire multiple sets of cryptographic information in memory or to reinitialize the decryption engine of the playback device with a different set of cryptographic information.

In many embodiments, each of the alternative streams is stored in a separate container file referenced by a top level index file. In several embodiments, the common cryptographic information is embedded in each of the container files so that a playback device has access to the cryptographic information irrespective of which alternative is initially select to commence playback of the media. The common cryptographic information can be stored on a content distribution system and associated with a title identifier or title ID that uniquely identifies the source content used to create the alternative streams. When a new alternative stream is generated, a source encoder can utilize the title ID to request the common cryptographic information from the content distribution system and the common cryptographic information can be utilized to encrypt the new alternative stream and embedded in a container file created to contain the new encrypted alternative stream.

In several embodiments, each stream associated with a piece of source content and/or title ID is stored in a Matroska (MKV) container file. In many embodiments, the Matroska container file is a specialized Matroska container file in that the manner in which the media in each stream is encoded and stored within the container is constrained to improve streaming performance. In several embodiments, the Matroska container file is further specialized in that additional DRM elements (i.e. elements that are not specified as part of the Matroska container format) can be included within the file to facilitate the distribution of protected media during adaptive bitrate streaming. In a number of embodiments, common cryptographic information is included within a DRM header element in each of the Matroska container files and references to the common cryptographic information are made using DRMInfo elements within a BlockGroup element corresponding to a specific frame of encrypted video. In other embodiments, any of a variety of mechanisms can be utilized to store DRM information within a Matroska container in accordance with embodiments of the invention. In several embodiments, each stream (i.e. audio, video, or subtitle) is stored within a separate Matroska container file. In other embodiments, an encoded video stream is multiplexed with one or more encoded audio, and/or subtitle streams in each Matroska container file.

A top level index file containing an index to the streams contained within each of the container files is also generated to enable adaptive bitrate streaming of the encoded media. In many embodiments, the top level index file is a Synchronized Multimedia Integration Language (SMIL) file containing URIs for each of the Matroska container files. In other embodiments, any of a variety of file formats can be utilized in the generation of the top level index file.

The performance of an adaptive bitstrate streaming system in accordance with embodiments of the invention can be significantly enhanced by encoding each portion of the source video at each bit rate in such a way that the portion of video is encoded in each stream as a single (or at least one) closed group of pictures (GOP) starting with an Instantaneous Decoder Refresh (IDR) frame. The GOP for each stream can then be stored as a Cluster element within the Matroska container file for the stream. In this way, the playback device can switch between streams at the completion of the playback of a Cluster and, irrespective of the stream from which a Cluster is obtained the first frame in the Cluster will be an IDR frame and can be decoded without reference to any encoded media other than the encoded media contained within the Cluster element. In many embodiments, the sections of the source video that are encoded as GOPs are all the same duration. In a number of embodiments each two second sequence of the source video is encoded as a GOP.

Adaptive streaming of source media encoded in the manner outlined above can be coordinated by a playback device in accordance with embodiments of the invention. The playback device obtains information concerning each of the available streams from the top level index file and selects one or more streams to utilize in the playback of the media. The playback device can then obtain header information from the Matroska container files containing the one or more bitstreams or streams, and the headers provide information concerning the decoding of the streams including a DRM header, which contains the cryptographic information utilized to protect the stream. The playback device can also request index information that indexes the encoded media stored within the relevant Matroska container files. The index information can be stored within the Matroska container files or separately from the Matroska container files in the top level index or in separate index files. The index information enables the playback device to request byte ranges corresponding to Cluster elements within the Matroska container file containing specific portions of encoded media via HTTP from the server. As the playback device receives the Cluster elements from the HTTP server, the playback device can evaluate current streaming conditions to determine whether to increase or decrease the bitrate of the streamed media. In the event that the playback device determines that a change in bitrate is necessary, the playback device can obtain header information and index information for the container file(s) containing the desired stream(s) (assuming the playback device has not already obtained this information). The playback device need not perform the computationally intensive process of accessing the encrypted cryptographic information in the header of the new stream, because each of the alternative streams uses common cryptographic information. The index information can then be used to identify the byte range of the Cluster element containing the next portion of the source media encoded at the desired bit rate and the identified Cluster element can be retrieved from the server via HTTP. The next portion of the source media that is requested is typically identified based upon the Cluster elements already requested by the playback device and the Cluster elements buffered by the playback device. The next portion of source media requested from the alternative stream is requested to minimize the likelihood that the buffer of the playback device will underflow (i.e. run out media to playback) prior to receipt of the Cluster element containing the next portion of source media by the playback device. In this way, the playback device can achieve adaptive bitrate streaming by retrieving sequential Cluster elements from the various streams as appropriate to the streaming conditions using the top level index and index information describing the Cluster elements within each of the Matroska container files.

In a number of embodiments, variation in the bitrate between different streams can be achieved by modifying the encoding parameters for each stream including but not limited to the bitrate, frame rate, resolution and sample aspect ratio. The encoding and protection of source video using common cryptographic information for use in adaptive bitrate streaming and the playback of alternative streams of protected content via adaptive bitrate streaming in accordance with embodiments of the invention is discussed further below.

Adaptive Streaming System Architecture

An adaptive bitrate streaming system in accordance with an embodiment of the invention is illustrated in FIG. 1. The adaptive streaming system 10 includes a source encoder 12 configured to encode source media as a number of alternative streams and to protect the encoded streams using common cryptographic information. Alternative streams are streams that encode the same media content in different ways. In several embodiments, the source encoder 12 ingests source content and obtains a title ID and common cryptographic information from a content distribution server 14 that the content distribution server assigns to the source content. The source encoder encodes the alternative streams and protects the streams using the common cryptographic information received from the content distribution server. In many instances, alternative streams encode media content (such as but not limited to video) at different maximum bitrates. In a number of embodiments, the alternative streams are encoded with different resolutions, sample aspect ratios and/or frame rates. When the streams are written to file(s), the common cryptographic information is also written to the file(s). The content distribution server 14 can receive request to access the alternative streams of content (i.e. the title) via the Internet from a playback device such as (but not limited to) a user computer 18 or a mobile phone 20 and can commence streaming content. In several embodiments, the common cryptographic information is protected by encrypting at least a portion of the common cryptographic information using at least one encryption key. The playback device can securely obtain the cryptographic key using a process such as (but not limited to) Hypertext Transfer Protocol Secure or HTTPS. Other processes for securely obtaining cryptographic information to obtain access to encrypted common cryptographic information in accordance with embodiments of the invention are discussed below.

In many embodiments, a playback device commences playback by requesting a top level index file from the content distribution server. The source encoder 12, the content distribution server 14, or another server can generate the top level index to the file(s) containing the streams, at least a plurality of which are alternative streams, at the time the request is made or at the time the streams are generated by the source encoder. The playback device can then use HTTP or another appropriate stateless protocol to request portions of the top level index file and the file(s) containing the protected streams via a network 16 such as the Internet.

In many embodiments, the top level index file is a SMIL file and the media is stored in Matroska container files. As is discussed further below, the media can be stored within the Matroska container file in a way that facilitates the protection of the content using common cryptographic information. In many embodiments, the Matroska container files are specialized Matroska container files that include enhancements (i.e. elements that do not form part of the Matroska file format specification) that facilitate retrieval and decryption using common cryptographic information of specific portions of media during adaptive bitrate streaming.

Although a specific content distribution system configured to support adaptive bitrate streaming is illustrated in FIG. 1A, any of a variety of content distribution system architectures can be utilized to implement an adaptive bitrate streaming system in accordance with embodiments of the invention. Source encoders, content distribution server systems, and playback devices in accordance with embodiments of the invention are discussed further below.

Source Encoders

Figure 1B:
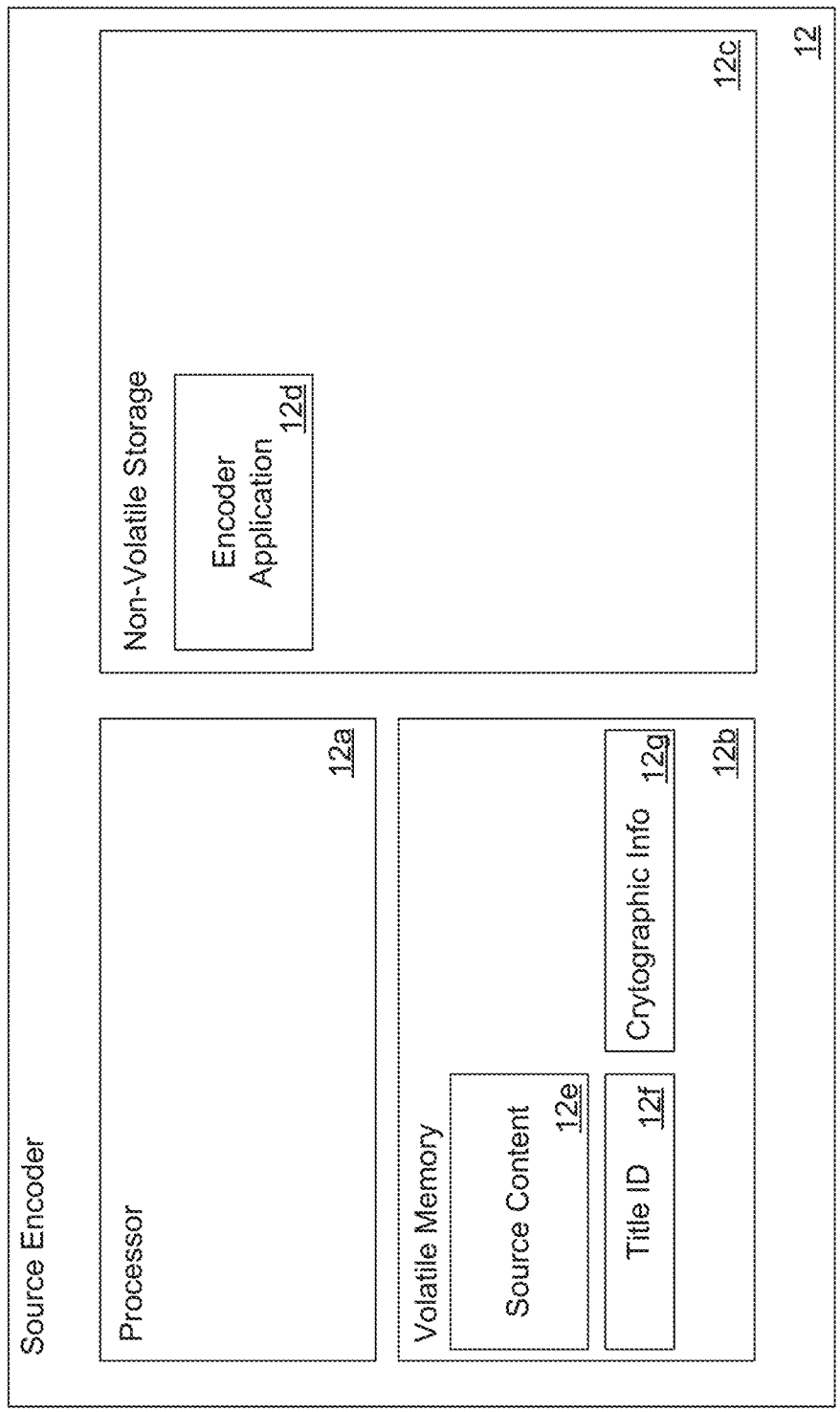
FIG. 1B is a block diagram illustrating a source encoder in accordance with an embodiment of the invention.

In many embodiments, a source encoder can be implemented using a server. In other embodiments, the source encoder can be any processing device including a processor and sufficient resources to perform the transcoding and encryption of source media (including but not limited to video, audio, and/or subtitles). A source encoder in accordance with an embodiment of the invention is illustrated in FIG. 1B. The source encoder 12 is implemented on a computing platform including a processor 12a, volatile memory 12b and non-volatile storage 12c. An encoder application 12d is stored in non-volatile storage 12c. The encoder application includes the machine readable instructions that configure the processor to encode source content 12e as a plurality of streams. In a number of embodiments, the encoder application also configures the source encoder to obtain common cryptographic information 12g that can be utilized to protect alternative streams generated using the source content 12e. In many embodiments, the source encoder obtains the common cryptographic information and a title ID from a content distribution system. In other embodiments, the source encoder generates a title ID and/or cryptographic data and provides the generated information to a content distribution system.

Although a specific source encoder in accordance with embodiments of the invention is illustrated in FIG. 1B, any of a variety of computing platforms can be utilized to implement a source encoder that is configured to encode at least one stream of source content as a plurality of alternative streams and to protect each of the alternative streams using common cryptographic information in accordance with embodiments of the invention.

Content Distribution Servers

Figure 1C:
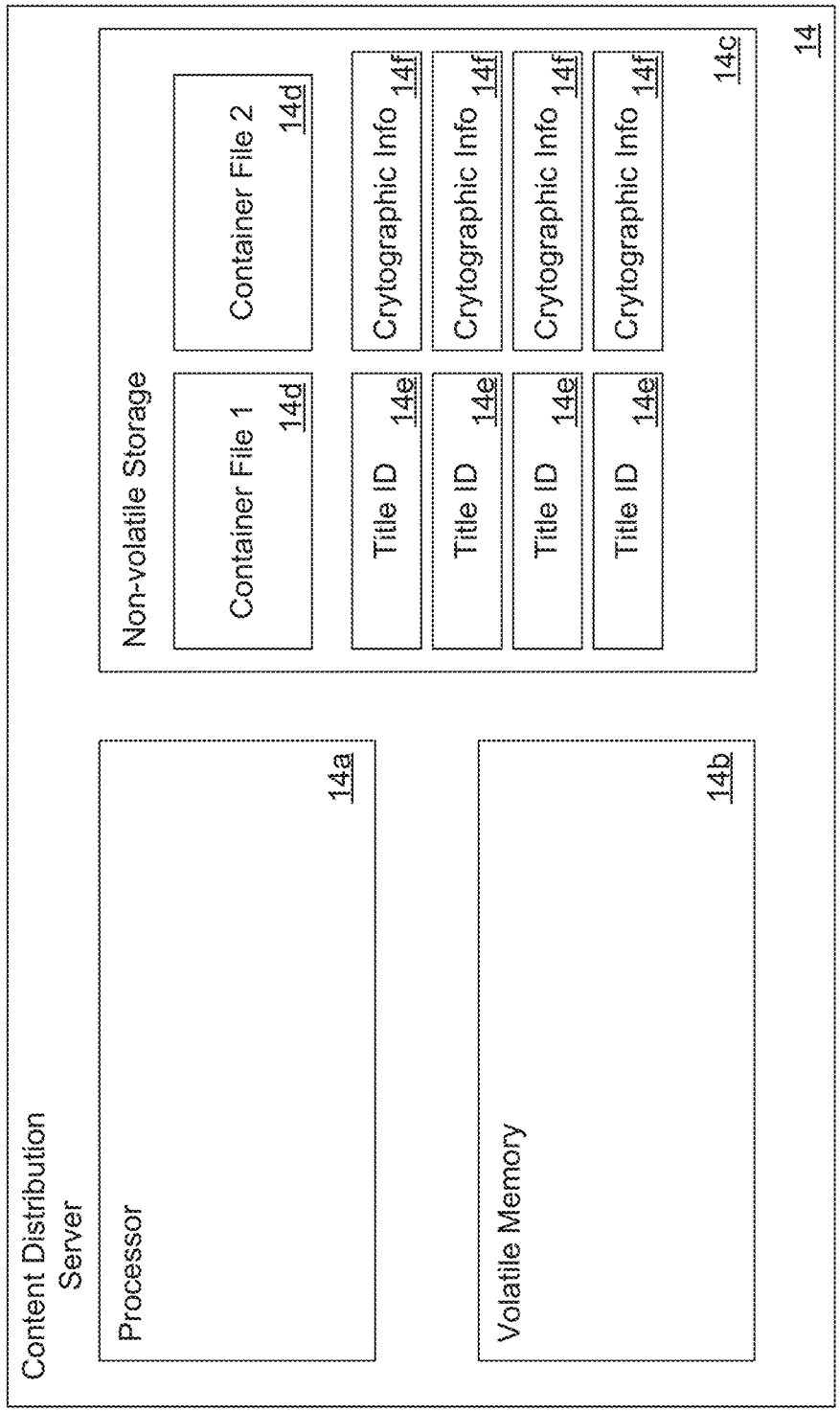
FIG. 1C is a block diagram illustrating a content distribution server in accordance with an embodiment of the invention.

Content distribution servers in accordance with embodiments of the invention can be responsible for storing protected streams of content for streaming to playback devices using adaptive bitrate streaming processes. Content distribution servers can also store common cryptographic information utilized to protect the alternative streams of protected content. In several embodiments, the common cryptographic information is identified utilizing a title ID associated with the common cryptographic information and a set of streams that form part of a specific title or piece of content. A content distribution server in accordance with an embodiment of the invention is illustrated in FIG. 1C. The content distribution server is implemented using a computing platform including a processor 14a, volatile memory 14b, and non-volatile storage 14c. In the illustrated embodiment, a plurality of container files 14d are stored on the content distribution server. Playback devices can stream content from the content distribution server utilizing adaptive bitrate streaming processes in accordance with embodiments of the invention. To facilitate the creation of new streams with respect to a specific piece of content, the content distribution server also stores title IDs 14e for specific pieces of content and common cryptographic information 14f associated with each title ID. A source encoder can request common cryptographic information to protect a new stream related to a specific piece of content, by providing a request to the content distribution server that identifies the specific piece of content using the title ID assigned to it.

Although a specific content distribution server is illustrated in FIG. 1C, any of a variety of computational platform including (but not limited to) platforms in which container files and common cryptographic information are stored on separate servers can be utilized in content distribution systems in accordance with embodiments of the invention.

Playback Devices

Figure 1D:
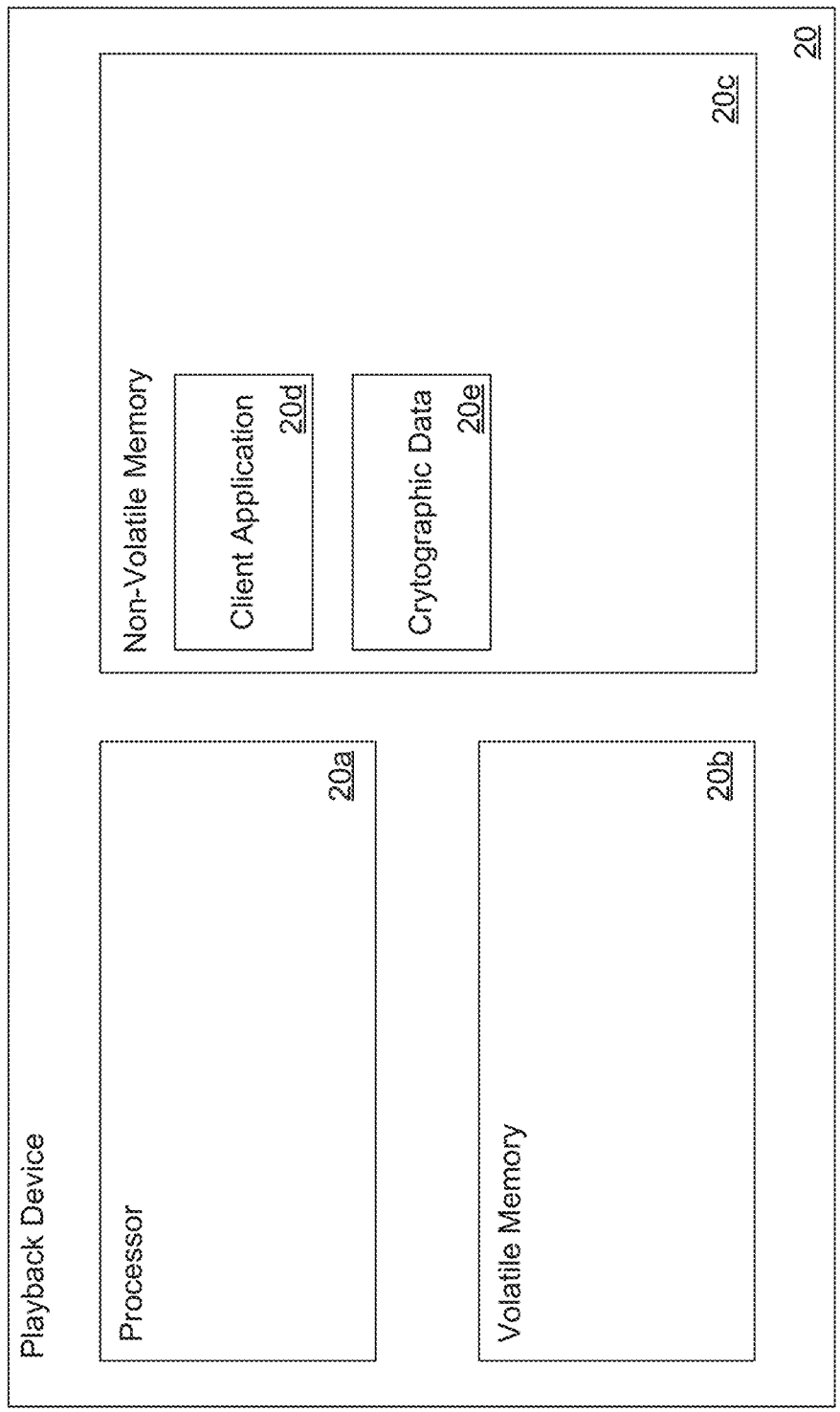
FIG. 1D is a block diagram illustrating a playback device in accordance with an embodiment of the invention.

Referring back to FIG. 1A, the illustrated playback devices include personal computers 18 and mobile phones 20. In other embodiments, playback devices can include consumer electronics devices such as DVD players, Blu-ray players, televisions, set top boxes, video game consoles, tablets, and other devices that are capable of playing back protected media stored on a content distribution server using adaptive bitrate streaming. A playback device in accordance with an embodiment of the invention is illustrated in FIG. 1D. The playback device is implemented on a processing platform 20 including a processor 20a, volatile memory 20b, and non-volatile memory (or other non-volatile storage) 20c. The non-volatile memory 20c contains a client application 20d, which includes machine readable instructions that can be utilized to configure the processor to register with a content distribution system to obtain cryptographic data 20e bound to the playback device. The playback device can then use the bound cryptographic data 20e to request adaptive bitrate streaming of protected content. As is discussed further below, the alternative streams of protected content utilized to perform adaptive bitrate streaming are protected using common cryptographic information. Once the client application 20d has obtained the common cryptographic information, which can be a time consuming and/or computationally intensive process, the playback device can use the same cryptographic information to access content in any of the alternative streams of protected content within a single instance of a title.

Although a specific architecture for a playback device is shown in FIG. 1D any of a variety of architectures can be utilized that enable playback devices to request portions of the top level index file and the container files in accordance with embodiments of the invention.

File Structure

Figure 2:
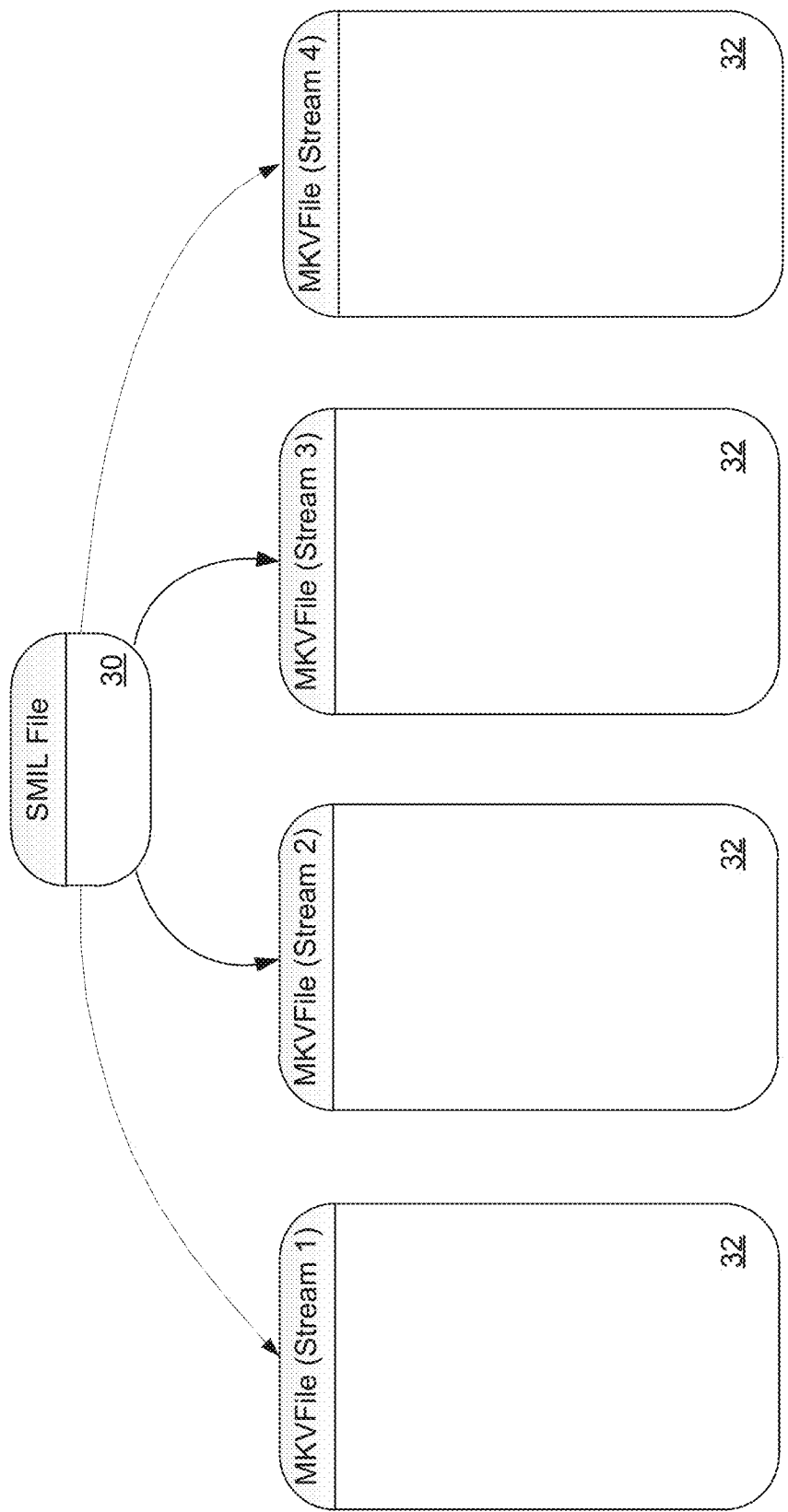
FIG. 2 conceptually illustrates a top level index file and Matroska container files generated by the encoding of source media in accordance with embodiments of the invention.

Files generated by a source encoder and/or stored on an HTTP server for streaming to playback devices in accordance with embodiments of the invention are illustrated in FIG. 2. The files utilized in the adaptive bitrate streaming of the source media include a top level index 30 and a plurality of container files 32 that each contain at least one stream. The top level index file describes the content of each of the container files. As is discussed further below, the top level index file can take a variety of forms including an SMIL file and the container files can take a variety of forms including a specialized Matroska container file.

In many embodiments, each Matroska container file contains a single protected stream. For example, the stream could be one of a number of alternate video streams protected using common cryptographic information, an audio stream, one of a number of alternate audio streams, a subtitle stream, one of a number of alternate subtitle streams, a trick play stream, or one of a number of alternate trick play streams protected using common cryptographic information.

In several embodiments, the Matroska container file includes multiple multiplexed streams. For example, the Matroska container could include a video stream, and one or more audio streams, one or more subtitle streams, and/or one or more trick play streams. As is discussed further below, in many embodiments the Matroska container files are specialized files. The encoding of the media and the manner in which the media is stored within Cluster elements within the Matroska container file can be subject to constraints designed to enhance the performance of an adaptive bitrate streaming system. In a number of embodiments, common cryptographic information is included within a DRM header element in each of the Matroska container files and references to the common cryptographic information are made using DRMInfo elements included within BlockGroup elements of protected (not all frames need be protected to protect the stream). In addition, the Matroska container file can include index elements that facilitate the location and downloading of Cluster elements from the various Matroska container files during the adaptive streaming of the media. Top level index files and Matroska container files that can be used in adaptive bitrate streaming systems in accordance with embodiments of the invention are discussed below.

Top Level Index Files

Playback devices in accordance with many embodiments of the invention utilize a top level index file to identify the container files that contain the streams available to the playback device for use in adaptive bitrate streaming. In many embodiments, the top level index files can include references to container files that each include an alternative stream of encoded media. The playback device can utilize the information in the top level index file to retrieve encoded media from each of the container files according to the streaming conditions experienced by the playback device.

In several embodiments, the top level index file provides information enabling the playback device to retrieve information concerning the encoding of the media in each of the container files and an index to encoded media within each of the container files. In a number of embodiments, each container file includes information concerning the encoded media contained within the container file and an index to the encoded media within the container file and the top level index file indicates the portions of each container file containing this information. Therefore, a playback device can retrieve the top level index file and use the top level index file to request the portions of one or more of the container files that include information concerning the encoded media contained within the container file and an index to the encoded media within the container file. A variety of top level index files that can be utilized in adaptive bitrate streaming systems in accordance with embodiments of the invention are discussed further below.

In a number of embodiments, the top level index file utilized in the adaptive bitrate streaming of media is a SMIL file, which is an XML file that includes a list of URIs describing each of the streams and the container files that contain the streams. The URI can include information such as the "system-bitrate" of the stream contained within the stream and information concerning the location of specific pieces of data within the container file. The top level index SMIL file can be generated when the source media is encoded for playback via adaptive bitrate streaming. Alternatively, the top level index SMIL file can be generated when a playback device requests the commencement of playback of the encoded media. When the playback device receives the top level index SMIL file, the playback device can parse the SMIL file to identify the available streams. The playback device can then select the streams to utilize to playback the content and can use the SMIL file to identify the portions of the container file to download to obtain information concerning the encoding of a specific stream and/or to obtain an index to the encoded media within the container file.

Although top level index SMIL files are described above, any of a variety of top level index file formats can be utilized to create top level index files as appropriate to a specific application in accordance with an embodiment of the invention. The use of top level index files to enable playback of encoded media using adaptive bitrate streaming in accordance with embodiments of the invention is discussed further below.

Storing Protected Media in MKV Files for Adaptive Bitrate Streaming

Figure 3:
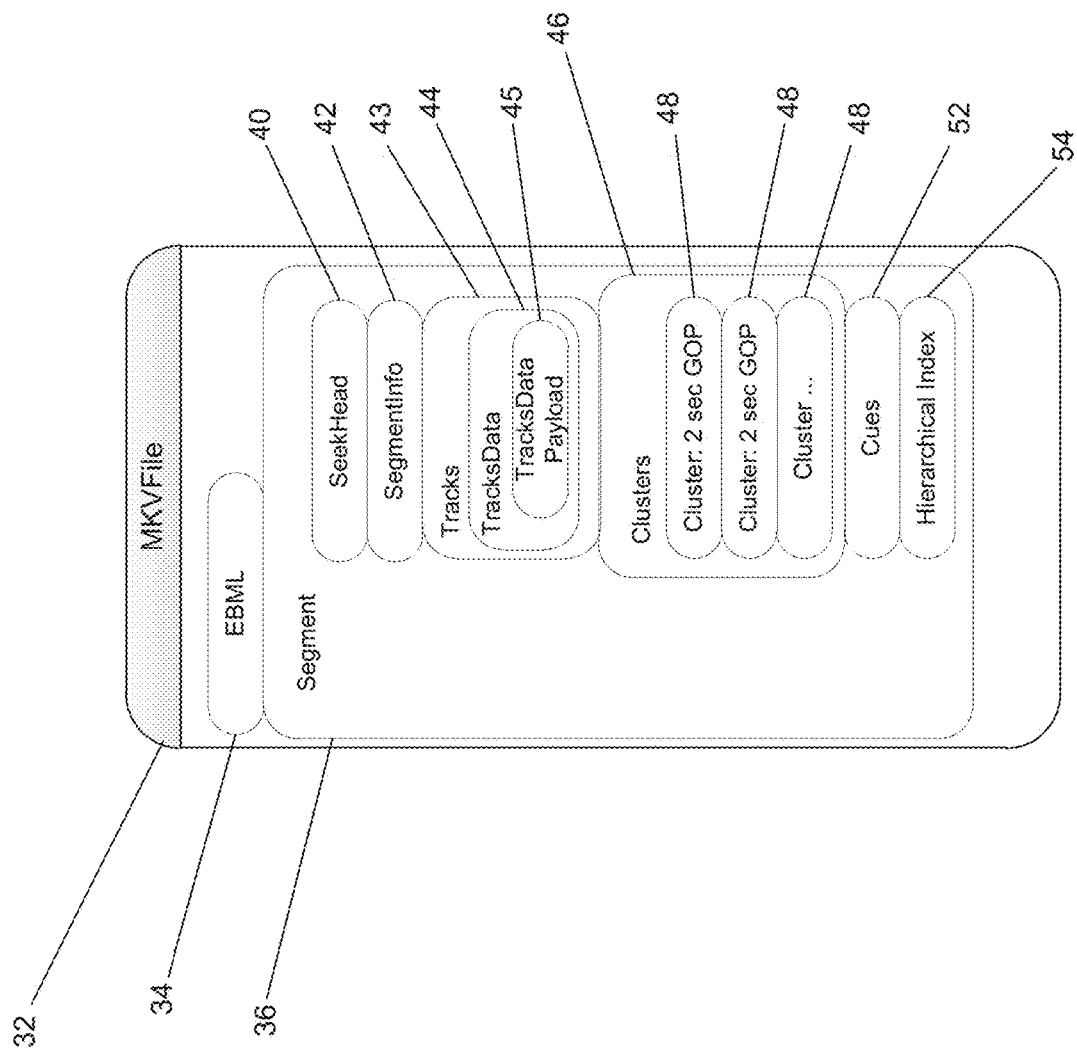
FIG. 3 conceptually illustrates a specialized Matroska container file incorporating a TracksData Payload containing cryptographic information in accordance with an embodiment of the invention.

A Matroska container file used to store encoded video in accordance with an embodiment of the invention is illustrated in FIG. 3. The container file 32 is an Extensible Binary Markup Language (EBML) file that is an extension of the Matroska container file format. The specialized Matroska container file 32 includes a standard EBML element 34, and a standard Segment element 36 that includes a standard Seek Head element 40, a standard Segment Information element 42, and a standard Tracks element 44 including a tracks data payload that is a non-standard EBML element containing cryptographic information utilized to access the protected stream(s) contained within the Matroska container file. In many embodiments, the cryptographic data takes the form of a DRMHeaders element (discussed below) that includes a set of keys utilized to access encrypted portions of the stream contained within the Matroska container file. In many embodiments, the set of keys is encrypted in such a way that a playback device can only access the set of keys in the clear using a specific piece or set of cryptographic information.

The Segment element 36 also includes a standard Clusters element 46. As is described below, the manner in which encoded media is inserted within individual Cluster elements 48 within the Clusters element 46 is constrained to improve the playback of the media in an adaptive streaming system. In many embodiments, the constraints imposed upon the encoded video are consistent with the specification of the Matroska container file format and involve encoding the video so that each cluster includes at least one closed GOP commencing with an IDR frame. In addition to the above elements, the Segment element 36 can optionally include a modified version of the standard Cues element. As is discussed further below, the Cues element includes specialized CuePoint elements (i.e. non-standard CuePoint elements) that facilitate the retrieval of the media contained within specific Cluster elements via HTTP. The Segment element 36 can optionally include a non-standard Hierarchical Index element 54. The Hierarchical Index element is an extension to the Matroska file format proposed by DivX, LLC of San Diego, California. The Hierarchical Index element is described in U.S. patent application Ser. No. 12/272,631, the disclosure of which is incorporated by reference above in its entirety.

The constraints imposed upon the encoding of media and the formatting of the encoded media within the Clusters element of a Matroska container file for adaptive bitrate streaming of protected streams and the additional DRM and index information inserted within the container file in accordance with embodiments of the invention are discussed further below.

Encoding Media for Insertion in Cluster Elements

An adaptive bitrate streaming system provides a playback device with the option of selecting between different protected streams of encoded media during playback according to the streaming conditions experienced by the playback device. In many embodiments, switching between protected streams is facilitated by separately pre-encoding discrete portions of the source media in accordance with the encoding parameters of each stream and then including each separately encoded portion in its own Cluster element within the stream's container file. Furthermore, the media contained within each Cluster is encoded so that the media is capable of playback without reference to media contained in any other Cluster within the stream. In this way, each stream includes a Cluster element corresponding to the same discrete portion of the source media and, at any time, the playback device can select the Cluster element from the stream that is most appropriate to the streaming conditions experienced by the playback device and can commence playback of the media contained within the Cluster element. Accordingly, the playback device can select clusters from different streams as the streaming conditions experienced by the playback device change over time. In several embodiments, the Cluster elements are further constrained so that each Cluster element contains a portion of encoded media from the source media having the same duration. In a number of embodiments, each Cluster element includes two seconds of encoded media. The specific constraints applied to the media encoded within each Cluster element depending upon the type of media (i.e. video, audio, or subtitles) are discussed below.

Figures 4A, 4B:
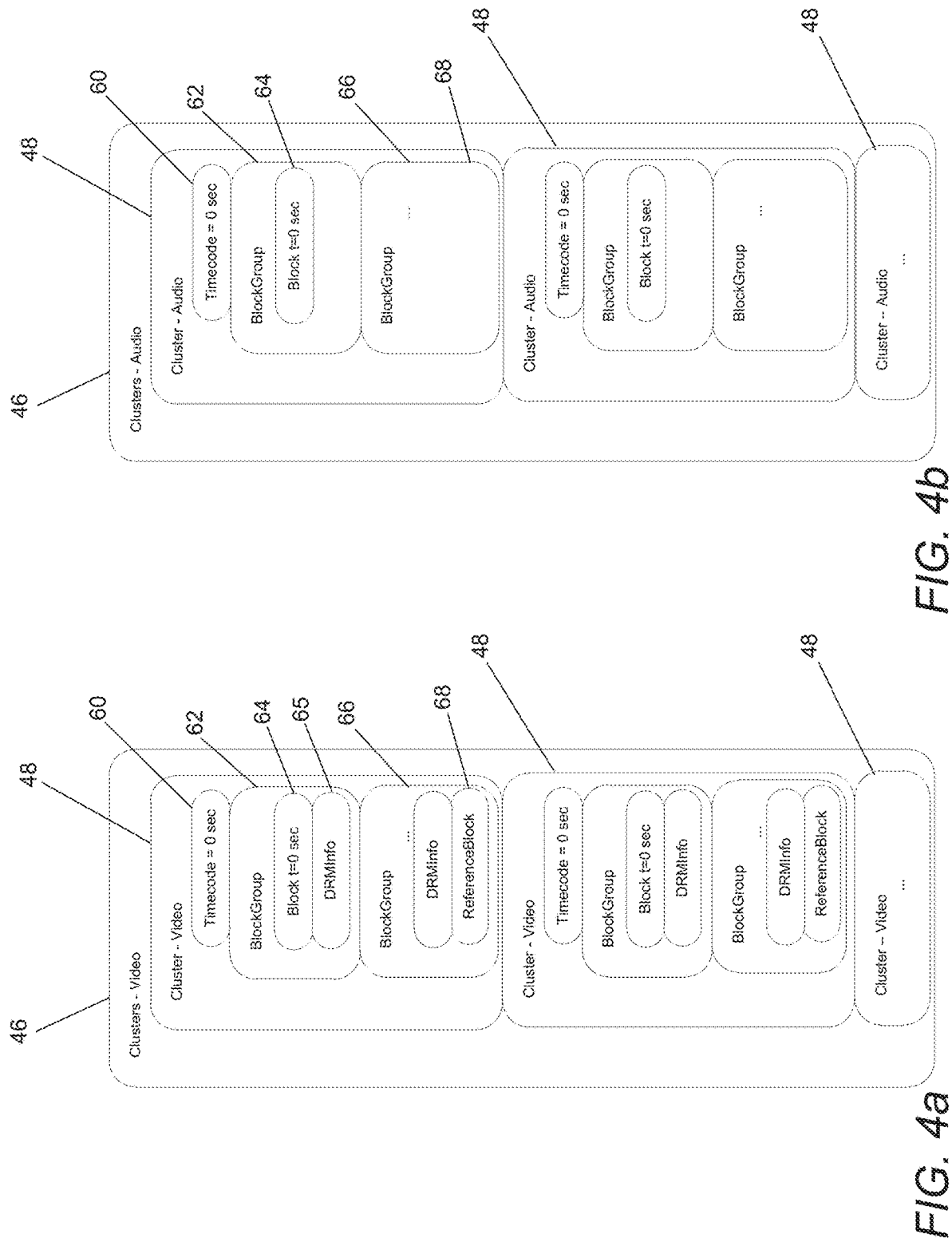
FIGS. 4a-4c conceptually illustrate the insertion of different types of protected media into the Clusters element of a Matroska container file subject to various constraints that facilitate adaptive bitrate streaming in accordance with embodiments of the invention.

A Clusters element of a Matroska container file containing a video stream in accordance with an embodiment of the invention is illustrated in FIG. 4a. The Clusters element 46 includes a plurality of Cluster elements 48 that each contains a discrete portion of encoded video. In the illustrated embodiment, each Cluster element 48 includes two seconds of encoded video. In other embodiments, the Cluster elements include encoded video having a greater or lesser duration than two seconds. In several embodiments, the encoded video sequences in the Cluster elements have different durations.

Each Cluster element 48 includes a Timecode element 60 indicating the start time of the encoded video within the Cluster element and a plurality of BlockGroup elements. As noted above, the encoded video stored within the Cluster is constrained so that the encoded video can be played back without reference to the encoded video contained within any of the other Cluster elements in the container file. In many embodiments, encoding the video contained within the Cluster element as a GOP in which the first frame is an IDR frame enforces the constraint. In the illustrated embodiment, the first BlockGroup element 62 contains an IDR frame. Therefore, the first BlockGroup element 62 does not include a ReferenceBlock element. The first BlockGroup element 62 includes a Block element 64, which specifies the Timecode attribute of the frame encoded within the Block element 64 relative to the Timecode of the Cluster element 48 and a DRMInfo element 65 that identifies a portion of the frame that is encrypted and the cryptographic information that can be utilized to access the encrypted portion of the frame. In a number of embodiments, only a small portion of the video frame is encrypted and the DRMInfo includes a reference to the start of an encrypted block of data and the size of the encrypted block of data. As is discussed further below, the common cryptographic information utilized to protect alternative streams of video content is a set of frame keys in many embodiments of the invention and the DRMInfo element can also include an index to a specific frame key in the set of frame keys that can be utilized to access the encrypted block of data in the clear. In other embodiments, any of a variety of information appropriate to identifying encrypted data within a video frame and decrypting the encrypted data can be stored within a DRMInfo element.

Subsequent BlockGroup elements 66 are not restricted in the types of frames that they can contain (other than that they cannot reference frames that are not contained within the Cluster element). Therefore, subsequent BlockGroup elements 66 can include ReferenceBlock elements 68 referencing other BlockGroup element(s) utilized in the decoding of the frame contained within the BlockGroup or can contain IDR frames and are similar to the first BlockGroup element 62. In addition, subsequent BlockGroup elements 66 can also include DRMInfo elements to describe the manner in which the frame of video contained within the BlockGroup element is protected. As noted above, the manner in which encoded video is inserted within the Cluster elements of the Matroska file conforms with the specification of the Matroska file format.

Figure 4D:
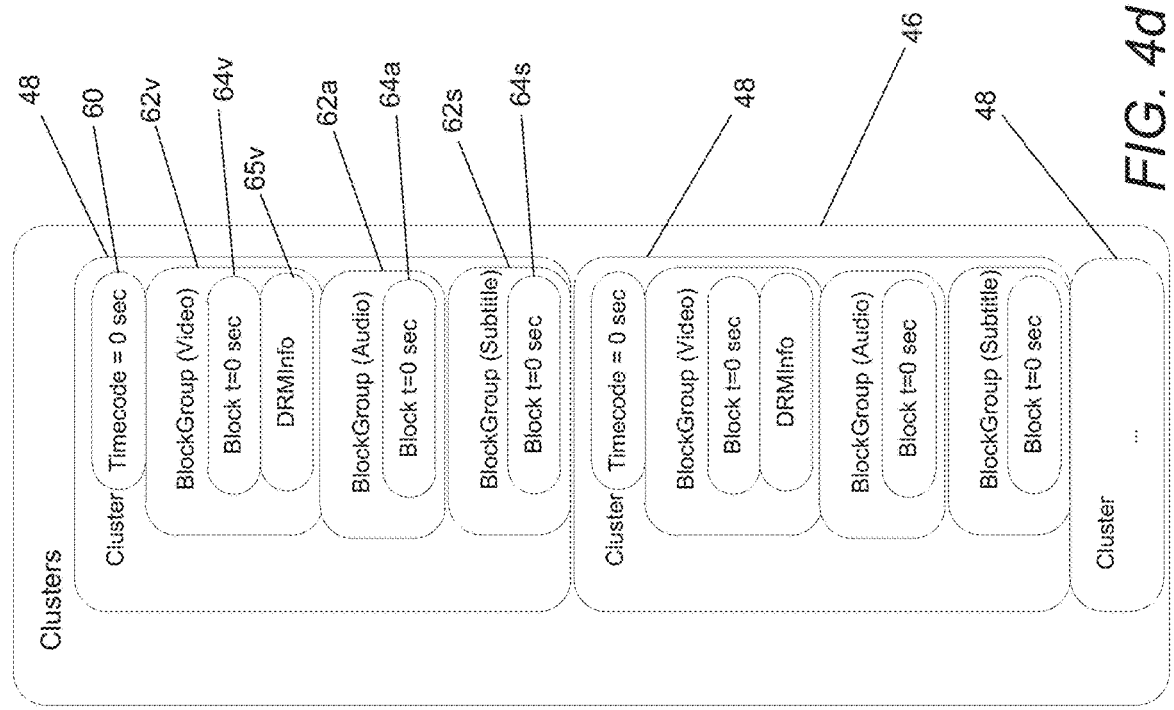
FIG. 4d conceptually illustrates the multiplexing of different types of protected media into the Clusters element of a Matroska container file subject to various constraints that facilitate adaptive bitrate streaming in accordance with an embodiment of the invention.
Figure 4C:
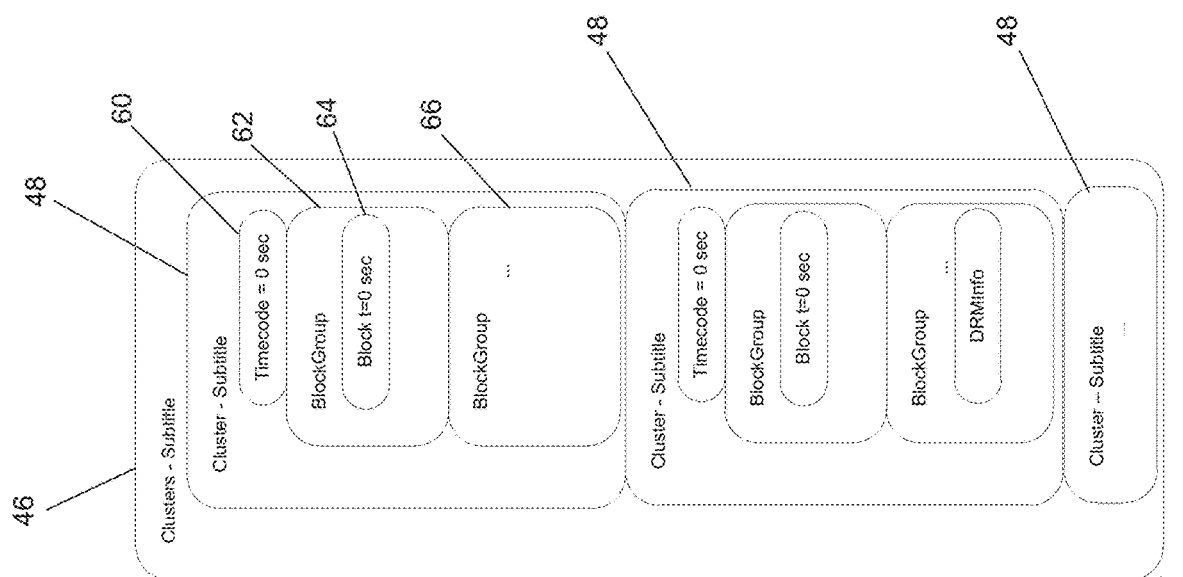

The insertion of encoded audio and subtitle information within a Clusters element 46 of a Matroska container file in accordance with embodiments of the invention is illustrated in FIGS. 4b and 4c. In the illustrated embodiments, the encoded media is inserted within the Cluster elements 48 subject to the same constraints applied to the encoded video discussed above with respect to FIG. 4a. In addition, the duration of the encoded audio and subtitle information within each Cluster element corresponds to the duration of the encoded video in the corresponding Cluster element of the Matroska container file containing the encoded video. In other embodiments, the Cluster elements within the container files containing the audio and/or subtitle streams need not correspond with the start time and duration of the Cluster elements in the container files containing the alternative video streams. In many embodiments, audio, and/or subtitle tracks are protected and information identifying the protected portions of the stream can be included in an element in a manner similar to that described above with respect to protected video streams.

Multiplexing Streams in a Single MKV Container File

The Clusters elements shown in FIGS. 4a-4c assume that a single stream is contained within each Matroska container file. In several embodiments, media from multiple streams is multiplexed within a single Matroska container file. In this way, a single container file can contain a video stream multiplexed with one or more corresponding audio streams, and/or one or more corresponding subtitle streams. Storing the streams in this way can result in duplication of the audio and subtitle streams across multiple alternative video streams. However, the seek time to retrieve encoded media from a video stream and an associated audio, and/or subtitle stream can be reduced due to the adjacent storage of the data on the server. The Clusters element 46 of a Matroska container file containing multiplexed video, audio and subtitle data in accordance with an embodiment of the invention is illustrated in FIG. 4d. In the illustrated embodiment, each Cluster element 48 includes additional BlockGroup elements for each of the multiplexed streams. The first Cluster element includes a first BlockGroup element 62v for encoded video that includes a Block element 64v containing an encoded video frame and indicating the Timecode attribute of the frame relative to the start time of the Cluster element (i.e. the Timecode attribute 60). A second BlockGroup element 62a includes a Block element 64a including an encoded audio sequence and indicating the timecode of the encoded audio relative to the start time of the Cluster element, and a third BlockGroup element 62s including a Block element 64s containing an encoded subtitle and indicating the timecode of the encoded subtitle relative to the start time of the Cluster element. In the illustrated embodiment, only the video stream is protected. Therefore, the BlockGroup elements 62v containing the video stream include DRMInfo elements 65v to identify the portions of the frames within the video stream that are encrypted. In other embodiments, the audio, and/or subtitle streams can also be protected. Although not shown in the illustrated embodiment, each Cluster element 48 likely would include additional BlockGroup elements containing additional encoded video, audio or subtitles. Despite the multiplexing of the encoded video, audio, and/or subtitle streams, the same constraints concerning the encoded media apply.

Incorporating Trick Play Streams in MKV Container Files for use in Adaptive Bitrate Streaming Systems The incorporation of trick play tracks within Matroska container files is proposed by DivX, LLC in U.S. patent application Ser. No. 12/260,404 entitled "Application Enhancement Tracks", filed Oct. 29, 2008, the disclosure of which is hereby incorporated by reference in its entirety. Trick play tracks similar to the trick play tracks described in U.S. patent application Ser. No. 12/260,404 can be used to provide a trick play stream in an adaptive bitrate streaming system in accordance with an embodiment of the invention to provide smooth visual search through source content encoded for adaptive bitrate streaming. A separate trick play stream can be encoded that appears to be an accelerated visual search through the source media when played back, when in reality the trick play stream is simply a separate stream encoding the source media at a lower frame rate. In several embodiments, a trick play stream is generated in the manner outlined in U.S. patent application Ser. No. 12/260,404 and inserting the trick play stream into a Matroska container file subject to the constraints mentioned above with respect to insertion of a video stream into a Matroksa container file. In many embodiments, the trick play stream is also subject to the further constraint that every frame in the GOP of each Cluster element in the trick play stream is encoded as an IDR frame. As with the other video streams, each Cluster element contains a GOP corresponding to the same two seconds of source media as the corresponding Cluster elements in the other streams. There are simply fewer frames in the GOPs of the trick play stream and each frame has a longer duration. In this way, transitions to and from a trick play stream can be treated in the same way as transitions between any of the other encoded streams are treated within an adaptive bitrate streaming system in accordance with embodiments of the invention. In embodiments where the trick play stream(s) are protected, the same common cryptographic information utilized to encrypt the primary video stream(s) is utilized to protect the trick play stream(s). Playback of the frames contained within the trick play stream to achieve accelerated visual search typically involves the playback device manipulating the timecodes assigned to the frames of encoded video prior to providing the frames to the playback device's decoder to achieve a desired increase in rate of accelerated search (e.g. ×2, ×4, ×6, etc.).

Figure 4E:
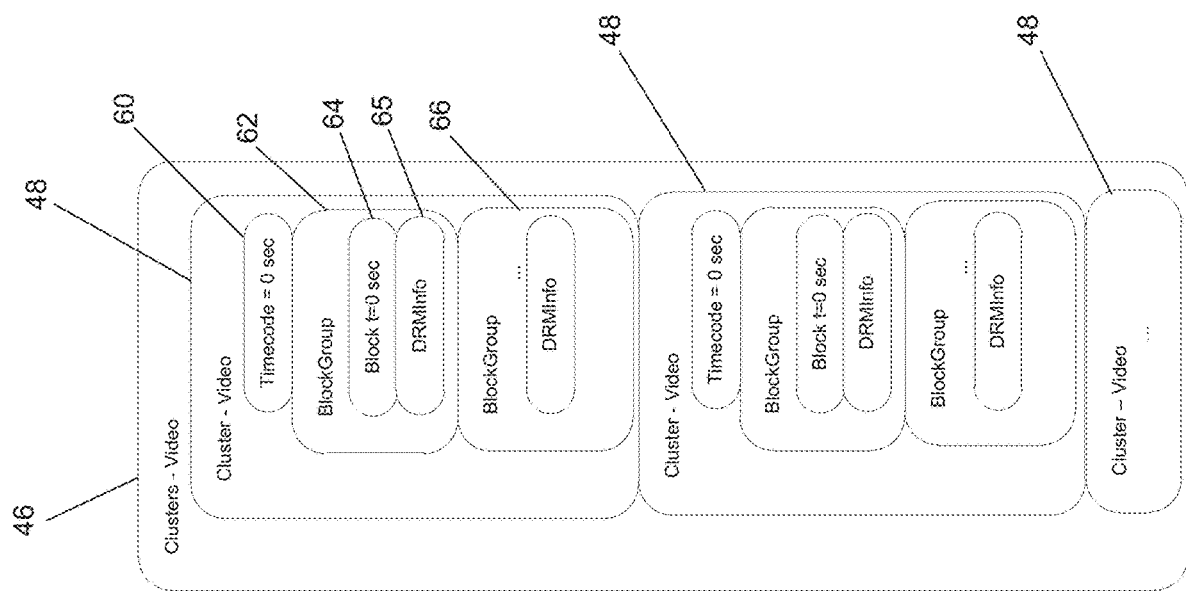
FIG. 4e conceptually illustrates the inclusion of a protected trick play track into the Clusters element of a Matroska container file subject to various constraints that facilitate adaptive bitrate streaming in accordance with an embodiment of the invention.

A Clusters element containing encoded media from a trick play stream is shown in FIG. 4e. In the illustrated embodiment, the encoded trick play stream is inserted within the Cluster elements 48 subject to the same constraints applied to the encoded video discussed above with respect to FIG. 4a including the constraint that frames are protected using the common cryptographic information. However, each BlockGroup element contains an IDR. In other embodiments, the Cluster elements within the container files containing the trick play streams need not correspond with the start time and duration of the Cluster elements in the container files containing the alternative video streams.

In many embodiments, source content can be encoded to provide a single trick play stream or multiple trick play streams for use by the adaptive bit rate streaming system. When a single trick play stream is provided, the trick play stream is typically encoded at a low bitrate. When multiple alternative trick play streams are provided, adaptive streaming can also be performed with respect to the trick play streams. In several embodiments, multiple trick play streams are provided to support different rates of accelerated visual search through the encoded media.

Incorporating Indexing Information Within MKV Container Files

Figure 5:
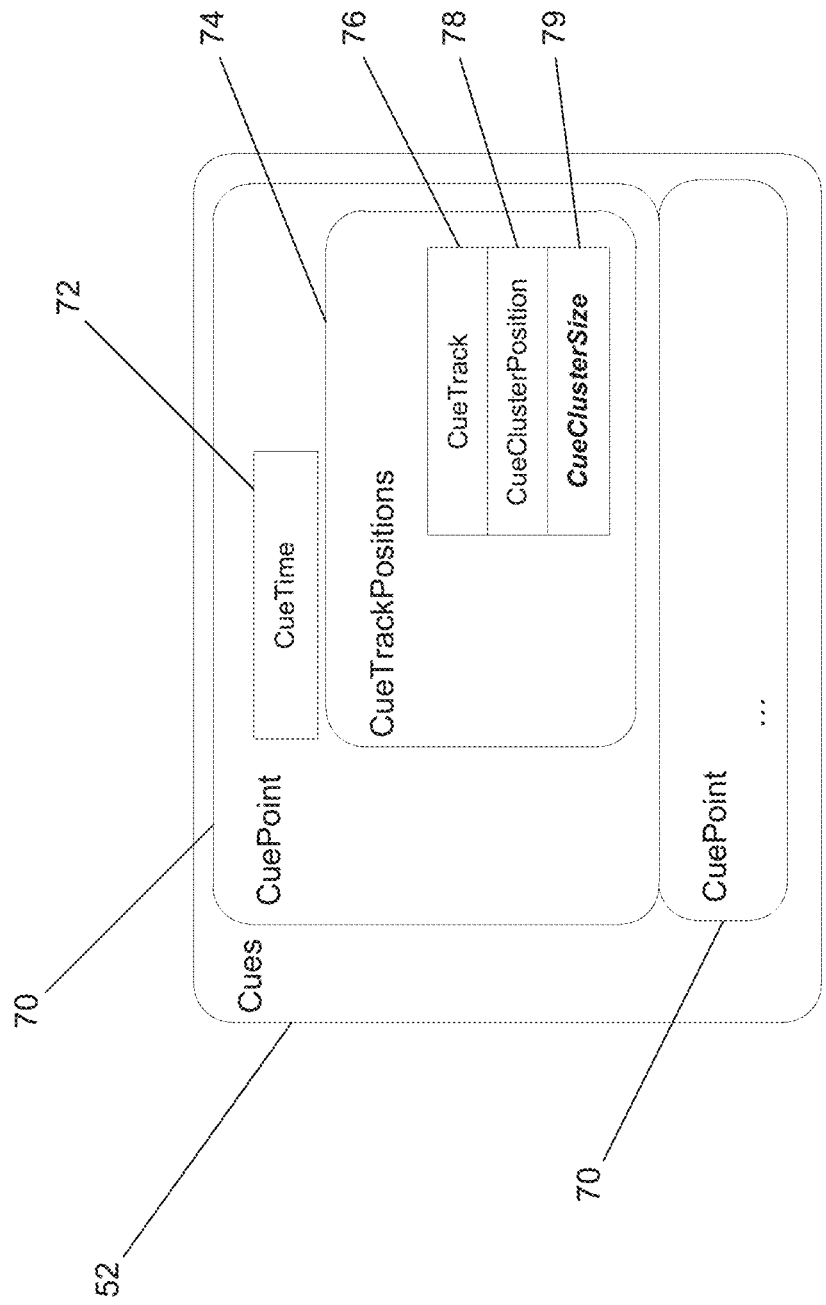
FIG. 5 conceptually illustrates a modified Cues element of a specialized Matroska container file, where the Cues element includes information enabling the retrieval of Cluster elements using HTTP byte range requests in accordance with an embodiment of the invention.

The specification for the Matroska container file format provides for an optional Cues element that is used to index Block elements within the container file. A modified Cues element that can be incorporated into a Matroska container file in accordance with an embodiment of the invention to facilitate the requesting of clusters by a playback device using HTTP is illustrated in FIG. 5. The Cues element 52 is similar to a standard Cues element 52 in that it includes a plurality of standard CuePoint elements 70 that each include a standard CueTime attribute 72. Each CuePoint element includes a CueTrackPositions element 74 containing the standard CueTrack 76 and CueClusterPosition 78 attributes. In many embodiments, the CuePoint element is mainly configured to identify a specific Cluster element as opposed to a specific Block element within a Cluster element. Although, in several applications the ability to seek to specific Block elements within a Cluster element is required and additional index information is included in the Cues element.

Figure 6:
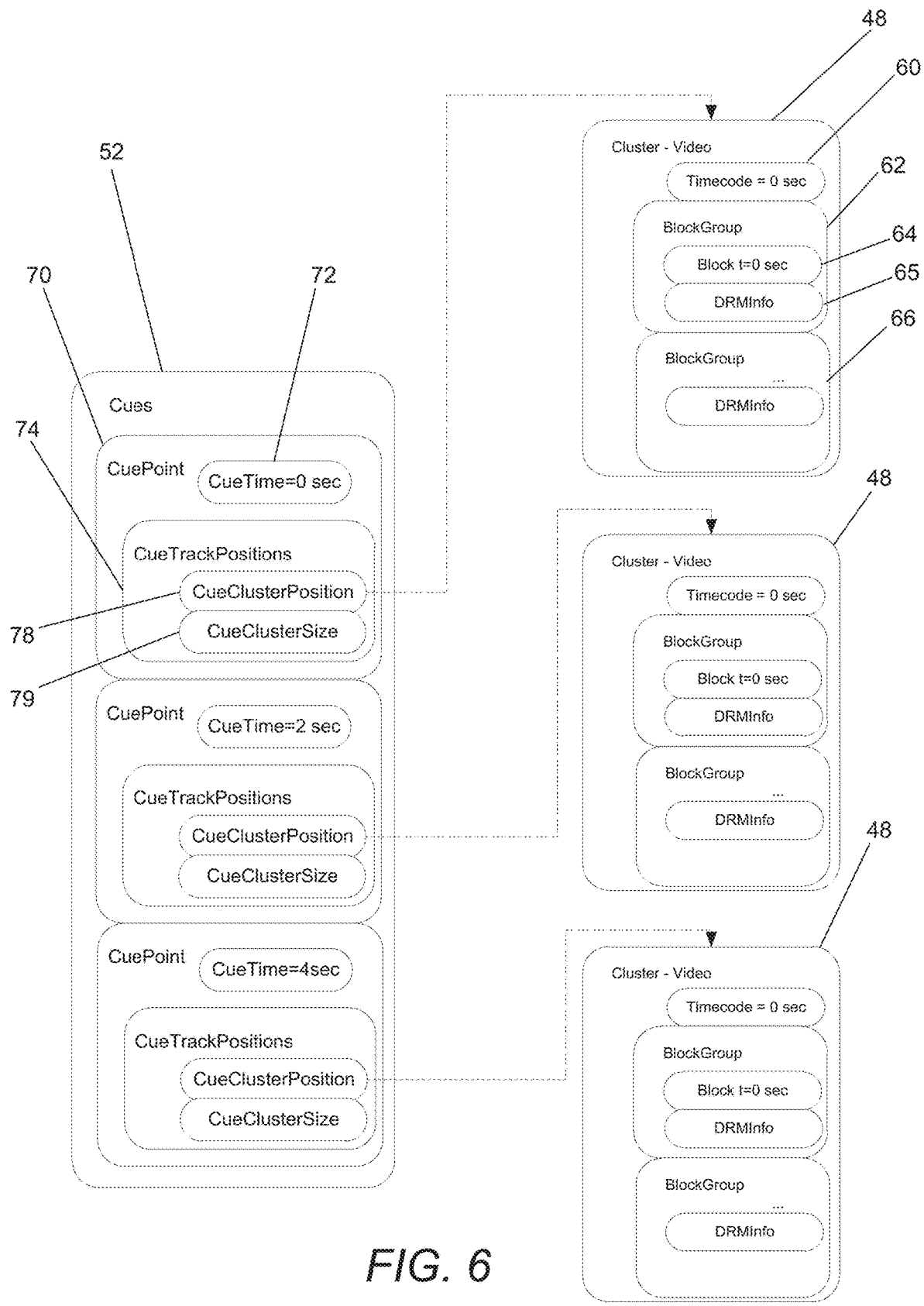
FIG. 6 conceptually illustrates the indexing of Cluster elements within a specialized Matroska container file utilizing modified CuePoint elements within the container file in accordance with embodiments of the invention.

The use of a modified Cues element to index encoded media within a Clusters element of a Matroska file in accordance with an embodiment of the invention is illustrated in FIG. 6. A CuePoint element is generated to correspond to each Cluster element within the Matroska container file. The CueTime attribute 72 of the CuePoint element 70 corresponds to the Timecode attribute 60 of the corresponding Cluster element 48. In addition, the CuePoint element contains a CueTrackPositions element 74 having a CueClusterPosition attribute 78 that points to the start of the corresponding Cluster element 48. The CueTrackPositions element 74 can also include a CueBlockNumber attribute, which is typically used to indicate the Block element containing the first IDR frame within the Cluster element 48.

As can readily be appreciated the Cues element 52 forms an index to each of the Cluster elements 48 within the Matroska container file. Furthermore, the CueTrackPosition elements provide information that can be used by a playback device to request the byte range of a specific Cluster element 48 via HTTP or another suitable protocol from a remote server. The Cues element of a conventional Matroska file does not directly provide a playback device with information concerning the number of bytes to request from the start of the Cluster element in order to obtain all of the encoded video contained within the Cluster element. The size of a Cluster element is, therefore, inferred by using the CueClusterPosition attribute of the CueTrackPositions element that indexes the first byte of the next Cluster element. Alternatively, additional CueTrackPosition elements could be added that index the last byte of the Cluster element (in addition to the CueTrackPositions elements that index the first byte of the Cluster element), and/or a non-standard CueClusterSize attribute that specifies the size of the Cluster element pointed to by the CueClusterPosition attribute is included in each CueTrackPosition element to assist with the retrieval of specific Cluster elements within a Matroska container file via HTTP byte range requests or a similar protocol.

The modification of the Cues element in the manner outlined above significantly simplifies the retrieval of Cluster elements from a Matroska container file via HTTP or a similar protocol during adaptive bitrate streaming. In addition, by only indexing the first frame in each Cluster the size of the index is significantly reduced. Given that the index is typically downloaded prior to playback, the reduced size of the Cues element (i.e. index) means that playback can commence more rapidly. Using the CueClusterPosition elements, a playback device can request a specific Cluster element from the stream most suited to the streaming conditions experienced by the playback device by simply referencing the index of the relevant Matroska container file using the Timecode attribute for the desired Cluster element.

Figure 5A:
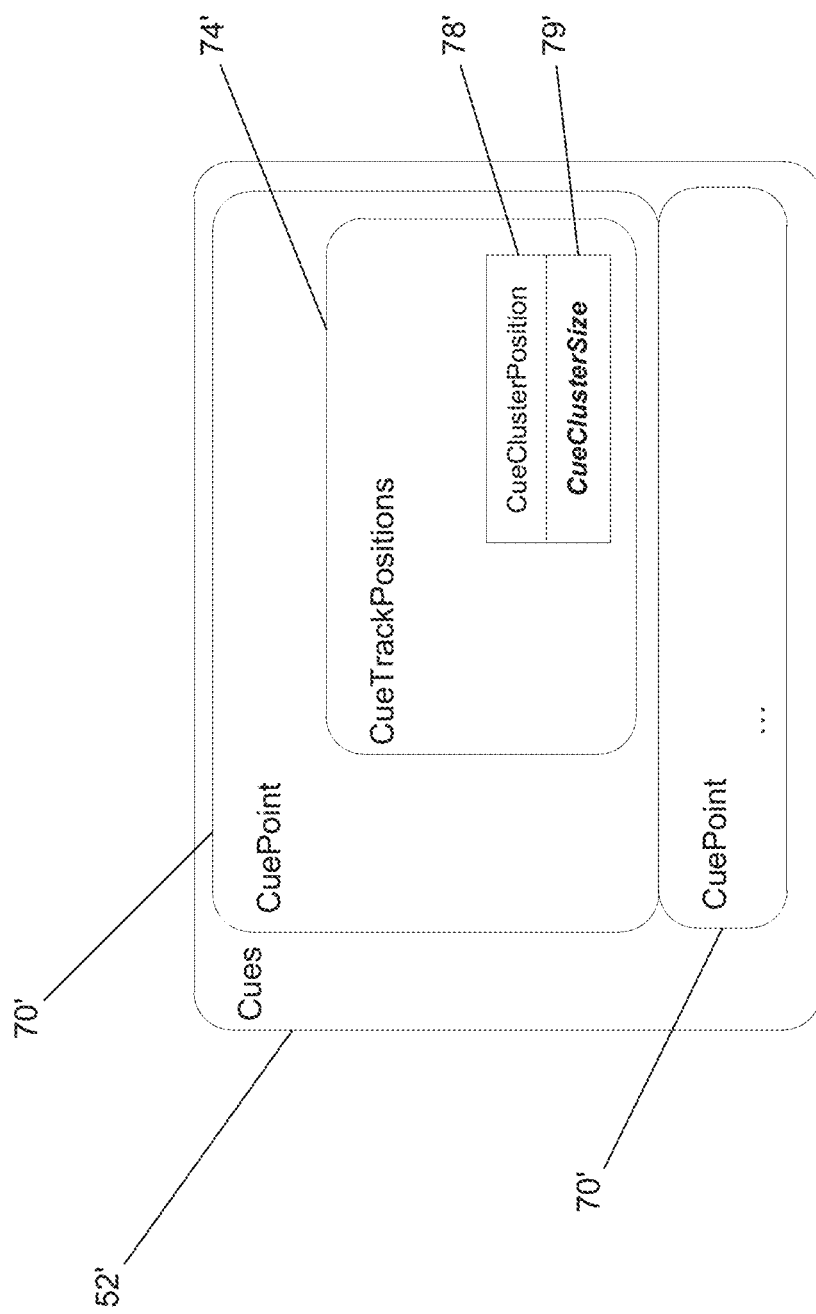
FIG. 5a conceptually illustrates a modified Cues element of a specialized Matroska container file in accordance with an embodiment of the invention, where the Cues element is similar to the Cues element shown in FIG. 5 with the exception that attributes that are not utilized during adaptive bitrate streaming are removed.

A number of the attributes within the Cues element are not utilized during adaptive bitrate streaming. Therefore, the Cues element can be further modified by removing the unutilized attributes to reduce the overall size of the index for each Matroska container file. A modified Cues element that can be utilized in a Matroska container file that includes a single encoded stream, where portions of the encoded stream having the same duration are contained in each Cluster element within the Matroska file in accordance with an embodiment of the invention is illustrated in FIG. 5a. The Cues element 52' shown in FIG. 5a is similar to the Cues element 52 shown in FIG. 5 with the exception that the CuePoint elements 70' do not include a CueTime attribute (see 72 in FIG. 5) and/or the CueTrackPositions elements 74' do not include a CueTrack attribute (76 in FIG. 5). When the portions of encoded media in each Cluster element in the Matroska container file have the same duration, the CueTime attribute is not necessary. When the Matroska contain file includes a single encoded stream, the CueTrack attribute is not necessary. In other embodiments, the Cues element and/or other elements of the Matroska container file can be modified to remove elements and/or attributes that are not necessary for the adaptive bitrate streaming of the encoded stream contained within the Matroska container file, given the manner in which the stream is encoded and inserted in the Matroska container file.

Although various modifications to the Cues element to include information concerning the size of each of the Cluster elements within a Matroska container file and to eliminate unnecessary attributes are described above, many embodiments of the invention utilize a conventional Matroska container. In several embodiments, the playback device simply determines the size of Cluster elements on the fly using information obtained from a conventional Cues element, and/or relies upon a separate index file containing information concerning the size and/or location of the Cluster elements within the MKV container file. In several embodiments, the additional index information is stored in the top level index file. In a number of embodiments, the additional index information is stored in separate files that are identified in the top level index file. When index information utilized to retrieve Cluster elements from a Matroska container file is stored separately from the container file, the Matroska container file is still typically constrained to encode media for inclusion in the Cluster elements in the manner outlined above. In addition, wherever the index information is located, the index information will typically index each Cluster element and include (but not be limited to) information concerning at least the starting location and, in many instances, the size of each Cluster element.

Incorporating Hierarchical Indexes Into MKV Containers

Retrieval of media using HTTP during adaptive streaming can be improved by adding additional index information to the Matroska container files used to contain each of the encoded streams. In a number of embodiments, the index is a reduced index in that the index only points to the IDRs at the start of each cluster. In many embodiments, the index of the Matroska container file includes additional non-standard attributes (i.e. attributes that do not form part of the Matroska container file format specification) that specify the size of each of the clusters so that a playback device can retrieve a Cluster element from the Matroska container file via HTTP using a byte range request. In several embodiments, the Matroska container file includes a hierarchical index using a HierarchicalIndex element similar to the hierarchical indexes disclosed in U.S. patent application Ser. No. 12/272,631 entitled "Hierarchical and Reduced Index Structures for Multimedia Files" to Soroushian et al. filed Nov. 17, 2008 to increase the speed with which a playback device can seek to a specific Cluster element containing encoded media within the container file. The disclosure of U.S. patent application Ser. No. 12/272,631 is hereby incorporated by reference in its entirety.

Figure 7:
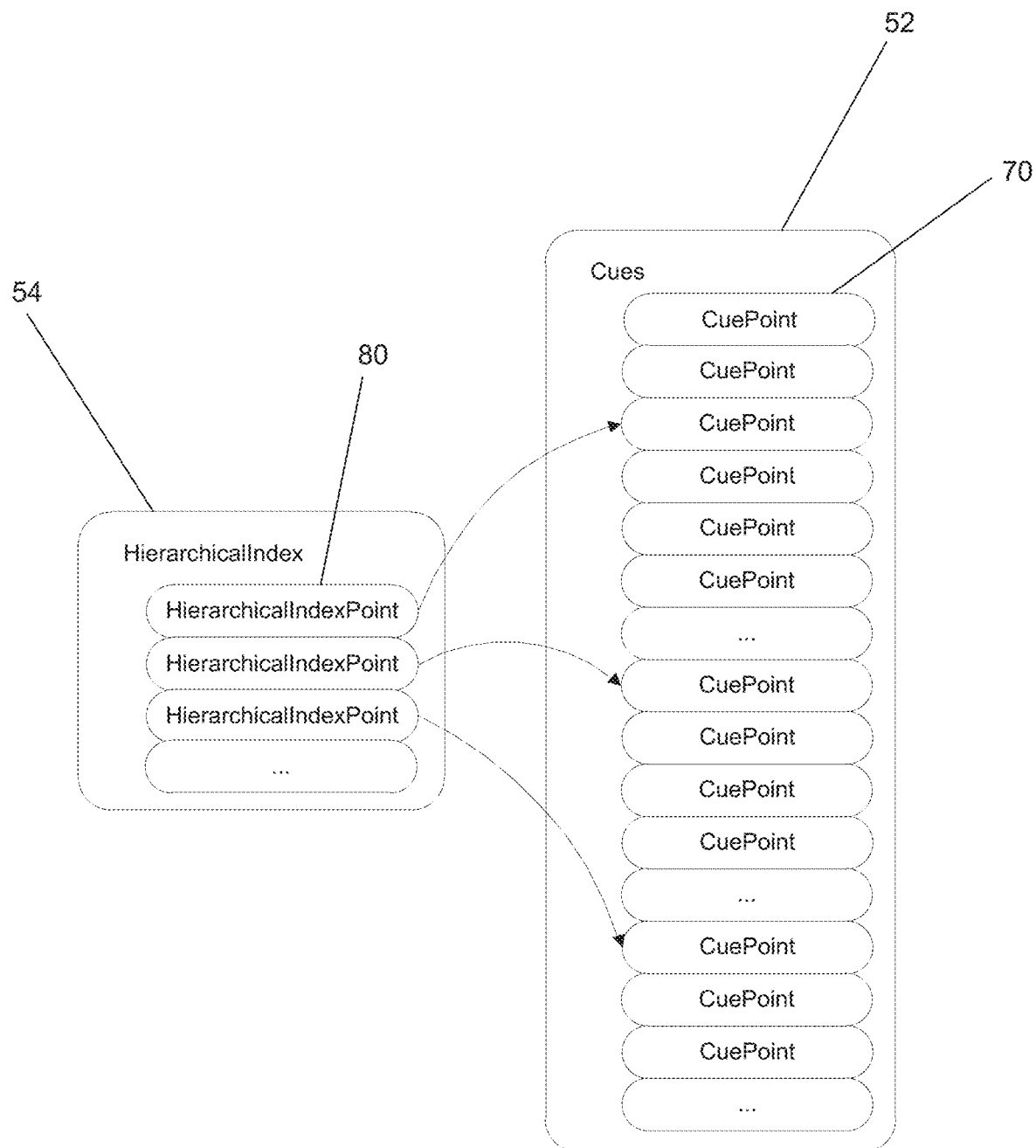
FIG. 7 conceptually illustrates the use of a hierarchical index to index CuePoint elements within a Matroska container file in accordance with embodiments of the invention.

A hierarchical index included in a Matroska container file using a HierarchicalIndex element in accordance with an embodiment of the invention is illustrated in FIG. 7. The HierarchicalIndex element 54 includes a plurality of HierarchicalIndexPointer elements 80 that each point to a CuePoint element 70 within the Cues element 52. In this way, the hierarchical index can be utilized to rapidly locate specific Cluster elements within a Matroska file using the Timecode attribute of the Cluster element. Furthermore, the entire index (i.e. the entire Cues element) need not be downloaded in order to locate a specific Cluster element. The playback device can simply download the hierarchical index and download the specific CuePoint elements that enable the location of a desired Cluster element within the Matroska container file.

In several embodiments, the HierarchicalIndex element is generated so that the HierarchicalIndexPointer elements point to CuePoint elements indexing Cluster elements that are a predetermined time period apart. For example, the HierarchicalIndexPointer elements can point to CuePoint elements indexing Cluster elements that are spaced 30 seconds apart. In other implementations, any of a variety of implementations can be utilized to determine the interval between the CuePoint elements referenced by the higher layers of the hierarchical index. In addition, although a two layer hierarchical index is illustrated in FIG. 7, hierarchical indexes including three or more layers can also be incorporated within Matroska container files generated for use in adaptive bitrate streaming systems in accordance with embodiments of the invention.

As noted above, index information can be stored in a separate file to the Matroska container file in accordance with embodiments of the invention. In embodiments where the index information is stored separately, the index can be hierarchical to prevent the need to download the entire index for a container file prior to playback and to facilitate seeking within the index.

Encoding and Protecting Source Media for Adaptive Bitrate Streaming

Figure 8:
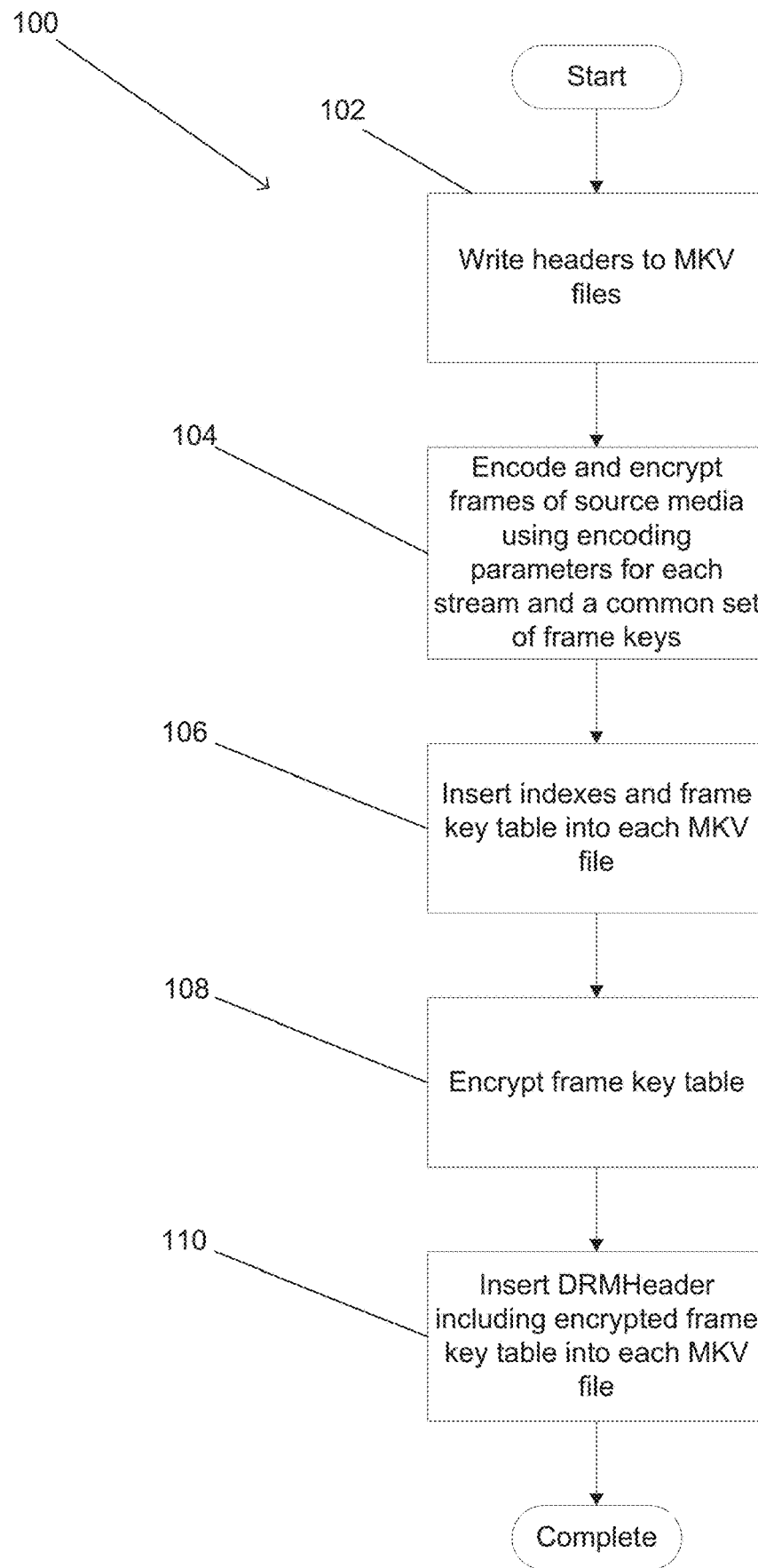
FIG. 8 is a flow chart illustrating a process for encoding and protecting source media for adaptive bitrate streaming in accordance with an embodiment of the invention.

A process for encoding source media as a top level index file and a plurality of Matroska container files for use in an adaptive bitrate streaming system in accordance with an embodiment of the invention is illustrated in FIG. 8. The encoding process 100 commences by writing headers for each of the MKV files that will contain the streams of content generated using the source content. In the illustrated embodiment, the source content includes a stream of video that is encoded as a plurality of protected streams. The frames of the source video are encoded (104) using the encoding parameters associated with each of the alternative streams and portions of the encoded frames can be encrypted using a frame key selected from a set of frame keys. When the encoding and encryption of the streams is complete, an index is inserted (106) into each Matroska container file containing an alternative stream of protected video. The common set of frame keys is also encrypted (108) and the process writes (110) a DRM header including the encrypted set of frame keys to each container file. DRM headers and processes for restricting access to cryptographic information stored within the DRM header of a Matroska container file in accordance with embodiments of the invention are discussed further below.

Figure 9:
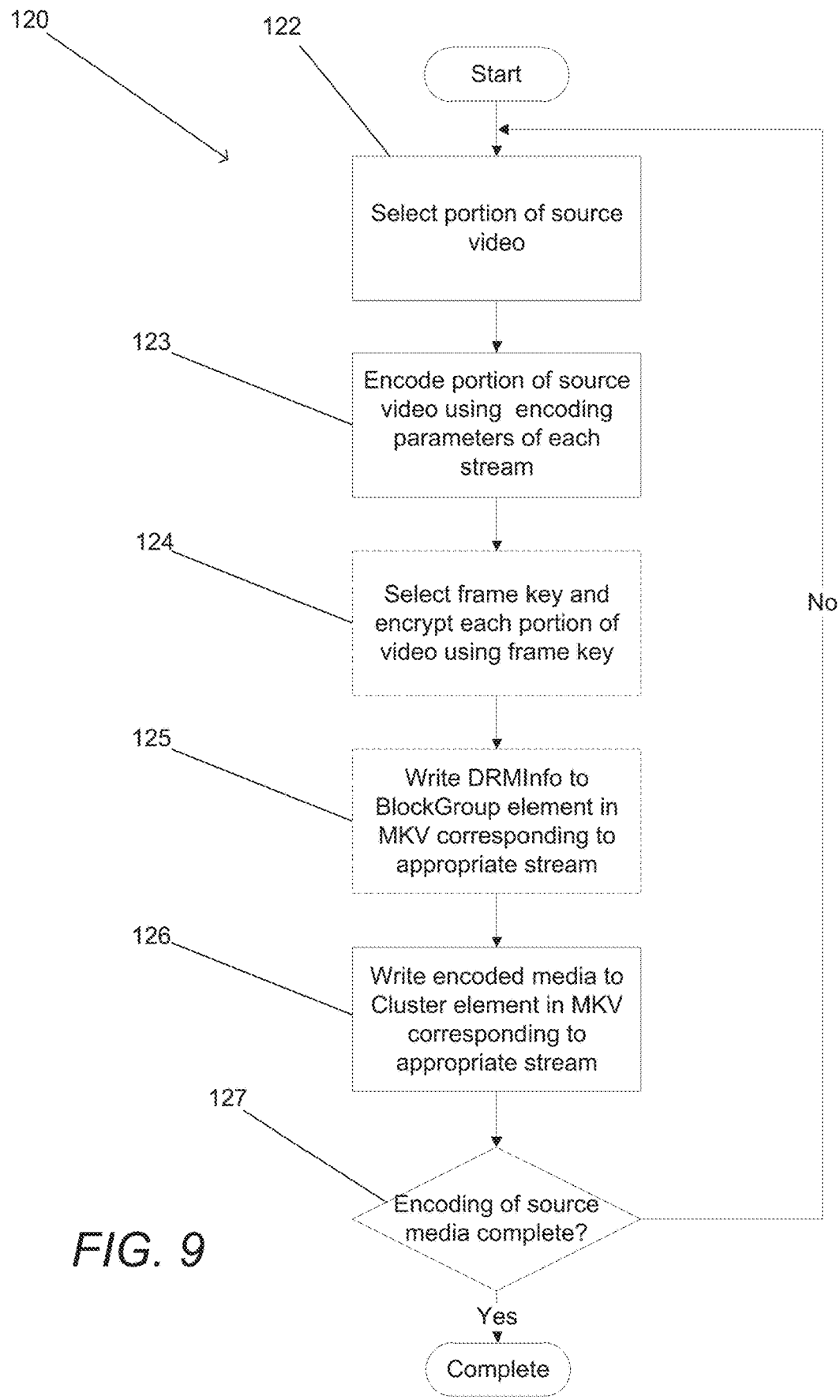
FIG. 9 is a flow chart illustrating a process for encoding and encrypting frames of source video in accordance with an embodiment of the invention.

A process for encoding and protecting frames of video to create a plurality of alternative streams of protected video in accordance with embodiments of the invention is illustrated in FIG. 9. The process 120 includes selecting (122) a first portion of the source media and encoding (123) the source media using the encoding parameters for each alternative stream. Assuming that the resulting frame is to be encrypted, a frame key can be selected (124) from a common set of frame keys and utilized to encrypt at least a portion of the frame of video. A DRMInfo element can then be written (125) to a BlockGroup element. The DRMInfo element identifies the portion of the frame that is encrypted and the frame key that can be utilized by a playback device to access the encrypted portion of the frame. The encoded and/or encrypted frame can then be written (126) to the BlockGroup element. When the entire source video stream is determined (127) as being encoded and protected, then the process is complete.

Each portion of source video that is encoded (123) can be encoded as a single GOP commencing with an IDR frame. In many embodiments, encoding parameters used to create the alternative GOPs vary based upon bitrate, frame rate, encoding parameters and resolution. In this way, the portion of media is encoded as a set of interchangeable alternatives and a playback device can select the alternative most appropriate to the streaming conditions experienced by the playback device. When different resolutions are supported, the encoding of the streams is constrained so that each stream has the same display aspect ratio. A constant display aspect ratio can be achieved across different resolution streams by varying the sample aspect ratio with the resolution of the stream. In many instances, reducing resolution can result in higher quality video compared with higher resolution video encoded at the same bit rate.

Although specific processes involving the encoding and protection of a source video stream as a set of alternative streams are illustrated in FIGS. 8 and 9, any of a variety of processes can be utilized to protect audio, video, and/or subtitle streams using common cryptographic information in accordance with embodiments of the invention. Following the encoding of the source media to create Matroska container files containing each of the protected streams, which can include trick play streams, the Matroska container files can be uploaded to a content distribution server for adaptive bitrate streaming to playback devices. The adaptive bitrate streaming of protected media encoded in accordance with embodiments of the invention using HTTP requests is discussed further below.

DRM Headers

Figure 10:
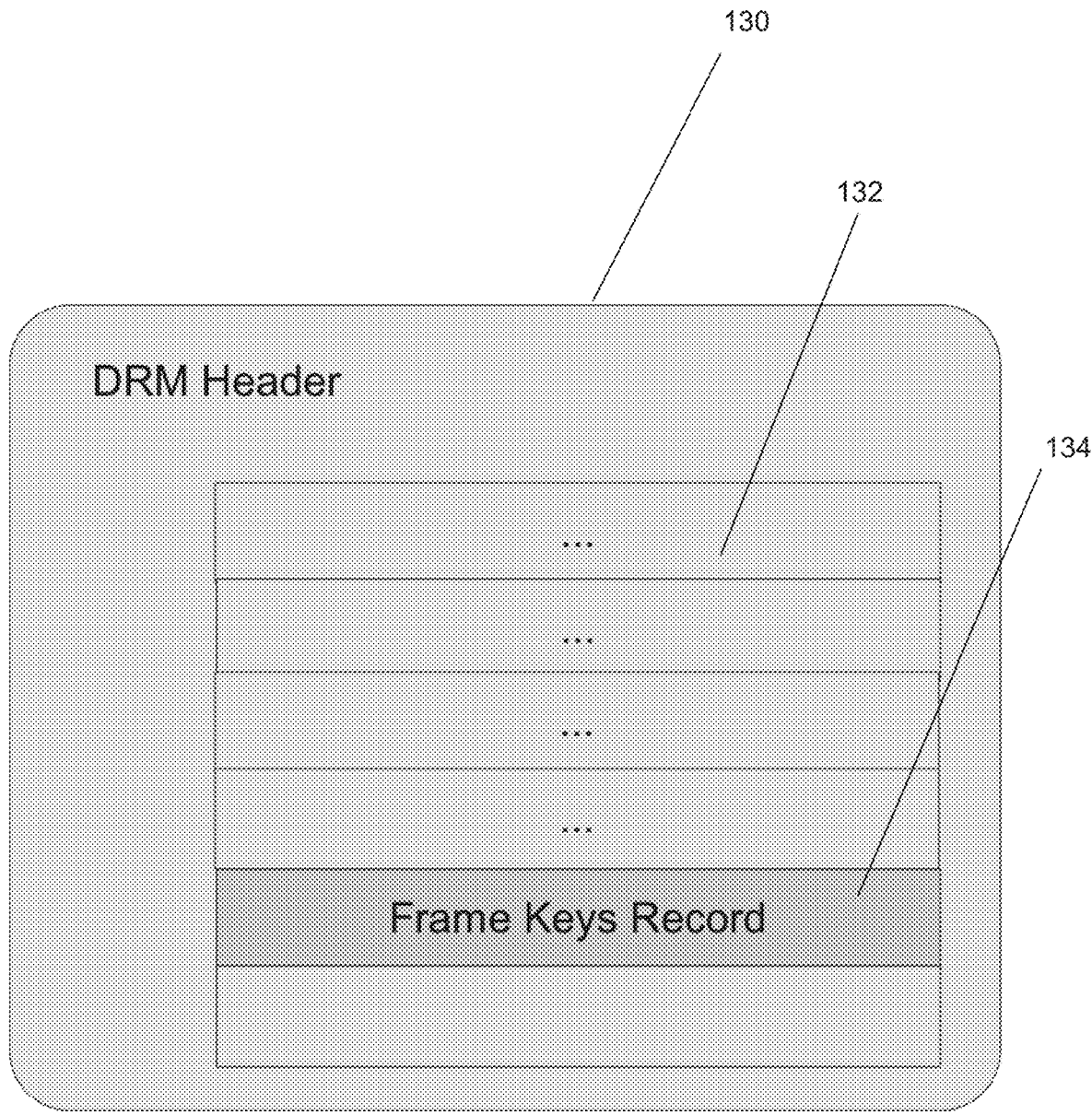
FIG. 10 conceptually illustrates a DRM header element that can be included in a Matroska container file in accordance with an embodiment of the invention.

Common cryptographic information utilized in protecting alternative streams can be inserted into container files containing each of the alternative streams. When the container files are Matroska container files, the common cryptographic information can be inserted into the container file as a DRMHeader element. A DRMHeader element configured to contain a set of keys in accordance with an embodiment of the invention is illustrated in FIG. 10. The DRM Header element 130 includes a plurality of pieces of information 132 including a frame keys record 134 that can be utilized to contain a set of frame keys or frame key table common to each of a plurality of alternative streams.

If the frame key record 134 is communicated in the clear, then any playback device can access the protected streams. Therefore, the frame keys record 134 is typically encrypted using one or more encryption keys. The encryption key(s) used to encrypt the frame key record 134 can be securely provided to an individual playback device using any of a variety of techniques appropriate to a specific application. In the context of streaming systems that also support the downloading of content.

Although a specific format for storing common cryptographic information in a Matroska container file is illustrated in FIG. 10, any format can be utilized to store common cryptographic information in a Matroska container file and/ or any other container file appropriate to a specific application in accordance with an embodiment of the invention. Adaptive bitrate streaming of protected content in accordance with embodiments of the invention is discussed further below.

Adaptive Bitrate Streaming from MKV Container Files Using HTTP

When source media is encoded so that there are alternative streams of protected media contained in separate Matroska container files for at least one of video, audio, and subtitle content, adaptive streaming of the media contained within the Matroska container files can be achieved using HTTP requests or a similar stateless data transfer protocol. In many embodiments, a playback device requests a top level index file from a content distribution server and uses the index information to identify the streams that are available to the playback device and the cryptographic information required to access any protected streams. The playback device can then retrieve the indexes for one or more of the Matroska files and can use the indexes to request media from one or more of the protected streams contained within the Matroska container files using HTTP requests or using a similar stateless protocol. As noted above, many embodiment of the invention implement the indexes for each of the Matroska container files using a modified Cues element. In several embodiments, the index is a hierarchical index and is also includes a HierarchicalIndex element contained within the Matroska container file. In a number of embodiments, however, the encoded media for each stream is contained within a standard Matroska container file and separate index file(s) can also be provided for each of the container files.

Based upon the streaming conditions experienced by the playback device, the playback device can select media from alternative protected streams encoded at different bitrates. When the media from each of the streams is protected using common cryptographic information and inserted into the Matroska container files in the manner outlined above, transitions between streams can occur upon the completion of playback of media within a Cluster element without the need to retrieve additional cryptographic information. As noted above, the size of the Cluster elements (i.e the duration of the encoded media within the Cluster elements) is typically chosen so that the playback device is able to respond quickly enough to changing streaming conditions and to instructions from the user that involve utilization of a trick play track. The smaller the Cluster elements (i.e. the smaller the duration of the encoded media within each Cluster element) the higher the overhead associated with requesting each Cluster element. Therefore, a tradeoff exists between the responsiveness of the playback device to changes in streaming conditions and the effective data rate of the adaptive streaming system for a given set of streaming conditions (i.e. the portion of the available bandwidth actually utilized to transmit encoded media). In many embodiments, the size of the Cluster elements is chosen so that each Cluster element contains two seconds of encoded media. In other embodiments, the duration of the encoded media can be greater or less than two seconds and/or the duration of the encoded media can vary from Cluster element to Cluster element.

Figure 11:
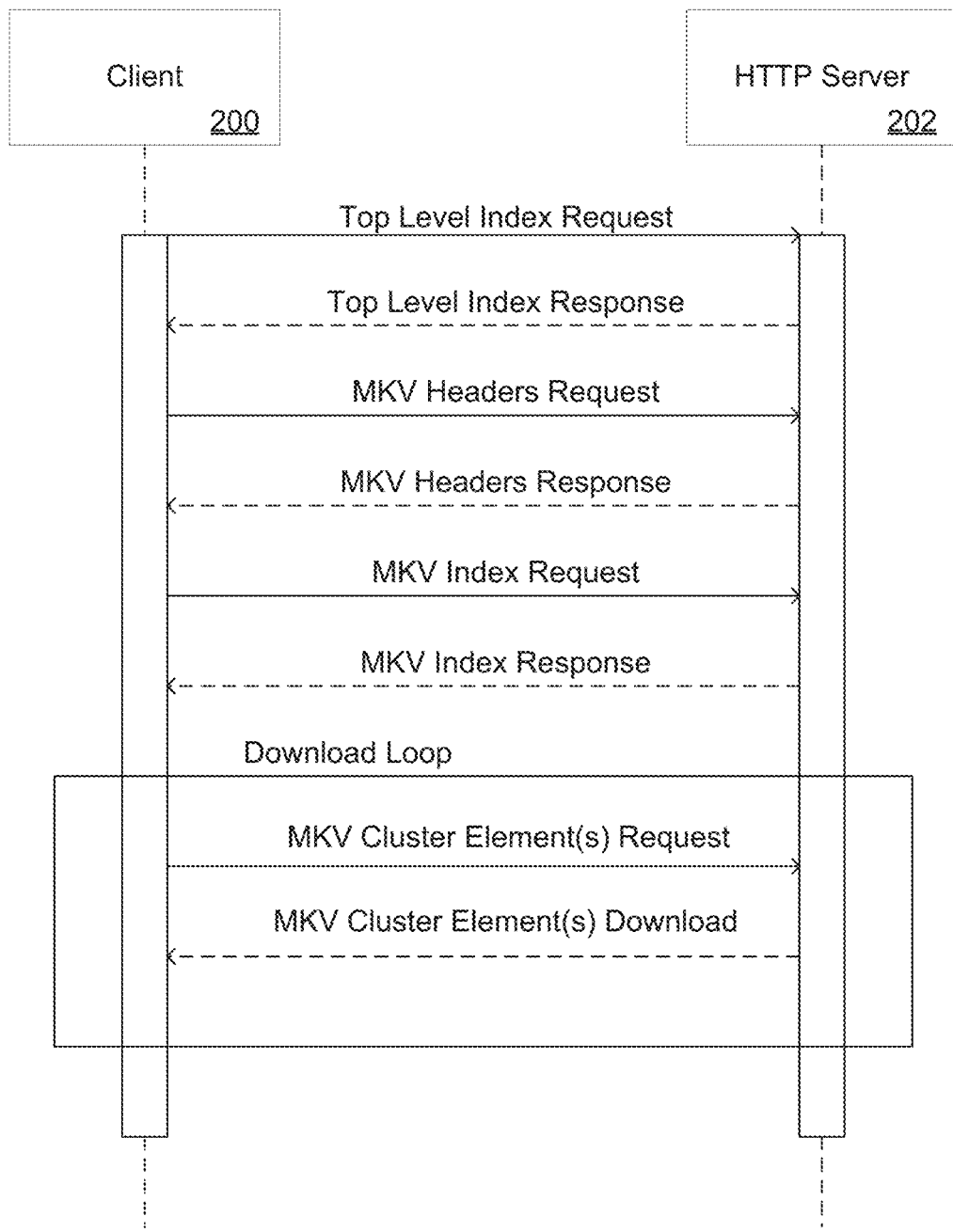
FIG. 11 conceptually illustrates communication between a playback device and an HTTP server associated with the commencement of streaming of encoded media contained within Matroska container files indexed by a top level index file in accordance with an embodiment of the invention.

Communication between a playback device or client and an HTTP server during the playback of media encoded in separate streams contained within Matroska container files indexed by a top level index file in accordance with an embodiment of the invention is illustrated in FIG. 11. In the illustrated embodiment, the playback device 200 commences playback by requesting the top level index file from the server 202 using an HTTP request or a similar protocol for retrieving data. The server 202 provides the bytes corresponding to the request. The playback device 200 then parses the top level index file to identify the URIs of each of the Matroska container files containing the streams of encoded media derived from a specific piece of source media. The playback device can then request the byte ranges corresponding to headers of one or more of the Matroska container files via HTTP or a similar protocol, where the byte ranges are determined using the information contained in the URI for the relevant Matroska container files (see discussion above). The server returns the following information in response to a request for the byte range containing the headers of a Matroska container file:

ELEM("EBML")
ELEM("SEEKHEAD")
ELEM("SEGMENTINFO")
ELEM("TRACKS")

The EBML element is typically processed by the playback device to ensure that the file version is supported. The SeekHead element is parsed to find the location of the Matroska index elements and the SegmentInfo element contains two key elements utilized in playback: TimecodeScale and Duration. The TimecodeScale specifies the timecode scale for all timecodes within the Segment of the Matroska container file and the Duration specifies the duration of the Segment based upon the TimecodeScale. The Tracks element contains the information used by the playback device to decode the encoded media contained within the Clusters element of the Matroska file including the common cryptographic information, which can take a variety of forms including but not limited to a DRMHeader element. As noted above, adaptive bitrate streaming systems in accordance with embodiments of the invention can support different streams encoded using different encoding parameters including but not limited to frame rate, and resolution. Therefore, the playback device can use the information contained within the Matroska container file's headers to configure the decoder every time a transition is made between encoded streams. Due to the fact that alternative protected streams utilize the same cryptographic information, the engine utilized to decrypt the content on the client 200 (i.e. the software process used to decrypt encrypted portions of frames of video) does not require reconfiguration using different cryptographic information with each stream switch.

In many embodiments, the playback device does not retrieve the headers for all of the Matroska container files indexed in the top level index file. Instead, the playback device determines the stream(s) that will be utilized to initially commence playback and requests the headers from the corresponding Matroska container files. Depending upon the structure of the URIs contained within the top level index file, the playback device can either use information from the URIs or information from the headers of the Matroska container files to request byte ranges from the server that contain at least a portion of the index from relevant Matroska container files. The byte ranges can correspond to the entire index or can correspond to the top level of a hierarchical index and a portion of a lower level index (i.e. a HierarchicalIndex element and one or more CuePoint elements). The server provides the relevant byte ranges containing the index information to the playback device, and the playback device can use the index information to request the byte ranges of Cluster elements containing encoded media using this information. When the Cluster elements are received, the playback device can extract encoded media from the BlockGroup elements within the Cluster element, and can decode and playback the media within the BlockGroup elements in accordance with their associated Timecode attributes. Prior to decoding the encoded media, the playback device can check for the presence of a DRMInfo element within each BlockGroup of a video stream to identify whether the encoded media is protected. The playback device can use the information within the DRMInfo element to decrypt encrypted portions of the video prior to decoding.

In the illustrated embodiment, the playback device 200 requests sufficient index information from the HTTP server prior to the commencement of playback that the playback device can stream the entirety of each of the selected streams using the index information. In other embodiments, the playback device continuously retrieves index information as media is played back. In several embodiments, all of the index information for the lowest bitrate steam is requested prior to playback so that the index information for the lowest bitrate stream is available to the playback device in the event that streaming conditions deteriorate rapidly during playback.

Switching Between Streams

The communications illustrated in FIG. 11 assume that the playback device continues to request media from the same streams (i.e. Matroska container files) throughout playback of the media. In reality, the streaming conditions experienced by the playback device are likely to change during the playback of the streaming media and the playback device can request media from alternative streams (i.e. different Matroska container files) to provide the best picture quality for the streaming conditions experienced by the playback device. In addition, the playback device may switch streams in order to perform a trick play function that utilizes a trick play track stream.

Figure 12A:
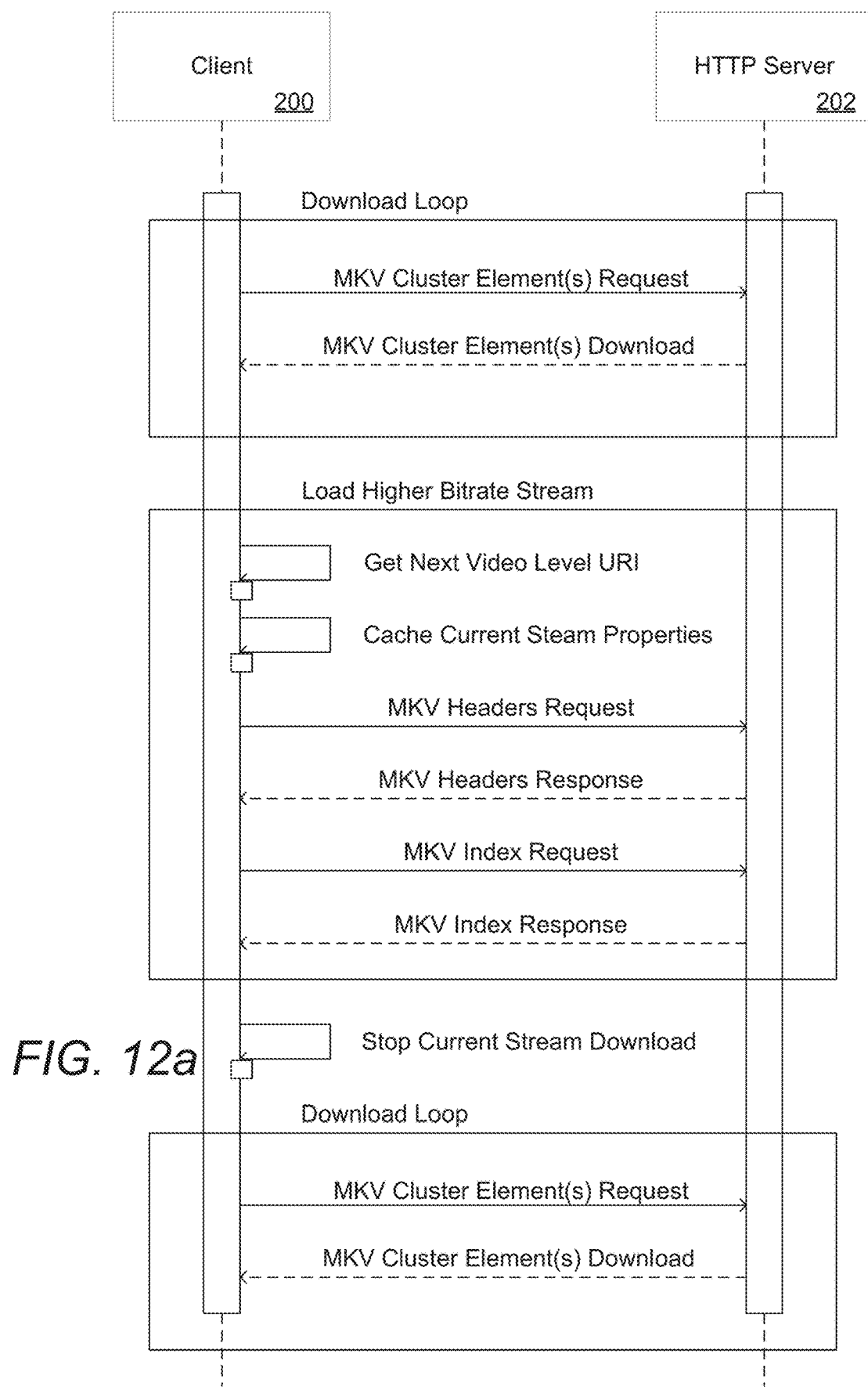
FIGS. 12a and 12b conceptually illustrate communication between a playback device and an HTTP server associated with switching between streams in response to the streaming conditions experienced by the playback device prior to the decision to switch streams in accordance with embodiments of the invention.

Communication between a playback device and a server when a playback device switches to a new stream in accordance with embodiments of the invention are illustrated in FIG. 12a. The communications illustrated in FIG. 12a assume that the index information for the new stream has not been previously requested by the playback device and that downloading of Cluster elements from the old stream proceeds while information is obtained concerning the Matroska container file containing the new stream. When the playback device 200 detects a change in streaming conditions, determines that a higher bitrate stream can be utilized at the present streaming conditions, or receives a trick play instruction from a user, the playback device can use the top level index file to identify the URI for a more appropriate alternative stream to at least one of the video, audio, or subtitle streams from which the playback device is currently requesting encoded media. The playback device can save the information concerning the current stream(s) and can request the byte ranges of the headers for the Matroska container file(s) containing the new stream(s) using the parameters of the corresponding URIs. Caching the information in this way can be beneficial when the playback device attempts to adapt the bitrate of the stream downward. When the playback device experiences a reduction in available bandwidth, the playback device ideally will quickly switch to a lower bitrate stream. Due to the reduced bandwidth experienced by the playback device, the playback device is unlikely to have additional bandwidth to request header and index information. Ideally, the playback device utilizes all available bandwidth to download already requested higher rate Cluster elements and uses locally cached index information to start requesting Cluster elements from Matroska container file(s) containing lower bitrate stream(s). When a hierarchical index is used, the playback device typically will download additional index information. However, the amount of index information that is downloaded is significantly reduced as the headers of the Matroska container file are already cached on the playback device and the playback device only needs a portion of the index in order commence requesting Cluster elements from the Matroska container file(s) containing the new stream(s).

Byte ranges for index information for the Matroska container file(s) containing the new stream(s) can be requested from the HTTP server 202 in a manner similar to that outlined above with respect to FIG. 11. At which point, the playback device can stop downloading of cluster elements from the previous streams and can commence requesting the byte ranges of the appropriate Cluster elements from the Matroska container file(s) containing the new stream(s) from the HTTP server, using the index information from the Matroska container file(s) to identify the Cluster element(s) containing the encoded media following the encoded media in the last Cluster element retrieved by the playback device. As noted above, the encoding of the alternative streams so that corresponding Cluster elements within alternative streams (i.e. Cluster elements containing the same portion of the source media encoded in accordance with different encoding parameters) start with the same Timecode element and an IDR frame facilitates the smooth transition from one stream to another. In addition, the use of common cryptographic information further facilitates smooth switching between alternative streams.

When the Matroska file includes a hierarchical index, the process for switching between streams can involve downloading less than the entire index of the new streams. The index information can be downloaded by requesting the byte range for the hierarchical index and then using the Timecode attribute of media played back by the playback device 200 to identify the location of CuePoint elements within the Matroska container file(s) containing the new stream(s) that reference Cluster elements containing sequential encoded media and requesting the byte ranges of the CuePoint elements from the HTTP server 202. After the HTTP server has provided the byte ranges including the CuePoint elements, the playback device can use the information within the CuePoint elements to request byte ranges containing desired Cluster elements from the HTTP server. At which point, playback of the encoded media contained within the Cluster elements proceeds in the manner discussed above.

Figure 12B:
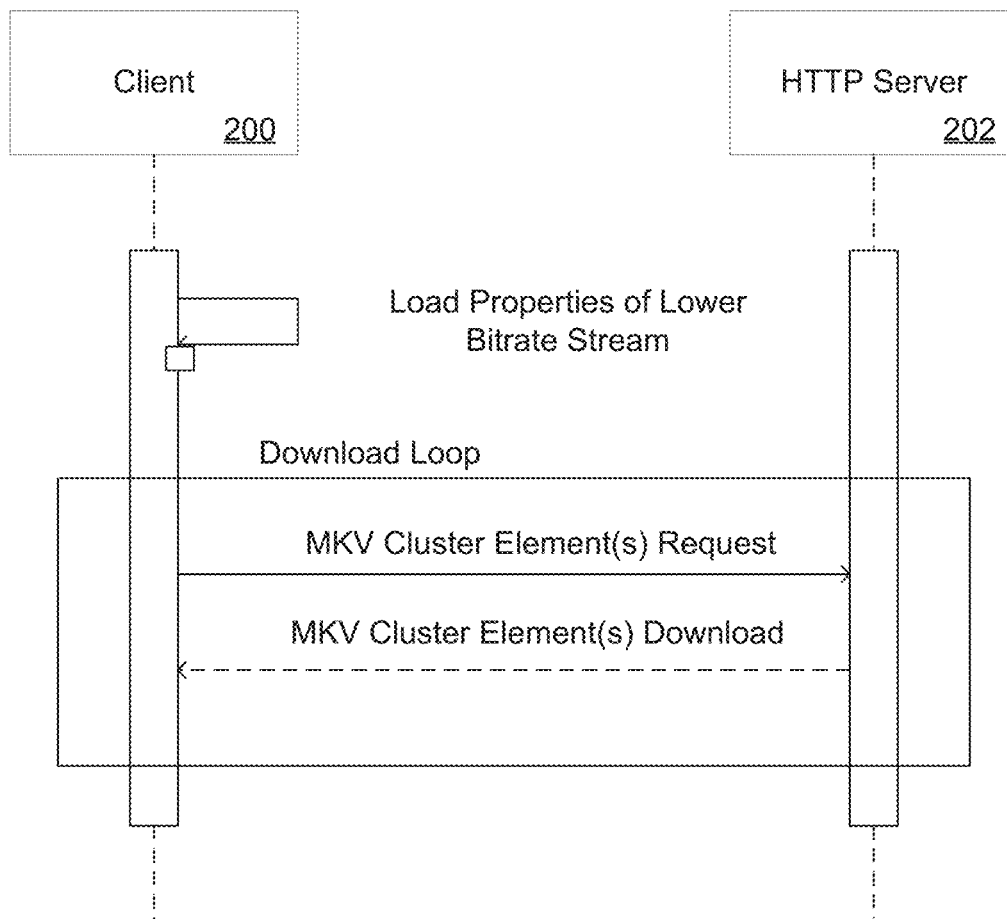

When the playback device caches the header and the entire index for each stream that has be utilized in the playback of the media, the process of switching back to a previously used stream can be simplified. The playback device already has the header and index information for the Matroska file containing the previously utilized stream and the playback device can simply use this information to start requesting Cluster elements from the Matroska container file of the previously utilized stream via HTTP. Communication between a playback device and an HTTP server when switching back to a stream(s) for which the playback device has cached header and index information in accordance with an embodiment of the invention is illustrated in FIG. 12*b*. The process illustrated in FIG. 12*b* is ideally performed when adapting bitrate downwards, because a reduction in available resources can be exacerbated by a need to download index information in addition to media. The likelihood of interruption to playback is reduced by increasing the speed with which the playback device can switch between streams and reducing the amount of overhead data downloaded to achieve the switch. When a hierarchical index is utilized, the playback device requests the appropriate portion of the index from the Matroska container file(s) containing the lower bitrate stream(s) prior to requesting Cluster elements from the Matroska container file.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed:

1. A playback device for playing protected video from a plurality of alternative streams, comprising:
   a set of one or more processors; and
   a non-volatile storage containing an application for causing the set of one or more processors to perform the steps of:
      obtaining a top level index identifying a plurality of alternative streams of protected video, wherein each of the alternative streams of protected video includes partially encrypted encoded video frame data,
         wherein the partially encrypted encoded video frame data contains encrypted portions and unencrypted portions of data;
      obtaining common cryptographic information, where each of the plurality of alternative streams of protected video is protected using the common cryptographic information;
      obtaining a container index that provides byte ranges for portions of a container file that contains one of the plurality of alternative streams of protected video;
      requesting portions of the container file based on the provided byte ranges;
      locating, within the requested portions of the container file, encryption information that identifies the size and location of encrypted portions of partially encrypted encoded video frame data that is also contained within the requested portions of the container file;
      decrypting each encrypted portion of the partially encrypted encoded video frame data identified using the located encryption information, where the decryption process utilizes the common cryptographic information;
      decoding the decrypted encoded video frame data and unencrypted encoded video frame data to obtain decoded frames of video; and
      playing back the decoded frames of video.

2. The playback device of claim 1, wherein the decryption process utilizes a copy of the common cryptographic information to configure a decryption engine used to decrypt encrypted portions of the partially encrypted encoded video frame data.

3. The playback device of claim 1, wherein the partially encrypted encoded video frame data comprises video frame header data and at least one encoded frame of video.

4. The playback device of claim 1, further comprising utilizing a copy of the common cryptographic information when switching between the alternative streams of the plurality of alternative streams.

5. The playback device of claim 1, wherein the common cryptographic information is associated with the protected video and is utilized to encrypt each of the plurality of alternative streams of the protected video.

6. The playback device of claim 1, wherein the step of requesting portions of the selected stream further comprises the step of obtaining a container file containing protected video from at least one of the plurality of alternative streams, where the container file also includes a reference to at least one key from the common cryptographic information to utilize in accessing the encrypted portions of the partially encrypted encoded video frame data.

7. The playback device of claim 1, wherein the located encryption information further comprises cryptographic information that can be utilized to access the encrypted portion of the partially encrypted encoded video frame data.

8. The playback device of claim 7, wherein the cryptographic information is a reference to at least one key from the common cryptographic information.

9. The playback device of claim 1, wherein the application is further for causing the set of processors to perform the steps of:
    transmitting a request for content to a set of one or more content distribution servers; and
    receiving the content from the set of one or more content distribution servers.

10. The playback device of claim 9, wherein the application is further for causing the set of processors to perform the steps of:
    transmitting a request for cryptographic information including the common cryptographic information to a set of one or more DRM servers; and
    receiving the cryptographic information from the set of one or more DRM servers.

11. The playback device of claim 1, wherein the application is further for causing the set of processors to perform the step of obtaining the container index from at least one file selected from the group consisting of: the associated container file containing the selected stream of protected video; and a separate file to the associated container file containing the selected stream of protected video.

12. The playback device of claim 1, wherein the common cryptographic information comprises a plurality of keys.

13. The playback device of claim 1, wherein the common cryptographic information is a set of at least one key.

14. The playback device of claim 1, wherein:
    the container index is part of a hierarchical index; and
    the application is further for causing the set of processors to perform the step of:
        obtaining a lower level index that identifies the location of the partially encrypted encoded video frame data within a specific requested portion of the selected stream of protected video; and
        identifying the partially encrypted encoded video frame data from within the specific requested portion of the selected stream using the lower level index.

15. The playback device of claim 1, wherein the common cryptographic information is associated with the protected video using a unique title identifier (ID).

16. The playback device of claim 2, wherein if the copy of the common cryptographic information is already obtained, use the copy of the common cryptographic information when switching between the alternative streams of the plurality of alternative streams.

17. The playback device of claim 2, wherein the copy of the common cryptographic information is utilized when switching between the alternative streams of the plurality of alternative streams such that the playback device does not need to reacquire the copy of the common cryptographic information for each switch.

18. A method for playback protected video from a plurality of alternative streams on a playback device, the method comprising:
    obtaining a top level index identifying a plurality of alternative streams of protected video, wherein each of the alternative streams of protected video includes partially encrypted encoded video frame data,
        wherein the partially encrypted encoded video frame data contains encrypted portions and unencrypted portions of data,
    obtaining common cryptographic information, where each of the plurality of alternative streams of protected video is protected using the common cryptographic information;
    obtaining a container index that provides byte ranges for portions of a container file that contains one of the plurality of alternative streams of protected video;
    requesting portions of the container file based on the provided byte ranges;
    locating, within the requested portions of the container file, encryption information that identifies size and location of encrypted encoded portions of partially encrypted encoded video frame data that is also contained within the requested portions of the container file;
    decrypting each encrypted portion of the partially encrypted encoded video frame data identified using the located encryption information, where the decryption process utilizes the common cryptographic information;
    decoding the decrypted encoded video frame data and unencrypted encoded video frame data to obtain decoded frames of video; and
    playing back the decoded frames of video.

19. The method of claim 18, wherein the decryption process utilizes a copy of the common cryptographic information to configure a decryption engine used to decrypt encrypted portions of the partially encrypted encoded video frame data.

20. The method of claim 18, wherein the partially encrypted encoded video frame data comprises video frame header data and at least one encoded frame of video.

21. The method of claim 18, further comprising utilizing a copy of the common cryptographic information when switching between the alternative streams of the plurality of alternative streams.

22. The method of claim 18, wherein the common cryptographic information is associated with the protected video and is utilized to encrypt each of the plurality of alternative streams of the protected video.

23. The method of claim 18, wherein requesting portions of the selected stream further comprises obtaining a container file containing protected video from at least one of the plurality of alternative streams, where the container file also includes a reference to at least one key from the common cryptographic information to utilize in accessing the encrypted portions of the partially encrypted encoded video frame data.

24. The method of claim 18, wherein the located encryption information further comprises cryptographic information that can be utilized to access the encrypted portion of the partially encrypted encoded video frame data.

25. The method of claim 24, wherein the cryptographic information is a reference to at least one key from the common cryptographic information.

26. The method of claim 18, further comprising:
    transmitting a request for content to a set of one or more content distribution servers; and
    receiving the content from the set of one or more content distribution servers.

27. The method of claim 26, further comprising:
transmitting a request for cryptographic information including the common cryptographic information to a set of one or more DRM servers; and
receiving the cryptographic information from the set of one or more DRM servers.

28. The method of claim 18, further comprising obtaining the container index from at least one file selected from the group consisting of: the associated container file containing the selected stream of protected video; and a separate file to the associated container file containing the selected stream of protected video.

29. The method of claim 18, wherein the common cryptographic information comprises a plurality of keys.

30. The method of claim 18, wherein the common cryptographic information is a set of at least one key.

31. The method of claim 18, wherein:
the container index is part of a hierarchical index; and
the method further comprises:
obtaining a lower level index that identifies the location of the partially encrypted encoded video frame data within a specific requested portion of the selected stream of protected video; and
identifying the partially encrypted encoded video frame data from within the specific requested portion of the selected stream using the lower level index.

32. The method of claim 18, wherein the common cryptographic information is associated with the protected video through a unique title identifier (ID).

33. The method of claim 19, wherein if the copy of the common cryptographic information is already obtained, use the copy of the common cryptographic information when switching between the alternative streams of the plurality of alternative streams.

34. The method of claim 19, wherein the copy of the common cryptographic information is utilized when switching between the alternative streams of the plurality of alternative streams such that the playback device does not need to reacquire the copy of the common cryptographic information for each switch.

35. A playback device for playing protected video from a plurality of alternative streams, comprising:
a set of one or more processors; and
a non-volatile storage containing an application for causing the set of one or more processors to perform the steps of:
obtaining a top level index file identifying a plurality of alternative streams of protected video, wherein each of the alternative streams of protected video includes partially encrypted encoded video frame data, wherein the partially encrypted encoded video frame data contains encrypted portions and unencrypted portions of data;
obtaining common cryptographic information, where each of the plurality of alternative streams of protected video is protected using the common cryptographic information;
configuring a digital rights management (DRM) engine using the common cryptographic information;
requesting portions of a first container file;
locating, within the requested portions of the first container file, encryption information that identifies encrypted portions of partially encrypted video frame data that is also contained within the requested portions of the container file;
decrypting, using the DRM engine, each encrypted portion of partially encrypted video frame data to obtain decrypted video frame data, where the decryption process utilizes the common cryptographic information;
playing back the decrypted frames of video;
when a change in streaming conditions is detected, requesting portions of a second container file;
locating, within the requested portions of the second container file, encryption information that identifies encrypted portions of partially encrypted video frame data that is also contained within the requested portions of the second container file;
decrypting each encrypted portion of the partially encrypted video frame data identified using DRM engine, where the decryption process utilizes the common cryptographic information;
playing back the decrypted frames of video.

36. A method for playing protected video from a plurality of alternative streams, comprising:
obtaining a top level index file identifying a plurality of alternative streams of protected video, wherein each of the alternative streams of protected video includes partially encrypted encoded video frame data, wherein the partially encrypted encoded video frame data contains encrypted portions and unencrypted portions of data;
obtaining common cryptographic information, where each of the plurality of alternative streams of protected video is protected using the common cryptographic information;
configuring a digital rights management (DRM) engine using the common cryptographic information;
requesting portions of a first container file;
locating, within the requested portions of the first container file, encryption information that identifies encrypted portions of partially encrypted video frame data that is also contained within the requested portions of the container file;
decrypting, using the DRM engine, each encrypted portion of partially encrypted video frame data to obtain decrypted video frame data, where the decryption process utilizes the common cryptographic information;
playing back the decrypted frames of video;
when a change in streaming conditions is detected, requesting portions of a second container file;
locating, within the requested portions of the second container file, encryption information that identifies encrypted portions of partially encrypted video frame data that is also contained within the requested portions of the second container file;
decrypting each encrypted portion of the partially encrypted video frame data identified using DRM engine, where the decryption process utilizes the common cryptographic information;
playing back the decrypted frames of video.

\* \* \* \* \*